(12) United States Patent
Schwalbach et al.

(10) Patent No.: US 9,954,386 B2
(45) Date of Patent: Apr. 24, 2018

(54) FIXTURES FOR DISPLAYING PRODUCTS

(71) Applicant: Apple Inc., Cupertino, CA (US)

(72) Inventors: Charles A. Schwalbach, Menlo Park, CA (US); David Samuel Kumka, San Francisco, CA (US); Sheng Yang, Mountain View, CA (US); David Benjamin Kosecoff, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 200 days.

(21) Appl. No.: 14/837,479

(22) Filed: Aug. 27, 2015

(65) Prior Publication Data

US 2016/0064995 A1 Mar. 3, 2016

Related U.S. Application Data

(60) Provisional application No. 62/045,455, filed on Sep. 3, 2014.

(51) Int. Cl.
*H02J 7/02* (2016.01)
*G06Q 99/00* (2006.01)
(Continued)

(52) U.S. Cl.
CPC .............. *H02J 7/025* (2013.01); *A47F 3/001* (2013.01); *A47F 3/007* (2013.01); *A47F 7/022* (2013.01);
(Continued)

(58) Field of Classification Search
CPC ...... H01R 13/02; H01R 12/52; H01R 12/613; H01R 12/714; H01R 12/79; H01R 12/88;
(Continued)

(56) References Cited

U.S. PATENT DOCUMENTS 3,004,814 A * 10/1961 Schulze .................. A47B 3/12
108/159
3,538,862 A * 11/1970 Patriarca .............. A47B 57/485
108/144.11
(Continued)

FOREIGN PATENT DOCUMENTS

CN 203619028 U 6/2014
DE 29821588 U1 4/1999
(Continued)

OTHER PUBLICATIONS

International Search Report and Written Opinion, published Mar. 10, 2016, for International Patent Application No. PCT/US2015/047539, filed Aug. 28, 2015.
(Continued)

*Primary Examiner* — Truc Nguyen
(74) *Attorney, Agent, or Firm* — Sterne, Kessler, Goldstein & Fox, P.L.L.C.

(57) ABSTRACT

A display apparatus, such as a table, for display consumer products, such as electronic devices, is disclosed. The table may include a display cavity for displaying products. The display cavity may include a transparent glass panel defining a top portion thereof so as to allow consumers to view products housed within the display cavity. A display fixture for holding a consumer product with the display cavity is disclosed. A kit for aligning a plurality of nodes on the display panel is also disclosed. A DC-to-DC converter that can receive a DC input voltage via a first standard receptacle connector, convert the DC input voltage to a DC output voltage using regulator circuitry and provide the DC output voltage at a second standard receptacle connector is also disclosed. The DC-to-DC converter can include a compact, cosmetic, minimalist housing for containing a space-effi-
(Continued)

cient printed circuit board that includes the regulator circuitry.

26 Claims, 36 Drawing Sheets

(51) Int. Cl.
 *H02J 7/00*     (2006.01)
 *A47F 7/024*    (2006.01)
 *A47F 10/00*    (2006.01)
 *A47F 3/00*     (2006.01)
 *A47F 7/02*     (2006.01)
 *A47B 13/00*    (2006.01)

(52) U.S. Cl.
 CPC ............. *A47F 7/024* (2013.01); *A47F 10/00* (2013.01); *G06Q 99/00* (2013.01); *H02J 7/007* (2013.01); *H02J 7/0045* (2013.01); *A47B 13/00* (2013.01); *A47F 2003/008* (2013.01)

(58) Field of Classification Search
 CPC ............. H01R 13/193; H01R 13/6205; H01R 13/6683; H01R 2201/12; H01R 2201/20; H01R 31/06; H01R 13/2428; H01R 13/64; H01R 13/7039
 See application file for complete search history.

(56) References Cited

U.S. PATENT DOCUMENTS

| | | | | |
|---|---|---|---|---|
| 4,881,794 | A * | 11/1989 | Bartoszek | C08K 3/34 385/100 |
| 5,816,696 | A | 10/1998 | Beisler | |
| 6,592,392 | B2 * | 7/2003 | Po-Heng | H01R 13/6272 439/358 |
| 7,744,404 | B1 * | 6/2010 | Henson | H01R 13/72 439/501 |
| 8,360,373 | B2 * | 1/2013 | Johnson | A47F 7/024 211/26 |
| 8,522,985 | B2 * | 9/2013 | Scholen | A47F 7/02 211/26 |
| 8,625,255 | B2 * | 1/2014 | Linnane | H02G 3/0608 361/611 |
| 8,711,553 | B2 * | 4/2014 | Trinh | A47F 7/0246 248/206.5 |
| 8,814,128 | B2 * | 8/2014 | Trinh | A47F 7/024 248/187.1 |
| 9,220,358 | B2 * | 12/2015 | Wheeler | A47F 7/024 |
| 9,664,336 | B2 * | 5/2017 | Ewen, III | F16M 13/02 |
| 2003/0146755 | A1 | 8/2003 | Kitazawa et al. | |
| 2006/0262525 | A1 | 11/2006 | Barbeau et al. | |
| 2008/0253717 | A1 * | 10/2008 | Cull | G02B 6/383 385/54 |
| 2009/0215283 | A1 * | 8/2009 | Du | H01R 13/6205 439/39 |
| 2009/0236140 | A1 * | 9/2009 | Randall | H01R 13/03 174/268 |
| 2009/0284164 | A1 * | 11/2009 | Ray | G09G 3/14 315/218 |
| 2011/0006611 | A1 * | 1/2011 | Baarman | H01F 38/14 307/104 |
| 2011/0025263 | A1 | 2/2011 | Gilbert | |
| 2011/0068919 | A1 * | 3/2011 | Rapp | A47F 7/024 340/568.2 |
| 2011/0084838 | A1 * | 4/2011 | Fawcett | A47F 7/024 340/568.8 |
| 2011/0210617 | A1 * | 9/2011 | Randall | H01F 38/14 307/104 |
| 2011/0309934 | A1 * | 12/2011 | Henson | G08B 13/1472 340/568.2 |
| 2012/0153893 | A1 * | 6/2012 | Schatz | B60L 11/182 320/108 |
| 2012/0188082 | A1 * | 7/2012 | Berglund | G08B 13/1445 340/568.2 |
| 2013/0113297 | A1 * | 5/2013 | Miyamoto | H02J 7/025 307/104 |
| 2013/0206042 | A1 | 8/2013 | Mohammed | |
| 2014/0217965 | A1 * | 8/2014 | Van Wiemeersch | H02J 7/0042 320/108 |
| 2014/0227893 | A1 | 8/2014 | Howard | |
| 2014/0266014 | A1 * | 9/2014 | Pai | H02J 7/0042 320/107 |
| 2015/0180160 | A1 * | 6/2015 | Chen | H01R 13/5213 320/115 |
| 2016/0253882 | A1 * | 9/2016 | Taylor | G08B 13/1445 340/538.17 |
| 2016/0335860 | A1 * | 11/2016 | Richardson | G08B 13/1454 |

FOREIGN PATENT DOCUMENTS

| | | |
|---|---|---|
| DE | 202014100038 U1 | 4/2014 |
| EP | 2033539 A1 | 3/2009 |
| JP | 2000236949 A | 9/2000 |

OTHER PUBLICATIONS

International Search Report and Written Opinion, published Mar. 10, 2016, for International Patent Application No. PCT/US2015/047543, filed Aug. 28, 2015.

International Search Report and Written Opinion, published Mar. 10, 2016, for International Patent Application No. PCT/US2015/047545, filed Aug. 28, 2015.

\* cited by examiner

FIXTURES FOR DISPLAYING PRODUCTS

CROSS-REFERENCE TO RELATED APPLICATION(S)

This application claims priority to U.S. Provisional Application No. 62/045,455, filed on Sep. 3, 2014, which is incorporated herein in its entirety by reference thereto.

FIELD

The described embodiments relate generally to display systems and methods for displaying consumer products. More particularly, the present embodiments relate to tables and fixtures for displaying and providing power and/or data to consumer products.

BACKGROUND

A retailer or other person may desire to provide a table for displaying electronic devices and may also desire to provide power and/or data to the electronic devices. In some cases, the retailer may wish to provide a table having a secure and athletically pleasing display area for displaying electronic devices.

SUMMARY

A retailer or other user may have various locations within a store or other location for displaying electronic devices. The retailer may wish to provide display apparatuses, such as tables, at these locations to allow customers to view various displayed electronic devices. In some cases, the display apparatus may provide power and/or data to the electronic devices. In some cases, the display apparatus may provide a secure and aesthetically appealing display area for displaying the electronic devices. In some cases, the display area may be illuminated. In some cases, the temperature of the display area may be regulated.

In some embodiments, a table may include a display cavity for displaying products. The display cavity may include a glass panel defining a top portion thereof so as to allow consumers to view products housed within the display cavity. The table may include a lighting system for illuminating at least a portion of the display cavity. The lighting system may create any aesthetically appealing display cavity that focuses consumers' attention on the products housed within the display cavity. The table may also include a cooling system for controlling the temperature of the table and specifically the temperature within the display cavity. The table may include a hinged display panel for supporting the products housed within the display cavity. For aesthetic and security purposes, the display panel may rotate from the bottom of the table such that a user can access the products.

To accomplish this, the retailer may use a display apparatus, such as a table, or elements thereof according to embodiments described herein.

Some embodiments are directed towards a table. In some embodiments, the table includes a table top having a top wall defining at least a portion of a top surface, a side wall extending downward from the top wall and defining a perimeter of a cavity formed in the table top and recessed from the top wall. The table top also may include a display panel defining at least a portion of a bottom of a cavity, where the display panel is rotatable about a first edge thereof, and a glass panel defining at least a portion of the top surface and located above at least a portion of the cavity.

In some embodiments, the table includes a table top having a glass panel and a display panel disposed below the glass panel, forming a cavity between the table top and the glass panel, where the display panel includes a node to receive a display fixture for displaying a product. The table also may include a power supply system to supply power to the display fixture.

In some embodiments, the table includes a table top having a top wall formed in part by a glass panel, a bottom wall formed in part by a display panel, and a display cavity side wall extending between the glass panel and the display panel, where the display cavity side wall, the glass panel, and the display panel together define a display cavity. The table also may include a lighting system for illuminating at least a portion of the display cavity, where the lighting system includes a light source disposed around a perimeter of the display cavity and a lens disposed around the perimeter of the display cavity between the light source and the display cavity, the lens being configured to diffuse light emitted from the light source.

In some embodiments, the table includes a table top having a top wall, a bottom wall, and a cavity between the top wall and the bottom wall. The cavity may include a peripheral cavity and a display cavity disposed between portions of the peripheral cavity. The table also may include a cooling system having a controller to maintain the temperature in the display cavity within a determined range.

In some embodiments, the table includes a table top having a top surface, a display cavity recessed from the top surface, and a glass panel defining at least a portion of the top surface and located above at least a portion of the display cavity. The glass panel may include a top glass layer defining a glass top surface, a bottom glass layer defining a glass bottom surface, and an ink film disposed between the top glass layer and the bottom glass layer.

In some embodiments, the table includes a table top having a top surface, a display cavity recessed from the top surface, a display panel forming a bottom surface of the display cavity and including a plurality of nodes each configured to receive a display fixture, a plurality of printed circuit boards disposed within the display panel below the plurality of nodes, and a power supply system in electrical communication with the plurality of printed circuit boards.

Some embodiments are directed towards a display system. In some embodiments, the display system includes a display panel having a plurality of apertures extend through the display panel, a plurality of nodes disposed in the plurality of apertures, and a display fixture for holding a product, where the display fixture is insertable and removable from one of the plurality of nodes. The display apparatus also may include a first printed circuit board disposed within the display panel, where the first printed circuit board is in communication with at least one of: a power source and a data source, and where the display fixture is connected to the first printed circuit board when the display fixture is inserted in one of the plurality of nodes. The first printed circuit board may be configured to supply at least one of power and data to a product via the display fixture.

Some embodiments are directed towards a display fixture. In some embodiments, the display fixture includes a plug with a body having a top surface, a bottom surface, a side surface, and an electrical connector extending from the bottom surface. The display fixture may also include a stem attached to the top surface of the plug, and a charging mechanism attached to the stem and in electrical communication with the electrical connector.

Some embodiments are directed towards a method for accessing a display cavity of a display apparatus. In some embodiments, the method includes activating an actuator, extending a cord from the actuator in response to the activation, where the cord is coupled to a free end of a display panel, and where the display panel defines a bottom surface of a display cavity. The method may include rotating the display panel about an anchored end thereof by extension of the cord, where the anchored end is connected to a support structure of the display apparatus by a hinge.

Some embodiments are directed towards a kit for aligning a plurality of nodes on a display panel. In some embodiments, the kit includes an alignment jig defining a plurality of jig receptacles, and a plurality of plug jigs each having a body and an alignment fitting attached to the body, the alignment fitting including a surface feature disposed on a surface thereof. Each jig receptacle may be configured to receive one of the plurality of plug jigs in a predetermined orientation with respect to the alignment jig such that the surface feature on each plug jig is oriented in the same direction relative to the alignment jig.

Some embodiments are directed towards DC-to-DC converters that may include a standard connector for receiving a DC input voltage and one or more standard connectors for providing a DC output voltage that can be different from the DC input voltage. As such, this configuration may provide a convenient means for even lay users to convert a DC input voltage to one or more different DC output voltages, all while using standard connectors. For example, a DC-to-DC converter according to some embodiments may include an Apple MagSafe® connector for receiving a DC input voltage and provide two different DC output voltages at two different Molex® (e.g., pin-and-socket) connectors, which can be used to provide power to electronic devices. This DC-to-DC converter can also include a compact, cosmetic, minimalist housing for containing a space-efficient printed circuit board (PCB) for converting a DC input voltage. In some embodiments such a converter may be used to provide power to the systems and/or elements described herein.

Some embodiments are directed towards a DC-to-DC converter that may include a housing having first and second connector openings and a printed circuit board disposed within the housing. The printed circuit board may include a first standard connector for receiving a DC input voltage, the first standard connector positioned adjacent to the first standard connector opening, the first standard connector including contacts and an electromagnet that is energizable to magnetically attract a magnetic element of a corresponding standard connector. The printed circuit board may also include a second standard connector for providing a DC output voltage, the second standard connector positioned adjacent to the second standard connector opening, and voltage regulator circuitry configured to convert the DC input voltage to the DC output voltage.

Some embodiments are directed towards, a DC-to-DC converter that may include a housing and a printed circuit board disposed within the housing. The printed circuit board may include a first standard connector for receiving a DC input voltage, a second standard connector for providing a first DC output voltage, a third standard connector for providing a second DC output voltage, input circuitry disposed on a front side of the printed circuit board and coupled to the first standard connector, and first regulator circuitry coupled to the input circuitry and the second standard connector. The first regulator circuitry may be disposed on the front side, and may be configured to convert the DC input voltage to the first DC output voltage. The first regulator circuitry may include first inductors coupled to first capacitors, where the first inductors are coupled in series and first capacitors are coupled in parallel, and a first controller coupled to the first inductors and second capacitors disposed on a back side of the printed circuit board. The printed circuit board may also include second regulator circuitry coupled to the first regulator circuitry and the third standard connector, the second regulator circuitry being disposed on the front side and configured to convert the first DC output voltage to the second DC output voltage. The second regulator circuitry may include second inductors coupled to third capacitors, where the second inductors are coupled in series and the third capacitors are coupled in parallel, and a second controller coupled to the second inductors and fourth capacitors disposed on the back side of the printed circuit board.

Some embodiments are directed towards a DC-to-DC converter that may include a housing having a volume that is less than 1,000 cubic centimeters and a printed circuit board disposed within the housing. The printed circuit board may include a first standard connector for receiving a DC input voltage, a second standard connector for providing a DC output voltage, and voltage regulator circuitry configured to convert the DC input voltage to the DC output voltage.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
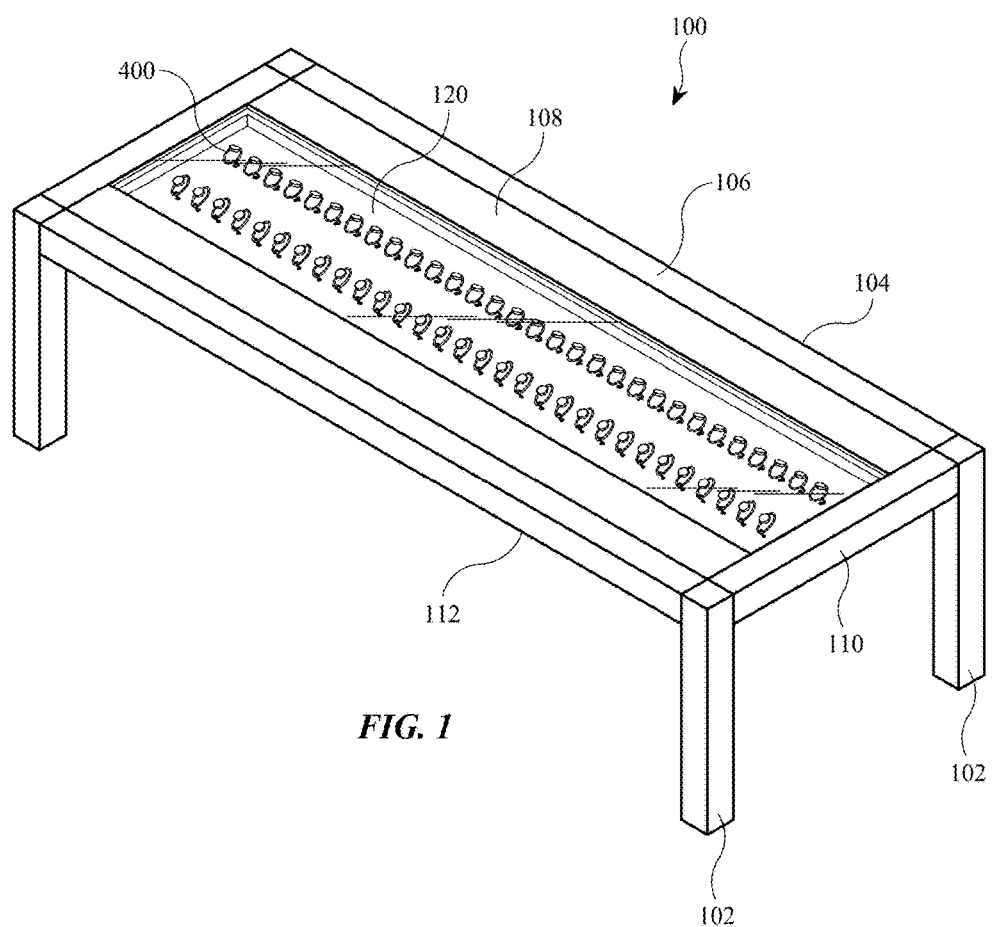
FIG. 1 shows a top perspective view of a table according to some embodiments.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

References to "one embodiment," "an embodiment," "some embodiments," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

A retailer or other user may have various locations within a store or other location for displaying electronic devices. The retailer may wish to provide display apparatuses, such as tables, at these locations to allow customers to view various electronic devices. In some cases, the display apparatus may provide power and/or data to the electronic devices. In some cases, the electronic devices may receive power via inductive charging of a battery disposed within an electronic device. In some cases, the display apparatus may provide a secure and aesthetically appealing display area for displaying the electronic devices. In some cases, the display area may be illuminated. In some cases, the temperature of the display area may be regulated.

An aesthetically appealing display apparatus can be an important tool for to attracting a consumer's attention and facilitating brand recognition (e.g., by focusing the consumer's attention on the products displayed therein, rather than the display apparatus itself). Moreover, it may be desirable for some features of a display apparatus, such as a power/data supply system or security features, to be concealed from view so as not to distract a consumer. The display apparatuses described herein may include a display cavity at least partially defined by a transparent glass panel. In some embodiments, the design of the transparent glass panel and a lighting system of the display apparatus may make it appear as if the glass panel is floating above the display cavity, thus creating an aesthetically appealing display cavity that focuses a consumer's attention on products displayed therein.

Additionally, a retailer or other user may desire a display apparatus that is modular in fashion such that components of the display apparatus can be easily exchanged and/or updated. In an increasingly fast-paced sales market (e.g., the market for electronic devices), new types and/or generations of products are often rapidly developed and released to the public. A display apparatus that is easily adaptable for use with new types or generations of products may reduce time and money a retailer spends on reconfiguring and/or replacing outdated equipment within his retail store. The display apparatuses described herein may include a modular system for providing power and/or data to electronic devices. The modular system may include releasably attached and interchangeable components for holding products while simultaneously providing data and/or power to the products and other elements of the display apparatus.

Moreover, a display apparatus may be capable of protecting displayed products to minimize potential theft. As such, the display apparatus may include security features designed to protect the products. The display apparatuses described herein may include a display panel that is rotatable from the bottom of a display apparatus, such as a table, that allows a user to access displayed products. This system provides a convenient way for a retailer to access the displayed products when he or she desires, while otherwise securely maintaining displayed products. Various security features described herein may inhibit unauthorized users from rotating the display panel and accessing displayed products.

Additionally, the number of types of electronic devices that are commercially available has increased tremendously the past few years, and the rate of introduction of these devices shows no signs of abating. Devices, such as tablets; laptops; netbooks; desktops; all-in-one computers; cell, smart, and media phones; storage devices, portable media players, navigation systems, monitors, and others, have become ubiquitous.

Many of these electronic devices require different voltages for operation, which voltages are typically supplied by different power adapters. This means that to operate multiple devices, multiple power adapters may be required. As such, users may need to concurrently use multiple power adapters in order to provide power to all the electronics devices that are being used by the user.

To avoid the inconvenience of having to use multiple power adapters, DC-to-DC converters can be used for converting the voltage from a single DC power source to the different voltage outputs required by different electronic devices. However, lay users of electronic devices typically do not operate DC-to-DC converters because of technical and safety challenges associated with these converters, e.g., connecting exposed electrical wires to the converter and adjusting the voltage provided by the converter. Consequently, DC-to-DC converters are typically only operated by electricians and others with electronics training.

Figure 31:
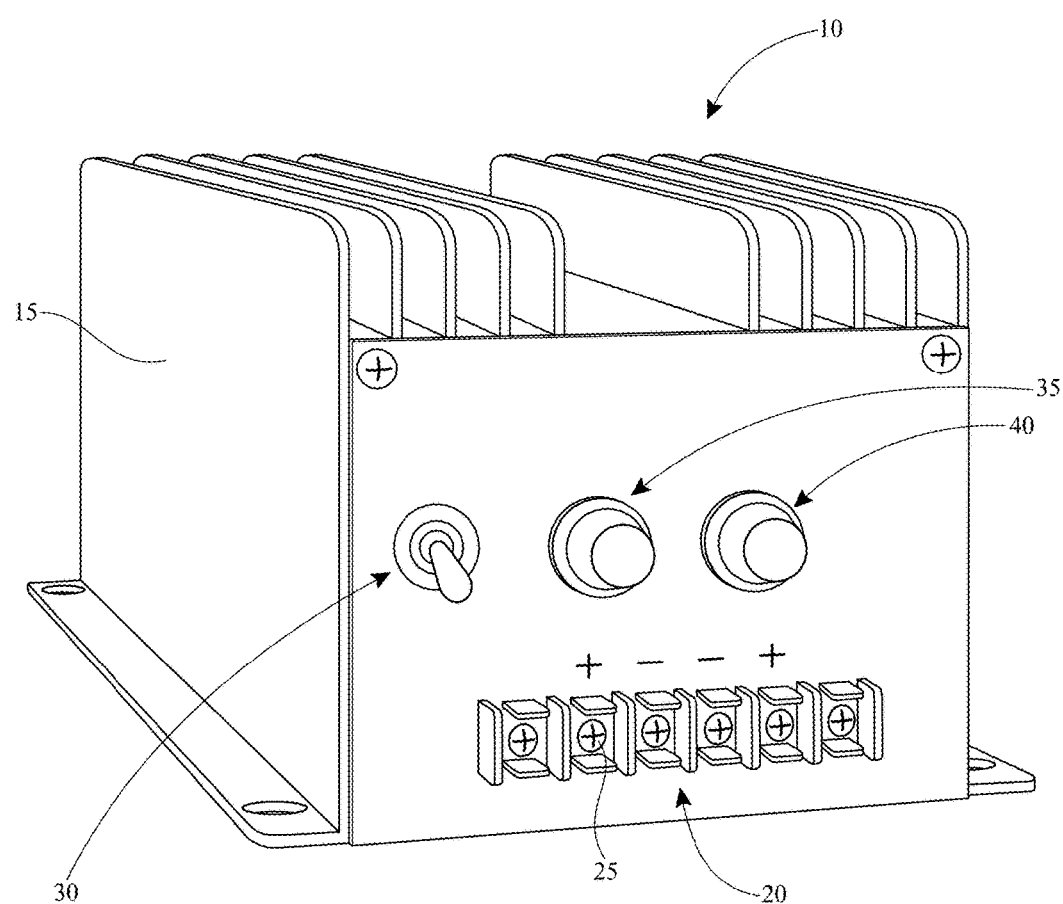
FIG. 31 shows an example of a traditional DC-to-DC converter.

FIG. 31 illustrates an example of a traditional DC-to-DC converter 10. As shown in FIG. 1, converter 10 includes a bulky utilitarian housing 15 having screw terminals 20 disposed thereon. During operation, exposed input wires of a DC input voltage source are wrapped around screws (e.g., screw 25) of screw terminals 20, thereby allowing converter 10 to receive a DC input voltage. Exposed output wires are wrapped around other screws of screw terminals 20 to route a DC output voltage from converter 10 to an electronic device. When switch 30 is switched to the "ON" position, circuitry internal to housing 15 converts the DC input voltage received via the input wires to a DC output voltage provided at the output wires. Converter 10 also includes knobs 35, 40 for adjusting the DC output voltage, thereby enabling a user to match the output DC voltage of converter 10 to the requirements of the electronic device connected to converter 10. However, as may be appreciated, converter 10 may not be a practical alternative for lay users of electronic devices who want to avoid having to use multiple power adapters to provide the different voltages required by electronic devices.

Many other voltage conversion devices may suffer from some or all of these deficiencies or from similar deficiencies.

Some embodiments provide a DC-to-DC converter that can receive a DC input voltage via a standard receptacle connector, convert or step down the DC input voltage to one or more lower DC output voltages and provide the DC output voltages at standard receptacle connectors. For example, the DC-to-DC converter can receive 20 volts (V) at a MagSafe connector receptacle, convert the 20 V to 12 V and 5 V using regulator circuitry, and provide 12 V at a two-contact Molex connector and 5 V at a 3-contact Molex connector. The regulator circuitry can be configured to be included in DC-to-DC converter housing that is significantly smaller than traditional standalone DC-to-DC converter housings (e.g., 5 times smaller or even 10 times smaller). The MagSafe receptacle connector of the converter can be mated with a MagSafe plug connector of a MagSafe power adapter, and the Molex receptacle connectors of the converter can be mated with Molex plug connectors of Molex cable assemblies that are configured to provide power to electronic systems and devices, such as those described herein. This converter can be simple enough for lay users to utilize in retail and even consumer applications such as those as described herein.

As used herein, the term "electronic device" may refer to any device that uses electrical power to operate. In some instances, embodiments discussed herein are particularly well-suited for use with electronic media devices because their potentially small form factor may prevent them from including their own DC-to-DC conversion circuitry. Such devices may include, for example, portable music players (e.g., MP3 devices and Apple's iPod® devices), portable video players (e.g., portable DVD players), cellular telephones (e.g., smart telephones such as Apple's iPhone® devices), wearable devices such as smartwatches, video cameras, digital still cameras, projection systems (e.g., holographic projection systems), gaming systems, PDAs, desktop computers, as well as tablet (e.g., Apple's iPad® devices), laptop or other mobile computers. Other examples of electronic devices include docking stations, chargers, an external power source such as an external battery, cable adapters, clock radios, game controllers, audio equipment, headsets or earphones, video equipment and adapters, keyboards, medical sensor devices such as heart rate monitors and blood pressure monitors, point of sale (POS) terminals, retail display systems (including charging elements for charging displayed devices), cooling systems (including fans), lighting systems (including light sources, dimmers), as well as numerous other hardware devices that can connect to and exchange data with or receive power from a host device.

These and other embodiments are discussed below with reference to the figures. However, those skilled in the art will readily appreciate that the detailed description given herein with respect to these figures is for explanatory purposes only and should not be construed as limiting.

Figure 2:
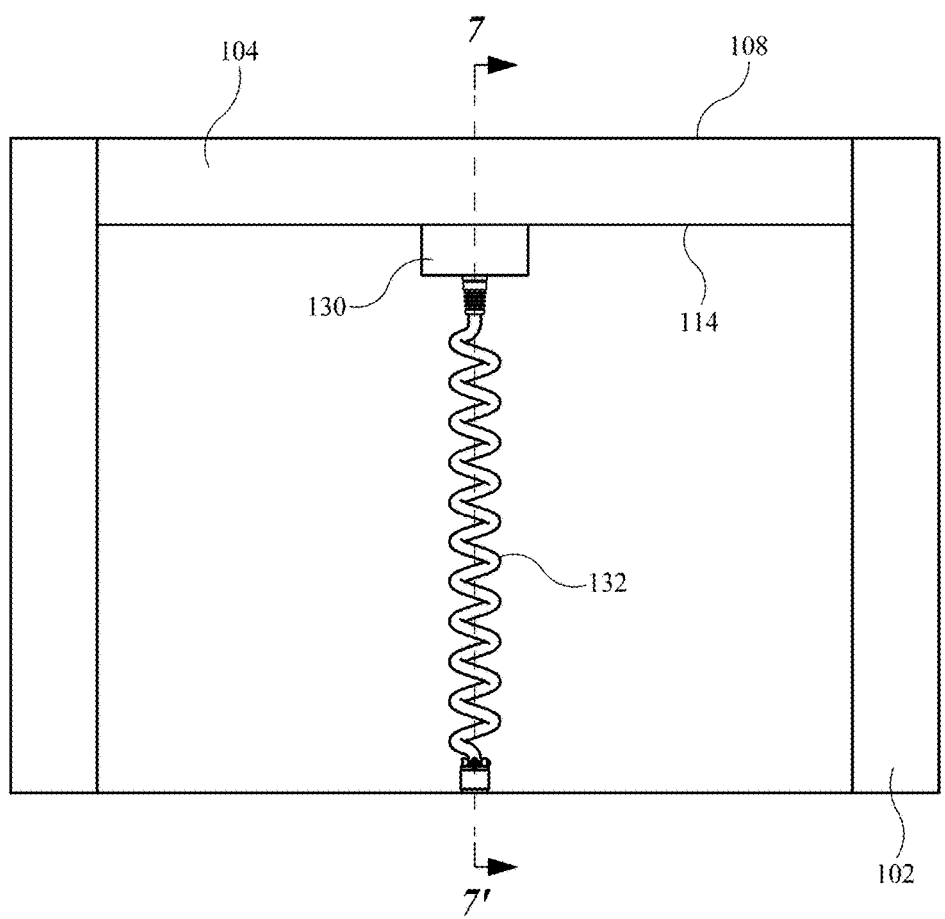
FIG. 2 shows a side view of a table according to some embodiments.

Embodiments of the present invention include a table 100 for displaying consumer products, such as electronic devices. In some embodiments (e.g., as shown in FIGS. 1 and 2), table 100 may include a plurality of legs 102 and a table top 104. Table top 104 may include a top wall 106 defining at least a portion of a top surface 108 of table top 104, a bottom wall 112 defining at least a portion of a bottom surface 114 of table top 104, and a side wall 110 extending downward from top wall 106 to bottom wall 112. Side wall 110 may connect top wall 106 to bottom wall 112 and define a perimeter of table top 104. Table top 104 may be a hollow structure having an internal cavity 140 defined by top wall 106, side wall 110, and bottom wall 112 (see, e.g., FIG. 6).

As shown in FIG. 1, a glass panel 120 may define at least a portion of top surface 108 of table 100. In other words, top wall 106 may be formed in part by glass panel 120. In some embodiments, glass panel 120 may be inset into top wall 106 such that its top surface is coplanar with the rest of top surface 108. In some embodiments, glass panel 120 and table top 104 may have the same shape (e.g., rectangular), however, glass panel 120 and table top 104 may have any shape. In some embodiments, glass panel 120 may have a different shape than table top 104.

Figure 3:
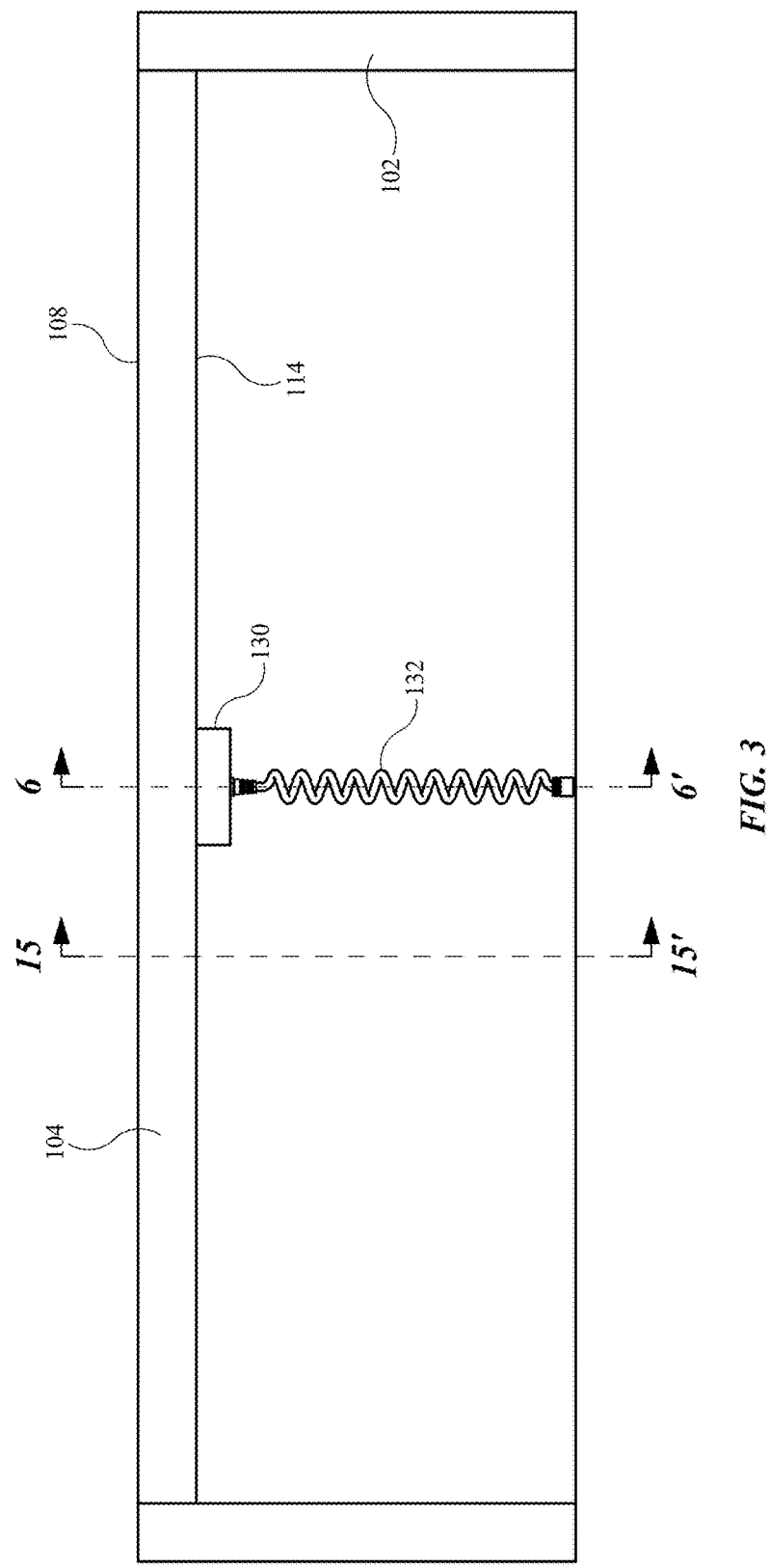
FIG. 3 shows a side view of a table according to some embodiments.

As shown in FIGS. 2 and 3, table 100 may include a power/data supply 130 attached to bottom surface 114 of table top 104. A power/data cable 132 may be connected to power/data supply 130 and configured to supply power and/or data to table 100 and products displayed therein. The delivery of power and/or data to products displayed within table top 104 is described below in greater detail.

Figure 4:
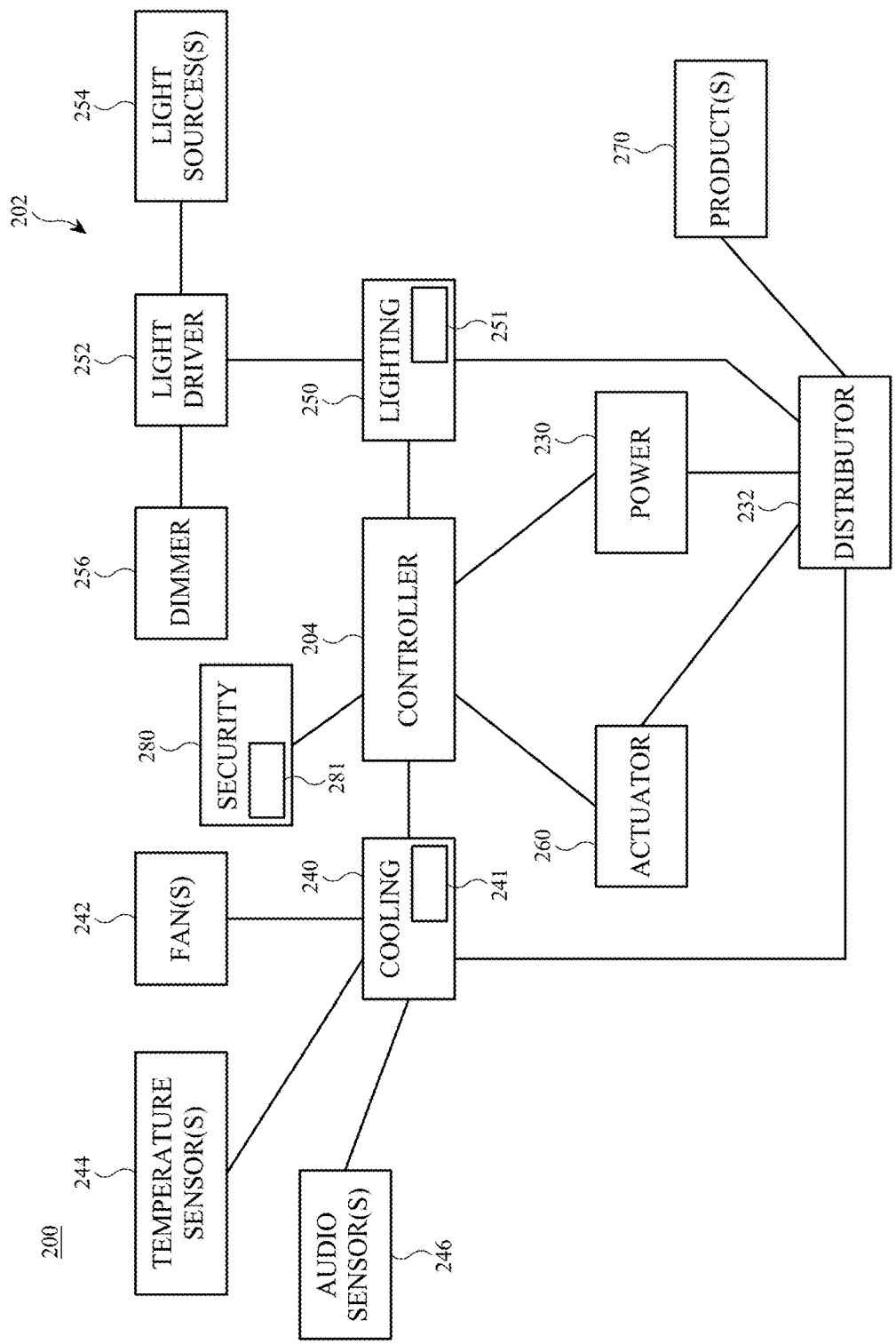
FIG. 4 shows a schematic representation of a display system according to some embodiments.

FIG. 4 shows a schematic representation of a display system 200 for displaying products 270 and supplying power and/or data to products 270 according to some embodiments. Display system 200 may include a display apparatus 202. Display apparatus 202 may be, but is not limited to, a table (such as table 100), a wall, a display case, a shelf, or combinations thereof. Display system 200 may also include a master controller 204 configured to control various aspects of display system 200. For example, master controller 204 may be configured to control a power/data supply system 230, a cooling system 240, a lighting system 250, a security system 280, and other electronic components of display system 200. In some embodiments, a user may cause the supply of at least one of power and data to products 270 via master controller 204. In some embodiments, a user may cause the supply of at least one of power and data to products 270 by connecting power/data supply 230 system to a source of data and/or power by, for example, connecting power/data supply system 230 to a power/data outlet or actuating a switch.

Display apparatus 202 may include a display panel (e.g. display panel 160 described below in more detail), configured to hold and display a plurality of products 270 within a display cavity (e.g., display cavity 141 described in more detail below). A transparent panel (e.g., glass panel 120) may cover and define at least a portion of display cavity 141 and may allow customers to view products 270 disposed within display cavity 141.

In some embodiments, display apparatus 202 may be configured to house components of display system 200 (e.g., master controller 204, cooling system 240, lighting system 250, and security system 280) such that they are concealed from view. To accomplish this, display apparatus 202 may include one or more internal compartments or chambers, such as compartments 312 and/or chambers 167 (see, e.g., FIGS. 5 and 22), for housing components of display system 200. In some embodiments, display apparatus 202 may house only some components of display system 200. For example, master controller 204 may be remotely located from display apparatus 202. In such embodiments, master controller 204 may in communication with other components of display system 200 via a communication network. The communication network may be a wireless or wired network. In some embodiments, master controller 204 may be in communication with multiple display apparatus via a communication network. In such embodiments, master controller 204 may be configured to control the components of each display apparatus 202 that it is connected to via the communication network. In some embodiments, the communication network may include a server for facilitating communication between master controller 204 and display apparatus(es) 202.

In some embodiments, power/data supply system 230 is configured to supply at least one of power and data to one or more display apparatuses 202. Power/data supply system 230 may be connected to a power/data supply, such as power/data supply 130, that delivers power and/or data to display apparatuses 202. In some embodiments, power/data supply system 230 includes at least one power distributor 232 configured to distribute power to at least one of: products 270, cooling system 240, lighting system 250, and actuator 260. In some embodiments, power distributors 232 may be configured to deliver different voltages to at least two of: products 270, cooling system 240, lighting system 250, and actuator 260.

Cooling system 240, via a controller 241, may be configured to maintain or modify the temperature within display cavity 141. In some embodiments, cooling system 240 may include a plurality of fans 242 configured to circulate air within display cavity 141. Controller 241 may be configured to maintain or modify the temperature in display cavity 141 by controlling at least one fan 242. In some embodiments, controller 241 may be configured to maintain or modify the temperature of display cavity 141 within a determined range. In some embodiments, the determined range may be 35 degrees C. to 45 degrees C. In some embodiments, the determined range may be 40 degrees C. to 45 degrees C. In some embodiments, controller 241 may be configured to regulate the temperature within display cavity 141 so that the temperature within display cavity 141 does not exceed a predetermined value. In some embodiments, the predetermined value may be 45 degrees C. In some embodiments, controller 241 may be controlled by master controller 204. In some embodiments, controller 241 may be a sub-component of master controller 204. In some embodiments, controller 241 may operate independently of master controller 204.

Cooling system 240 may include at least one temperature sensor 244 in communication with controller 241 and configured to measure the temperature within display cavity 141. In some embodiments, controller 241 may be configured to maintain or modify the temperature within display cavity 141 based on feedback (i.e., temperature values) received from temperature sensor(s) 244. In some embodiments, controller 241 may be configured to regulate the temperature within display cavity 141 so that the temperature within display cavity 141 stays within a predetermined range or does not exceed a predetermined value based on feedback received from temperature sensor(s) 244. Temperature sensor(s) 244 may be, but are not limited to, thermocouples or thermistors.

Cooling system 240 may also include at least one audio sensor 246 in communication with controller 241. Audio sensor(s) 246 may be configured to measure ambient noise from the environment surrounding display apparatus 202. In some embodiments, controller 241 may be configured to control at least one fan 242 based on feedback (e.g., decibel levels or some other indication of noise level) received from the audio sensor(s) 246.

In some embodiments, controller 241 may be configured maintain or modify the temperature in the display cavity by at least one of: (1) turning at least one fan 242 on or off and (2) controlling the speed of at least one fan 242. In some embodiments, audio sensor(s) 246 may disposed in or on display apparatus 202. In some embodiments, audio sensor(s) 246 may be remotely located from display apparatus 202; for example, audio sensor(s) 246 may be located on the ceiling or wall of a retail store.

Figure 12:
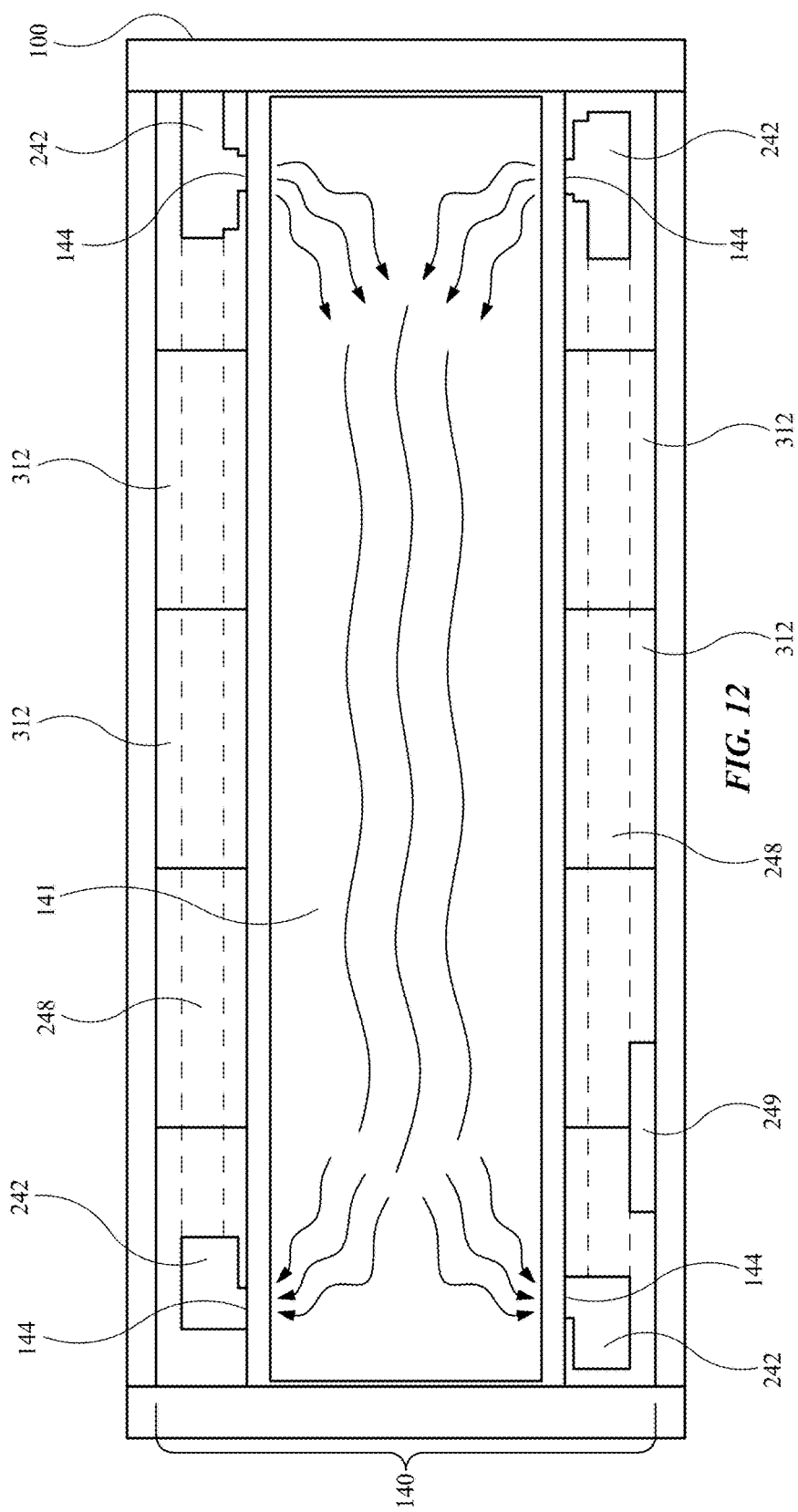
FIG. 12 shows a schematic representation of a cooling system according to some embodiments.

Cooling system 240 protects products 270 housed within display cavity 141 and the display cavity 141 itself from excessive heat. Products 270 may generate heat due to the operation of their internal electronics (e.g., processors and/or batteries). Additionally, external factors, such as sunlight or ambient temperature, may cause the temperature within display cavity 141 to rise. High temperatures within display cavity 141 may be harmful to products 270 and may result in glass panel 120 becoming undesirably warm. Cooling system 240 protects the temperature of products 270, display cavity 141, and glass panel 120 from increasing to an undesirable temperature. FIG. 12 shows a detailed view of cooling system 240 according to some embodiments and the air flow created by cooling system 240, and will be discussed in more detail below.

In some instances, a retailer may wish to control the amount of noise (i.e., decibel level) within his store. In display apparatus embodiments having fans 242 for controlling the temperature within display cavity 141, fans 242 may produce a significant amount of noise when running at certain speeds, especially if multiple display apparatuses 202 are located within a single store. High noise levels may distract consumers and retail store employees or may make conversation difficult and may create a loud and unappealing store environment. Audio sensor(s) 246 coupled to controller 241 may detect the noise in a store and determine when the decibel level within the store exceeds a first predetermined value. Once the decibel level exceeds the first predetermined value, controller 241 may be configured to turn off one or more fans 242 and/or decrease the speed of one or more fans so as to decrease the decibel level within the store. When the decibel level within the store drops below a second predetermined value (less than the first predetermined value) controller 241 may be configured resume operation of the fans 242 and/or increase the speed of fans 242.

On the other hand, a fan 242 may more effectively reduce the temperature within display cavity 141 by operating at high speed, but fan 242 may also produce more noise at high speed, which may not be desirable in a retail setting. Fan noise may be more perceptible in a low-noise environment than in a high-noise environment. In other words, ambient noise around display cavity 141 may be useful to mask fan noise. By measuring ambient noise around display cavity 141, controller 241 can set fan speed (or a maximum fan speed) based on ambient noise, to ensure that, for a given ambient noise level, fan speed does not exceed a determined amount, where that determined amount is a function of ambient noise level. This can keep fans 242 operating at an optimum speed that does not produce an undesirably perceptible noise (which may distract a consumer).

Controller 241 may include software having algorithms configured to control fans 242 based feedback from both temperature sensor(s) 244 and audio sensor(s) 246. In some embodiments, the software may be configured to prioritize temperature control over noise control.

Lighting system 250, via a controller 251, may be configured to illuminate at least a portion of display cavity 141 within display apparatus 202. In some embodiments, lighting system 250 may be configured to illuminate the entire display cavity 141. Lighting system 250 may include a light driver 252 and/or a dimmer 256 for controlling the intensity of a light source 254 disposed around the perimeter of display cavity 141. Controller 251 may be configured to turn on and off light source 254 and regulate its intensity via light driver 252 and/or dimmer 256. In some embodiments, controller 251 may be controlled by master controller 204. In some embodiments, controller 251 may be a sub-component of master controller 204. In some embodiments, controller 251 may operate independently of master controller 204. A lighting system 250 according to some embodiments is described below in greater detail with respect to FIGS. 8-10.

Actuator 260 may be configured to move a display panel (e.g. display panel 160). In some embodiments, actuator 260 may be configured to rotate display panel 160 about an edge thereof. In some embodiments, actuator 260 may be an electronic actuator controlled by master controller 204. In some embodiments, display system 200 may include a sub-controller for controlling actuator 260. In some embodiments, actuator 260 may be manually actuated by a user.

Security system 280, via controller 281, may be configured to receive signals from security switches (e.g., security switch 421) and trigger an alarm so as to alert a user (e.g., store owner) of potential theft. Security system 280, via controller 281, may also receive and send signals to lock mechanisms 340 so as to control access to display cavity 141 and/or compartments 312. In some embodiments, security system 280 may be configured to trigger an alarm in the event of unauthorized access to display cavity 141 and/or compartments 312 (e.g., opening display cavity 141 or compartment 312 may trigger a security switch). In some embodiments, controller 281 may be controlled by master controller 204. In some embodiments, controller 281 may be a sub-component of master controller 204. In some embodiments, controller 281 may operate independently of master controller 204.

Master controller 204 and controllers 241, 251, and 281 may be any suitable type of controller, such as, for example, controller chips or computing devices having a processor and a memory, such as ROM and/or RAM. Each controller may be configured to run software having algorithms configured to control the functionality of various components of table, such as cooling system 240 and lighting system 250 (e.g., using a processor). Each controller may also be configured to store the software configured to control the functionality of various component of table 100 (e.g., using a memory). In some embodiments, the controllers may include an interface, such an USB connection or wireless card, for receiving updated software. In some embodiments, master controller 204 and controllers 241, 251, and 281 are separate controllers. In some embodiments, master controller 204 and controllers 241, 251, and 281 are the same controller.

In some embodiments, the elements and systems described herein (e.g., table 100 and display system 200) may be used in conjunction with one or more of the elements and systems described in U.S. Patent Application Nos. 62/045,470, 62/045,474, and/or 62/045,457, all filed on Sep. 3, 2014 (e.g., the tables, other display apparatuses, and/or components thereof disclosed in these applications). Each of these applications is incorporated herein in its entirety by reference thereto.

Figure 5:
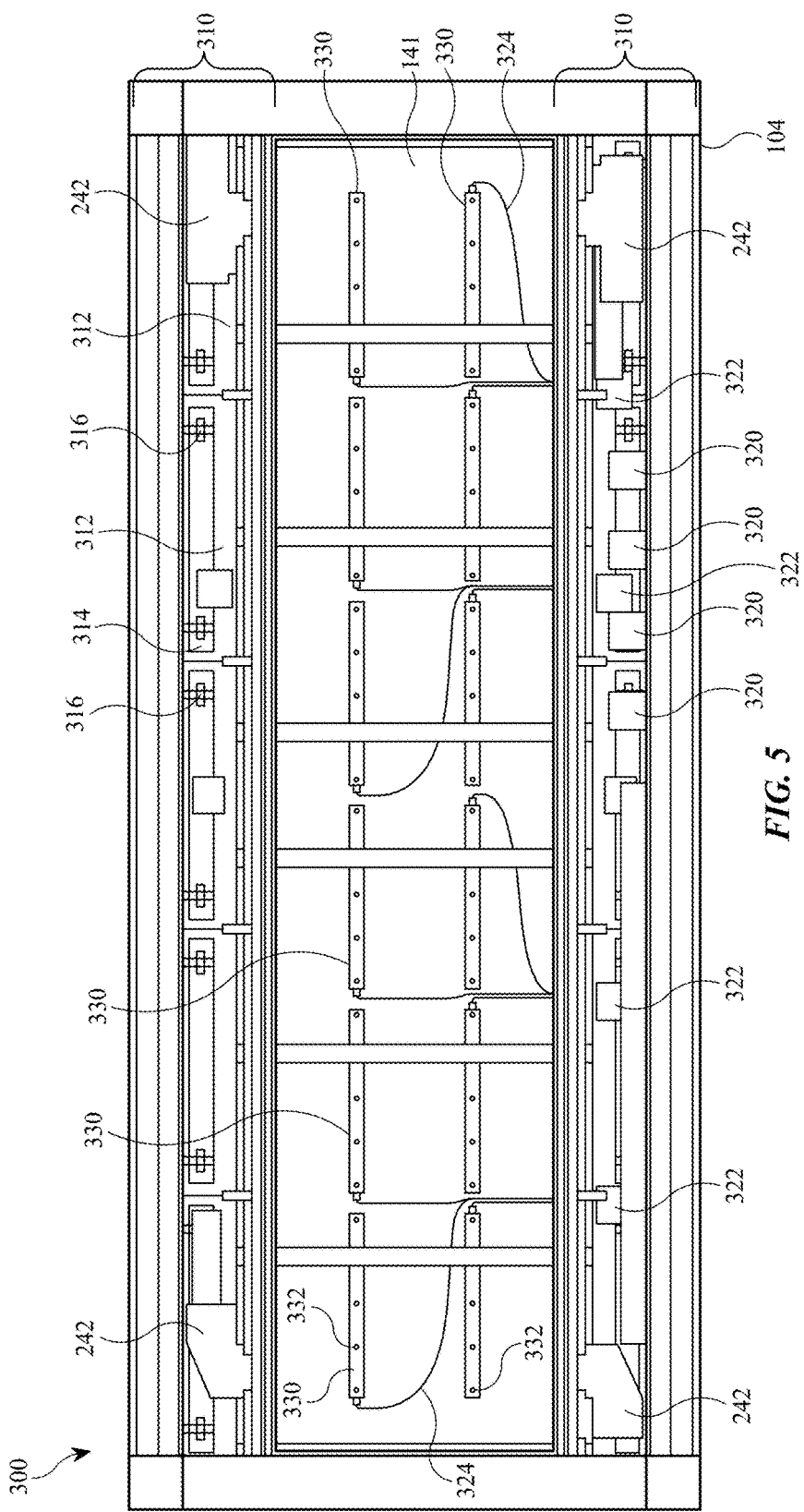
FIG. 5 shows a top plan view of part of a table top according to some embodiments.

FIG. 5 shows an electrical system 300 for table 100 according to some embodiments. Components of electrical system 300 may be disposed on or within table top 104. In some embodiments, each component of power system 300 may be disposed within table top 104 such that it is concealed within a cavity or compartment located within table top 104 or display panel 160. Concealing all the components of electrical system 300 within table top 104 creates an aesthetically appealing table that does not draw consumers' attention away from products displayed within the table top 104. Table 100 may include at least one peripheral cavity 310 disposed around the perimeter of table top 104. In some embodiments, peripheral cavity(ies) 310 may surround at least a portion of display cavity 141. In some embodiments, peripheral cavity(ies) 310 may completely surround display cavity 141 along at least two opposing sides.

Peripheral cavity 310 may include a number of compartments 312 for storing various components of electrical system 300. While certain electronic components are shown being stored in compartments 312 in FIG. 5, compartments 312 may be used to store any component within table top 104. Each compartment 312 may include a door 314 attached to table top 104 via a hinge 316 (see, e.g., FIG. 9). Doors 314 and hinges 316 may allow access to compartments 312 from underneath table top 104. In some embodiments, doors 314 may include a lock mechanism to prevent unauthorized users from accessing compartments 312. FIG. 5 shows a table top 104 having ten compartments 312 disposed along the length of table top 104, five on each side thereof, but table top 104 may include any number of compartments 312 located on any side of table top 104.

FIG. 5 shows a number of power adaptors 320 housed in various compartments 312 located in table top 104 and electrically connected to power/data supply 130. Power adaptors 320 may each be electrically connected to a power distributor 322 for distributing power and/or data to various components of electrical system 300. Power distributors 322 may provide power to every electronic component housed within table top 104, including but not limited to fans 242, printed circuit boards 330, light driver 252, light dimmer 256, temperature sensors 244, audio sensors 246, and actuator 260. Power distributors 322 may provide power to these components via a number of power cords 324.

In some embodiments, power adaptors 320 may provide 20 volts of power to power distributors 322. In turn, power distributors 322 may distribute the 20 volts to various components of electrical system 300. For example, a power distributor 322 may be configured to provide 12 volts a fan 242. Power distributors 322 may also provide power to a number of printed circuit boards 330, which in turn provide power to products 270 displayed within display cavity 141. For example, power distributor 322 may be configured to provide five volts of power to one or more printed circuit boards 330. Power distributor may be or have the characteristics of power distributors such as the power converters (including DC-to-DC power converters 1200, 1300) discussed below in reference to FIGS. 32-34B.

Figure 6:
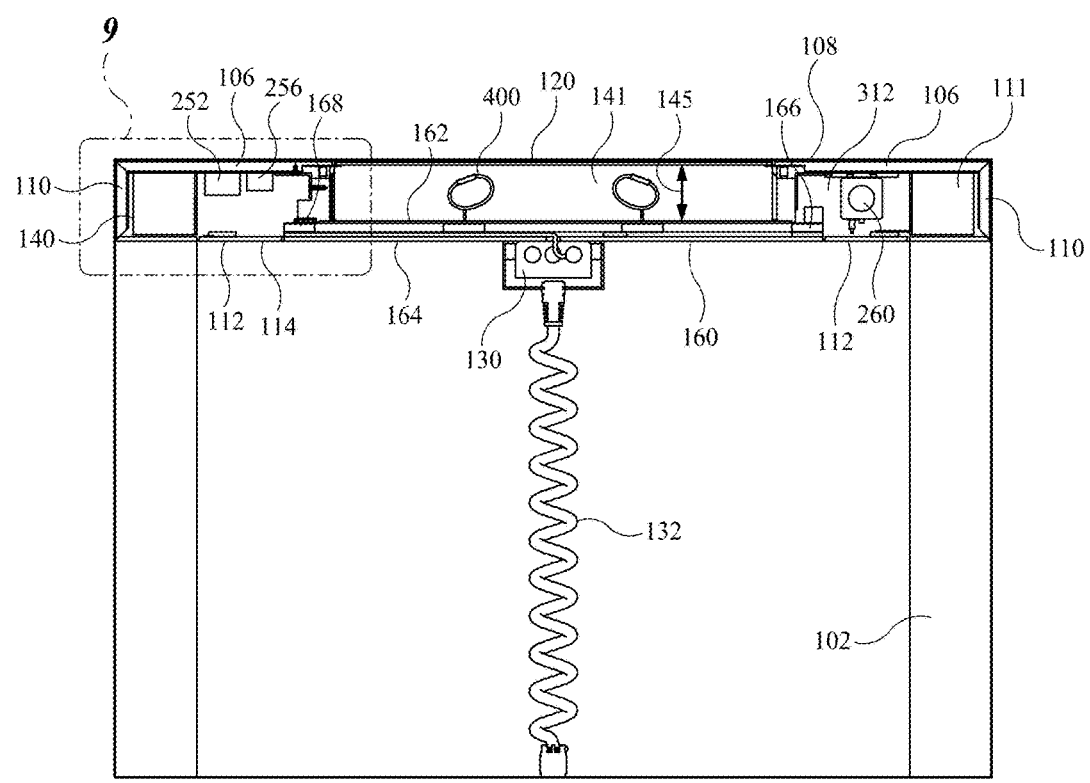
FIG. 6 shows a cross-sectional side view of a table according to some embodiments, taken along line 6-6' in FIG. 3.

FIG. 6 shows a cross-section of table 100 taken along line 6-6' of FIG. 3 (i.e., along the width of table 100). FIG. 6 shows cavity 140 formed by top wall 106, glass panel 120, side wall 110, and bottom wall 112 (including back surface 164 of display panel 610). Cavity 140 may include display cavity 141 formed near and overlapping a center 116 of table top 104 (see FIG. 8). Display cavity 141 may be recessed from top surface 108 such that it defines space within table top 104 for displaying products. In some embodiments, the center of display cavity 141 may be located at center 116. Display cavity 141 may be disposed adjacent to and between portions of peripheral cavity 310 (including compartments 312). As shown in FIG. 6, a portion of peripheral cavity 310 adjacent to side wall 110 may include a support structure 111 for providing structural integrity to table top 104. Support structure 111 may include one or more support beams made of, for example, wood, plastic, or metal.

FIG. 6 also shows actuator 260 housed within one compartment 312 on the right of display cavity 141. On the left side of display cavity 141, a compartment 312 houses light driver 252 and light dimmer 256 for controlling light source 254 for illuminating at least a portion of display cavity 141.

As shown in FIG. 6, top wall 106 may define at least a portion of top surface 108, and side wall 110 may extend downward from top wall 106 to define a perimeter of cavity 140. Glass panel 120 may define the remainder of top surface 108 and define at least a portion of the top of display cavity 141. Bottom wall 112 may define at least a portion of bottom surface 114, and a back surface 164 of display panel 160 may define the remainder of bottom surface 114. In other words, bottom wall 112 may be formed in part by display panel 160. Power/data supply 130 may be attached to back surface 164 of display panel 160. A product surface 162 of display panel 160 may define at least a portion of a bottom of display cavity 141. Product surface 162 may hold a plurality of display fixtures (e.g., display fixtures 400, see FIGS. 22 and 24A) for displaying a plurality of products (e.g., products 270) within display cavity 141. In some embodiments, display panel 160 is moveable. In some embodiments, display panel 160 is rotatable about an anchored edge 168 thereof. In some embodiments, display cavity 141 may have a height 145 ranging from 2 inches to 4 inches. In some embodiments, height 145 is 3 inches.

Figure 7:
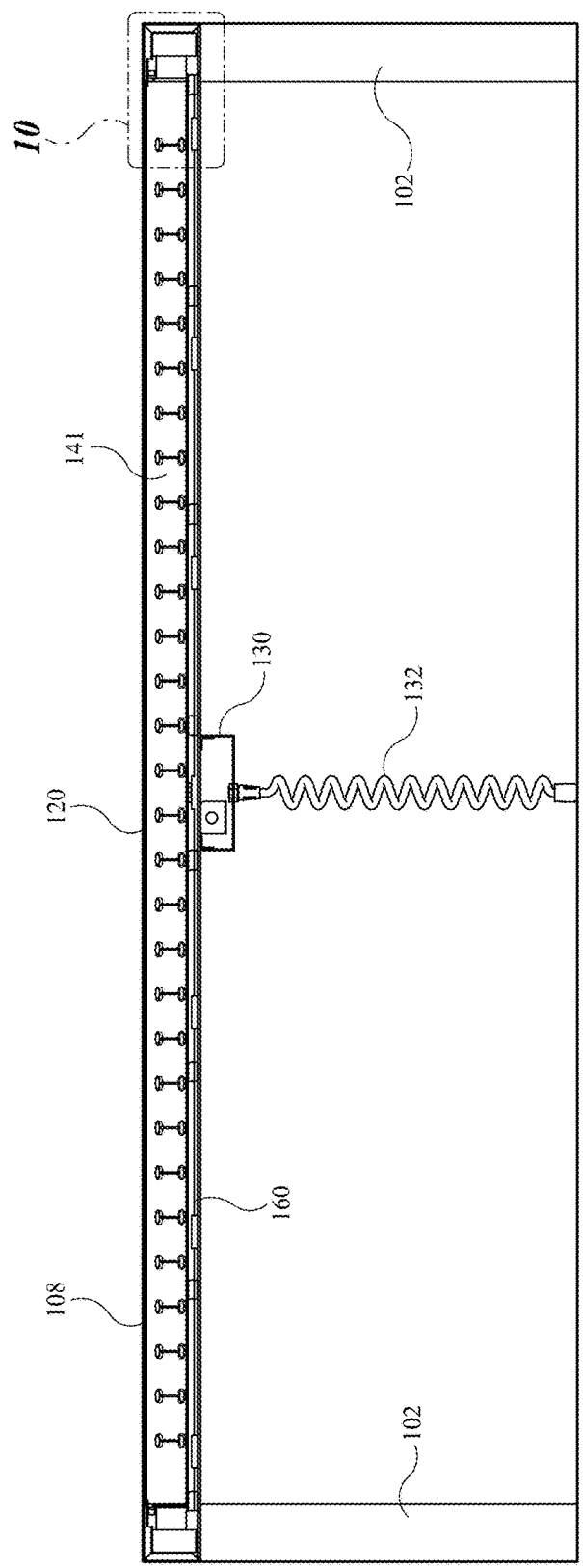
FIG. 7 shows a cross-sectional side view of a table according to some embodiments, taken along line 7-7' in FIG. 2.

FIG. 7 shows a cross-section along the length of table 100 (i.e., a cross-section perpendicular to the cross-section shown in FIG. 6). As shown in FIG. 7, display cavity 141 and glass panel 120 may extend along a substantial length of table top 104 between opposing legs 102. In some embodiments, display cavity 141 may extend along the entire length of table 100 between opposing legs 102.

Figure 8:
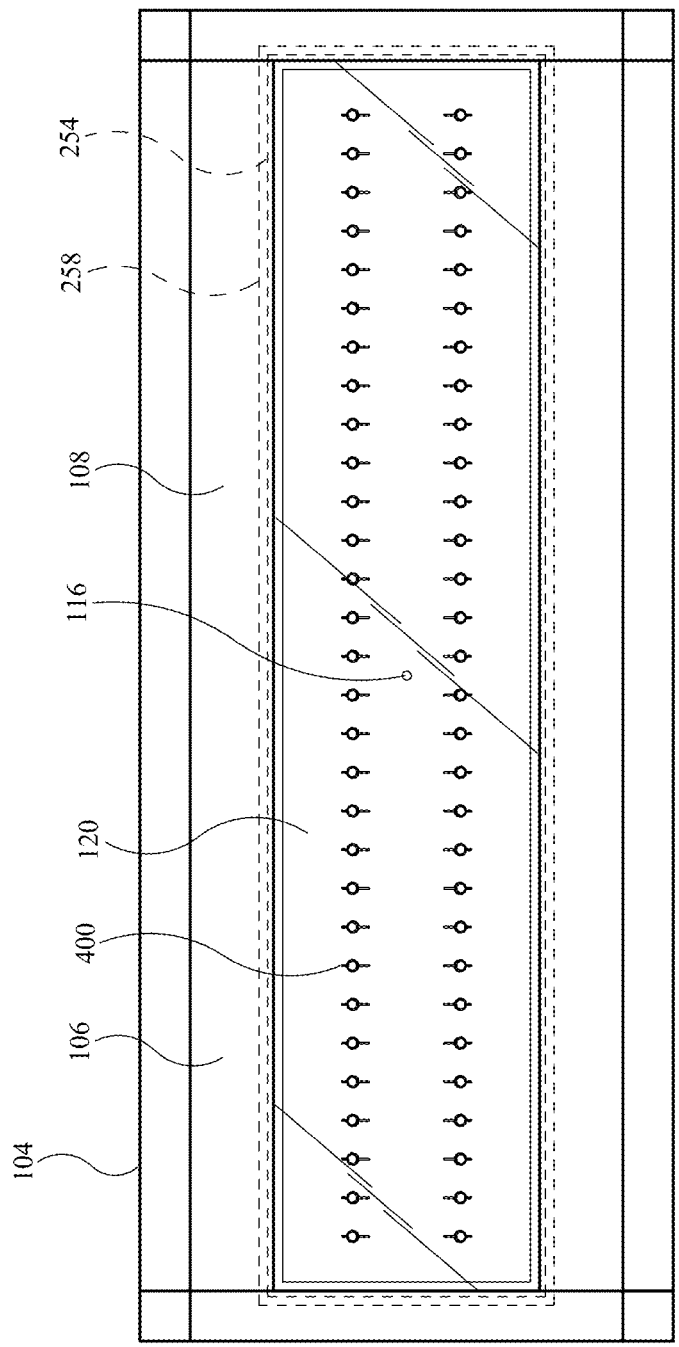
FIG. 8 shows a top plan view of a table according to some embodiments.

FIG. 8 shows a top view of table 100 showing a portion of lighting system 250 according to some embodiments. For ease of depiction, certain elements of lighting system 250 that are disposed within table 100 are shown in FIG. 8 in phantom lines, even though they would not be visible from this view in actual use. As shown in FIG. 8, table top 104 and glass panel 120 may both have a rectangular shape with glass panel 120 being smaller, in both length and width, than table top 104. As a non-limiting example, if the length of table top 104 is 7 feet, 6 inches, glass panel may have a length of approximately 6 feet, 9 inches and a width of approximately 2 feet. As another non-limiting example, if the length of table top 104 is 12 feet, 6 inches, glass panel 120 may have a length of approximately 11 feet, 9 inches and a width of approximately 2 feet. In some embodiments, the length of glass panel 120 may be greater than 75% of the length of table top 104. In some embodiments, the length of glass panel 120 may be approximately 90% of the length of table top 104. In some embodiments, the width of glass panel 120 may be greater than 30% of the width of table top 104. In some embodiments, the width of glass panel 120 may be less than 70% of the width of table top 104 (e.g., to leave some working surface that is not covering display cavity 141).

Table top 104 may include a light source 254 disposed below top wall 106 and around at least a portion of the perimeter of display cavity 141. In some embodiments, light source 254 may extend around the entire perimeter of display cavity 141, as shown in FIG. 8. Light source 254 may include a single lighting device that wraps around the perimeter of display cavity 141. Alternatively, light source 254 may include a plurality of lighting devices disposed around the perimeter of display cavity 141 (e.g., one or more along each side). A lighting device may be, but is not limited to, an inorganic LED (light emitting device), an OLED (organic light emitting device), an incandescent lighting device, or a florescent lighting device.

A lens 258 may be disposed below top wall 106 and around at least a portion of the perimeter of display cavity 141 between light source 254 and display cavity 141. In some embodiments, lens 258 may extend around the entire perimeter of display cavity 141, as shown in FIG. 8. Lens 258 may be configured to diffuse light emitted from light source 254 and direct it into display cavity 141. In some embodiments, lens 258 may be a single lens extending around the entire perimeter of display cavity 141. In some embodiments, lens 258 may include a plurality of lens segments abutted or connected together that together extend around the entire perimeter of display cavity 141 (e.g., one or more along each side). For example, lens 258 may include four lens segments, two longer sections disposed adjacent to the long sides of display cavity 141 and two shorter sections disposed adjacent to the short sides of display cavity 141. The four segments may be connected at or near the corners of display cavity 141. In some embodiments, the ends of the lens segments may include chamfered edges so as to facilitate the connections between the lens segments (e.g., by providing greater surface area for connection). Any number of lens segments may be used to form lens 258. In some embodiments, lens 258 is an acrylic lens. In some embodiments, lens 258 has a thickness of ¼ of an inch, the thickness measured in the direction from light source 254 to display cavity 141.

In some embodiments, lens 258 serves to evenly distribute light from light source 254 into display cavity 141. The position of light source 254 and lens 258 creates an even and uniform emanation of light from underneath top wall 106 into display cavity 141. In some embodiments, the position of light source 254 and lens 258 causes glass panel 120 to appear as if is floating above display cavity 141 (e.g., by directing light into display cavity 141 and minimizing directing light directly up through glass panel 120 from lens 258). This may create an aesthetically appealing table 100 that focuses a consumer's attention on display cavity 141 and the products displayed therein. By diffusing light into display cavity 141, lens 258 may also increase the efficiency of lighting system 250 by optimizing the distribution of light from light source 254.

Figure 9:
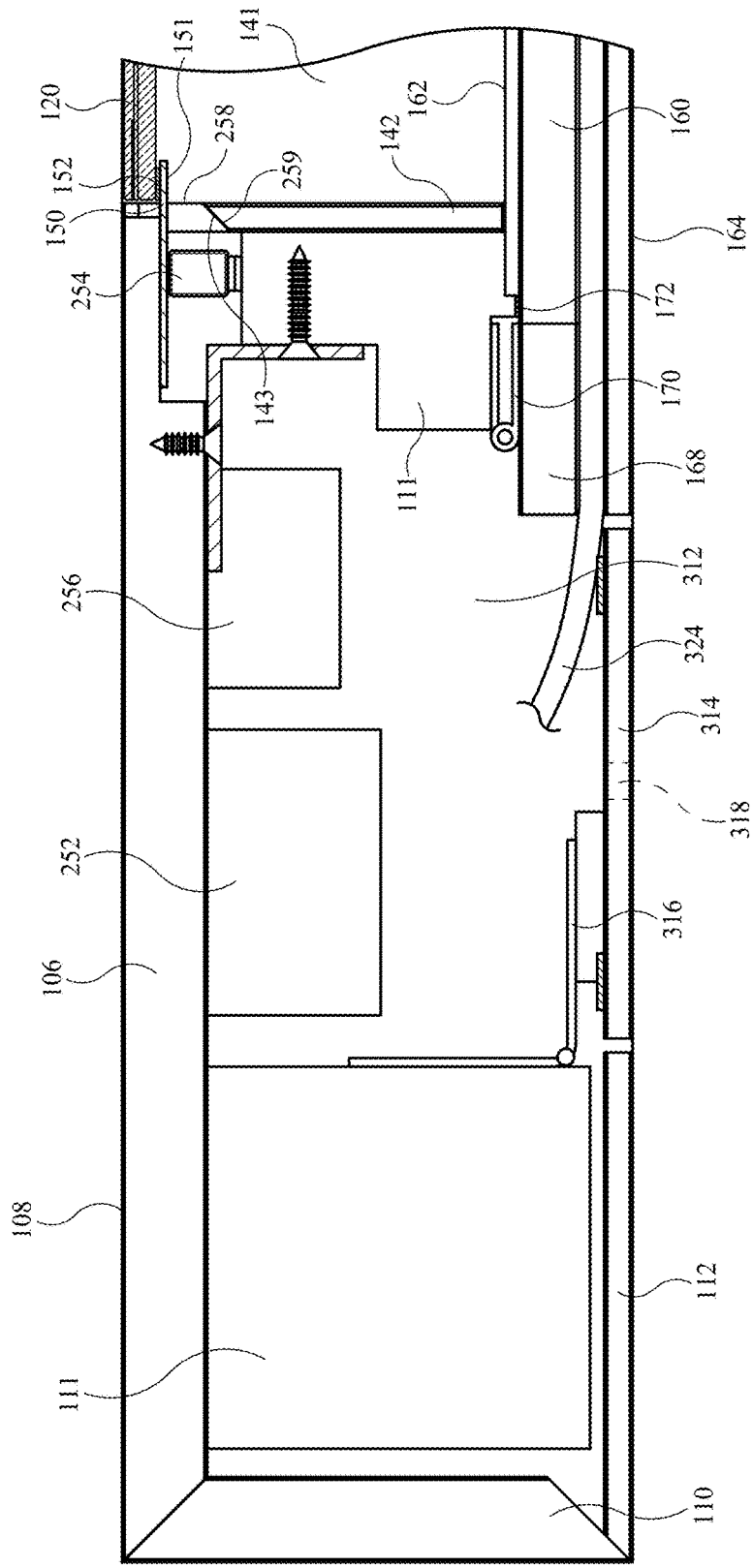
FIG. 9 shows an enlarged cross-sectional view of a portion of the table shown in FIG. 6.

FIG. 9 shows an enlarged cross-section of area 9 of FIG. 6 showing details of a compartment 312 for housing lighting components. The compartment 312 shown in FIG. 9 may be accessed via door 314 located adjacent to bottom wall 112 of table top 104. Hinge 316, which allows door 314 to be opened and closed, may fixed to support structure 111 within table top 104. As shown in FIG. 9, light driver 252 and dimmer 256 may be housed within compartment 312. In some embodiments, light driver 252 and/or dimmer 256 may be fixed to the bottom of top wall 106. Both light driver 252 and dimmer 256 may be electrically connected to light source 254 disposed within compartment 312. In some embodiments, light source 254 may be disposed within compartment 312 underneath top wall 106 adjacent to a display cavity side wall 142.

Display cavity side wall 142 may separate compartment 312 from display cavity 141. As shown in FIG. 9, lens 258 may form part of display cavity side wall 142 such that surfaces of lens 258 and side wall 142 facing display cavity 141 are aligned. In such embodiments, lens 258 and display side wall 142 may include a first angled edge 143 and a second angled edge 259, respectively, to facilitate attachment of display side wall 142 and lens 258 (e.g., by providing greater surface area for connection, such as, for example, by adhesive). Lens 258 may be disposed underneath a ledge 150 that is attached to the bottom of top wall 106. In some embodiments, lens 258 may be in direct contact with the underside 151 ledge 150. In some embodiments, the underside 151 of ledge 150 may be coated with a non-reflective material. Coating underside 151 of ledge 150 with a non-reflective material may facilitate an even and uniform emanation of light into display cavity 141, while blocking direct transmission of light from lens 258 through glass panel 120 to contribute to the floating effect of glass panel 120 as described above. The non-reflective material may be, but is not limited to, black paint.

Ledge 150 may extend within display cavity 141 about a periphery of the display cavity 141. In some embodiments, ledge 150 may extend into display cavity 141 by a length 154 (see FIG. 11). In some embodiments, length 154 may be measured perpendicularly from a vertical wall 107 of top wall 106 (e.g., towards the center of display cavity 141 (i.e., center 116 of table top 104)). In some embodiments, length 154 may range from 8 millimeters to 11 millimeters. In some embodiments, length 154 may be 9.4 mm (approximately ⅜ of an inch).

Figure 10:
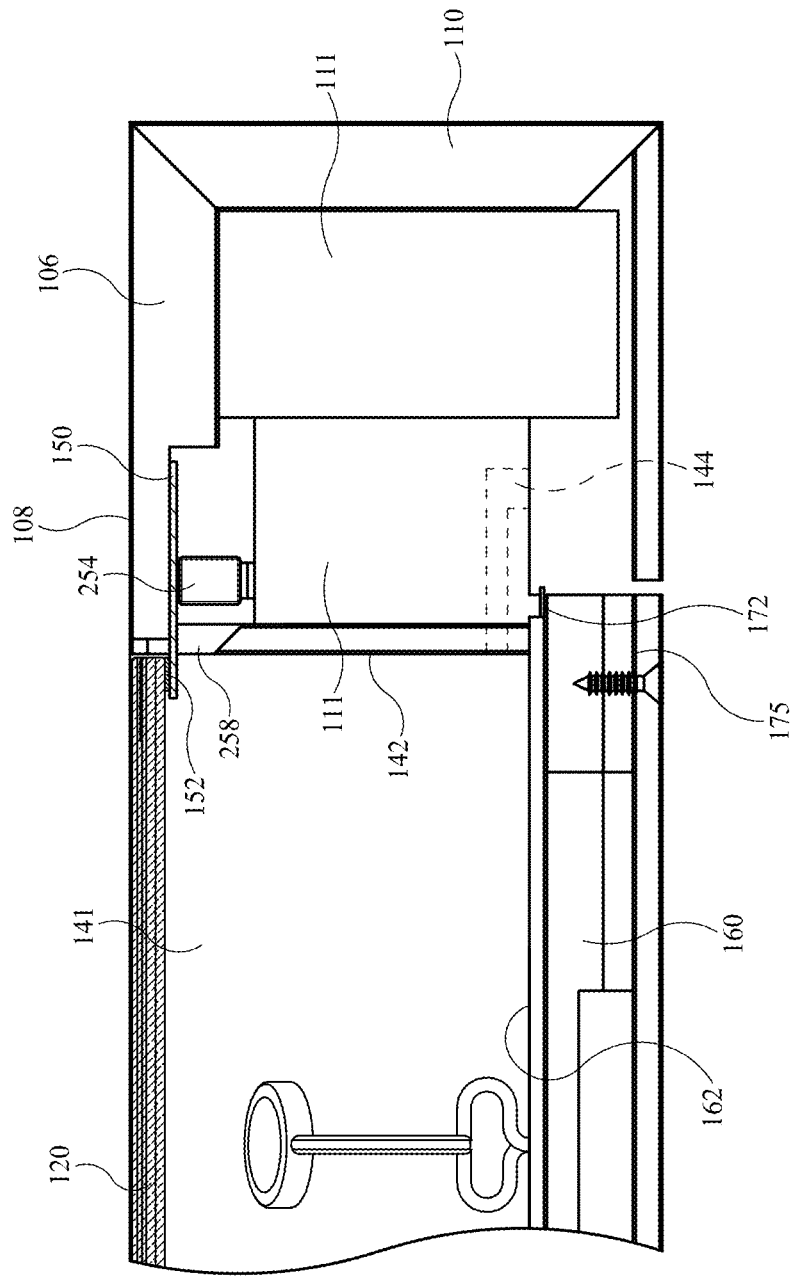
FIG. 10 shows an enlarged cross-sectional view of a portion of the table shown in FIG. 7.

In some embodiments, display cavity side wall 144 may include a gap 144 (see e.g., FIG. 17) for allowing air from fans 242 to flow into and out of display cavity 144. In some embodiments, gap 144 may be a continuous gap formed along a portion of display cavity side wall 144. In some embodiments, display cavity side wall 144 may include a plurality of discrete gaps 144 located in positions corresponding to the locations of fans 242. In some embodiments, gaps 144 may be formed at or adjacent to the bottom of display cavity side wall 144. As shown in FIG. 10, gap(s) 144 may also be formed in part of support structure 111. In some embodiments, gap(s) 144 may be 5 mm in height.

Referring to FIG. 9, a panel hinge 170 may be connected to anchored end 168 of display panel 160. In some embodiments panel hinge 170 may be fixed to table top 104 via support structure 111. In some embodiments panel hinge 170 may encompass a plurality of discrete hinges spaced apart along anchored end 168 of display panel 160. In some embodiments panel hinge 170 may be a continuous hinge extending along the length of anchored end 168 of display panel 160 (e.g., a piano hinge). Display panel 160 may rotate about panel hinge 170 and, in some embodiments, compartment 312 may provide space to allow anchored end 168 of display panel 160 to freely rotate about panel hinge 170. Anchored end 168 of display panel 160 may also include a seal member 172. Seal member may seal with an internal component of table top 104, such as support structure 111. In some embodiments, seal member 172 may be disposed on product surface 162 near the perimeter of display panel 160 so as to at least partially seal the bottom of display cavity 141. Seal member 172, in conjunction with a gasket 152 on ledge 150 may serve to at least partially seal display cavity 141 from the environment surrounding table 100. Gasket 152 may be disposed on a top side 153 of ledge 150 and in contact with glass panel 120. In some embodiments gasket 152 may include adhesive on both its upper and lower surfaces, to fix glass panel 120 to ledge 150. In some embodiments, gasket 152 may wrap around the entire perimeter of display cavity 141 so as to completely seal the top of display cavity 141. At least partially sealing the top and/or bottom of display cavity 141 may facilitate efficient operation of cooling system 240. But, display cavity 141 may remain unsealed in some locations, e.g., at gaps 144 and in other portions of table top 104 so as to allow air to flow into and out of display cavity 141 and allow for air exchange with the environment outside table 100.

FIG. 10 shows an enlarged cross-section of area 10 of FIG. 7 showing the details of a portion of peripheral cavity 310 disposed adjacent to display cavity 141. FIG. 10 shows light source 254, lens 258, and ledge 150 disposed around the perimeter of display cavity 141. FIG. 10 also shows side edge 175 of display panel 160, which may be perpendicular to free end 166 and anchored end 168. Side edge 175 may engage the bottom of display cavity side wall 142 and may have seal member 172 disposed thereon.

Figure 11:
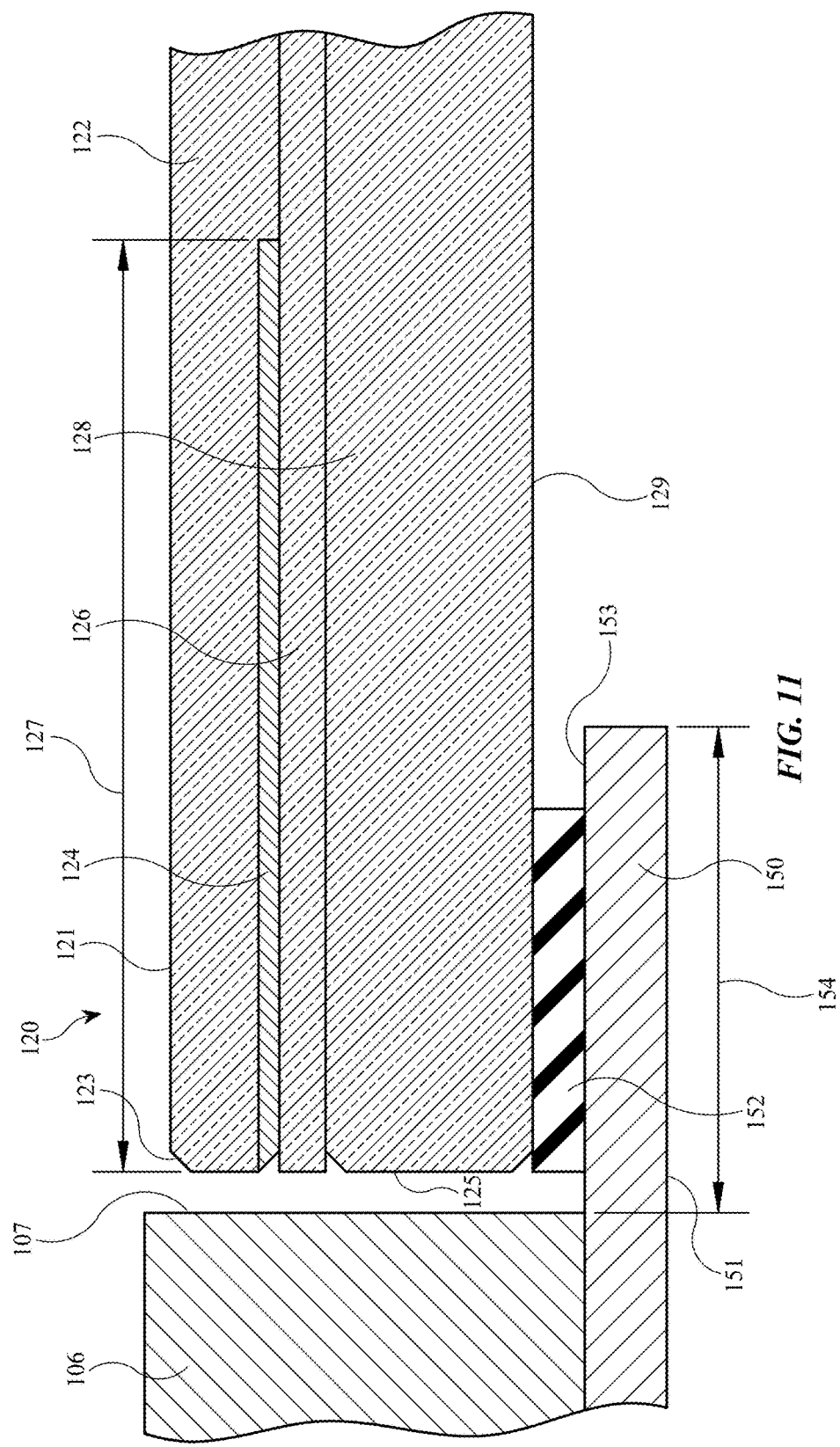
FIG. 11 shows an enlarged cross-sectional side view of a portion of a glass panel according to some embodiments.

FIG. 11 shows an enlarged view of glass panel 120 according to some embodiments. Glass panel 120 may include a top glass layer 122 defining a glass top surface 121 and a bottom glass layer 128 defining a glass bottom surface 129. Glass top surface 121 may form a portion of top surface 108 of table top 104 and glass bottom surface 129 may define at least a portion of the top of display cavity 141. A glass panel side wall 125 may be disposed adjacent to vertical wall 107 of top wall 106. In some embodiments, glass panel side wall 125 may be disposed less than or equal to 1 millimeter (e.g., approximately ¹⁄₃₂ of an inch) from vertical wall 107. In some embodiments, glass panel side wall 125 may be in direct contact with vertical wall 107. Glass top surface 121 may be flush with the top of top wall 106, meaning that glass top wall 121 is parallel to and coplanar with the top of top wall 106 at their interface(s) (e.g., aligned within a tolerance of +/−3 millimeters (approximately ⅛ of an inch). In some embodiments, glass top surface 121 may be located above or below the top of table top wall 106. For example, glass top surface 121 may be located 0.5 mm below the top of top wall 106. In some embodiments, top glass layer 122 may include a chamfered edge 123 located along the perimeter of top glass layer 122. In some embodiments, top glass layer 122 and/or bottom glass layer 128 may be tempered glass.

Glass panel 120 may also include an ink film 124 disposed between top glass wall 122 and bottom glass wall 128. In some embodiments, glass panel 120 may include an intermediate adhesive layer 126 disposed between top glass wall 122 and bottom glass wall 128. Intermediate layer 126 may be disposed between ink film 124 and bottom glass wall 128, as shown in FIG. 11. Alternatively, intermediate layer 126 may be disposed between ink film 124 and top glass wall 122.

In some embodiments, the thickness of glass panel 120 may range from 7 millimeters to 8 millimeters +/−0.5 millimeters. In some embodiments, the thickness of glass panel may be 7.5 millimeters. In some embodiments, the thickness of top glass layer 122 may range from 2.0 millimeters to 2.2 millimeters. In some embodiments the thickness of top glass layer 122 is 2.1 millimeters. In some embodiments, the thickness of ink film 124 is less than 25% the thickness of glass panel 120, or less than 10% the thickness of glass panel 120 (e.g., less than 1 millimeter). In some embodiments, the thickness of intermediate layer 126 may range from 0.8 millimeters to 1 millimeter. In some embodiments, the thickness of intermediate layer 126 is 0.9 millimeters. In some embodiments, the thickness of bottom glass layer 128 may range from 3.8 millimeters to 4.2 millimeters. In some embodiments, the thickness of bottom glass layer is 4 millimeters.

Ink film 124 may be screen printed onto either top glass layer 122, as shown in FIG. 11, or onto bottom glass layer 128. In some embodiments, ink film 124 may be disposed along the perimeter of glass panel 120 and may extend from glass side wall 125 towards the center of glass panel 120 (i.e., center 116 of table 100). Ink film 124 may be in the shape of a strip disposed about the perimeter of glass panel 120. In other words, ink film 124 may have a hollow shape, that hollow shape corresponding to the shape of display panel 120. In some embodiments, ink film 124 may extend a distance 127 from glass side wall 125 towards the center of glass panel 120. In some embodiments, distance 127 may range from 16 millimeters to 20 millimeters. In some embodiments, distance 127 may be 18 millimeters. In some embodiments, distance 127 is greater than length 145 (and therefore hides ledge 150 from view). In some embodiments, distance 127 may be more than 150% of length 145, but less than 250% of length 145. For example, if length 145 is 9.4 millimeters (approximately ⅜ of an inch), distance 127 may be 18 millimeters. In some embodiments, ink film 124 may have a constant distance 127 around the perimeter of glass panel 120. In some embodiments distance 127 may vary. For example, distance 127 may be larger along the length of glass panel 120 than along the width of glass panel 120. In some embodiments, distance 127 may be dependent on the length and width of glass panel 120. But in some embodiments, distance 127 is always greater than length 145 at all positions along the length and width of glass panel 120.

Ink film 124 creates a sharp and consistent boarder around display cavity 141. In some embodiments, ink film 124 serves to conceal ledge 150 and gasket 152 from a consumer's view, and to conceal lens(es) 258. This can contribute to an aesthetically appealing display area that focuses a consumer's attention on the products displayed within display cavity 141, rather than features of table 100. Ink film 124 may also facilitate even and uniform emanation of light from underneath top wall 106 and help make glass panel 120 appear as if it is floating above display cavity 141.

FIG. 12 shows a schematic representation of the air flow within display cavity 141 created by fans 242 of cooling system 240 according to some embodiments. As shown in FIG. 12, table 100 may include four fans 242, two located on one side of table 100 (e.g., for pushing air into display cavity 141) and two located at the opposing side of table 100 (e.g., for pulling air out of display cavity 141). Each fan 242 may be housed in a compartment 312, which are located around the periphery of display cavity 141. Display cavity side wall 142 may have gaps 144 formed therein extending along the perimeter of display cavity 141 and/or disposed discretely at locations corresponding to each fan 242 (see, e.g., FIGS. 10 and 17). Air may flow into or out of display cavity 141 through gaps 144. In some embodiments, push fans 242 may draw air from the environment located around table 100 and push it into cavity 141, and pull fans 242 may pull air from cavity 141 and expel it into the environment located around table 100.

In some embodiments, fans 242 may be connected with tubing 248 so as to create a closed-air circulation loop. In such embodiments, fans 242 may recirculate air into and out of display cavity 141 in a closed loop. In some embodiments, the air circulated within display cavity 141 may be cooled, for example by a refrigeration mechanism 249, before being introduced into display cavity 141. Refrigeration mechanism 249 may be connected to fans 242 and/or tubing 248 and may be controlled by controller 241 to maintain a desired temperature. In some embodiments, the push fans 242 may include or may be in communication with an air filter (e.g., a high-efficiency particulate air (HEPA) filter) to minimize the introduction of dust or other contaminates into display cavity 141. In some embodiments, tubing 248 may include an air filter. Compartments 312 may provide access to the HEPA filters such that they can be replaced without disassembling table 100.

Figure 13:
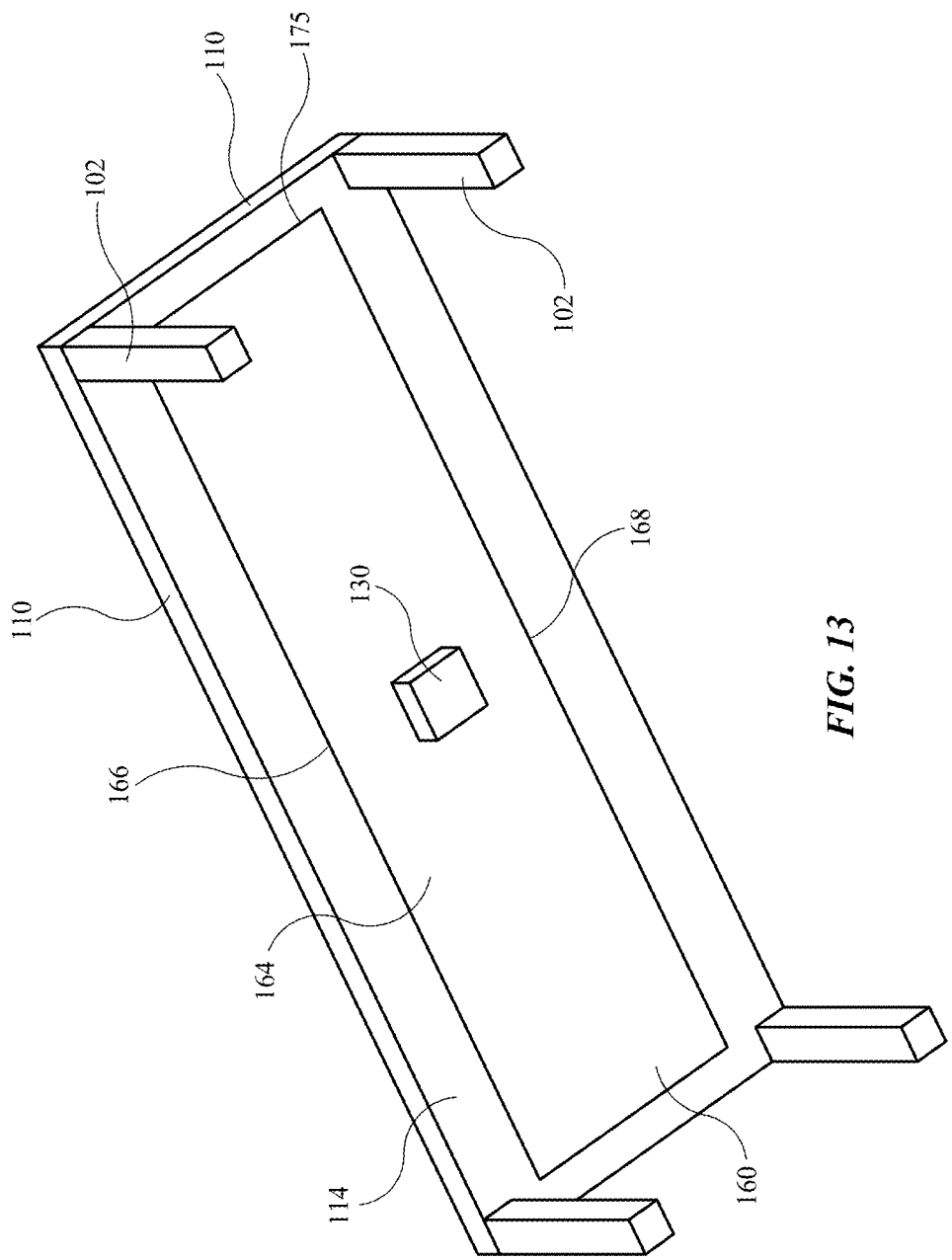
FIG. 13 shows a bottom perspective view of a table according to some embodiments.
Figure 14:
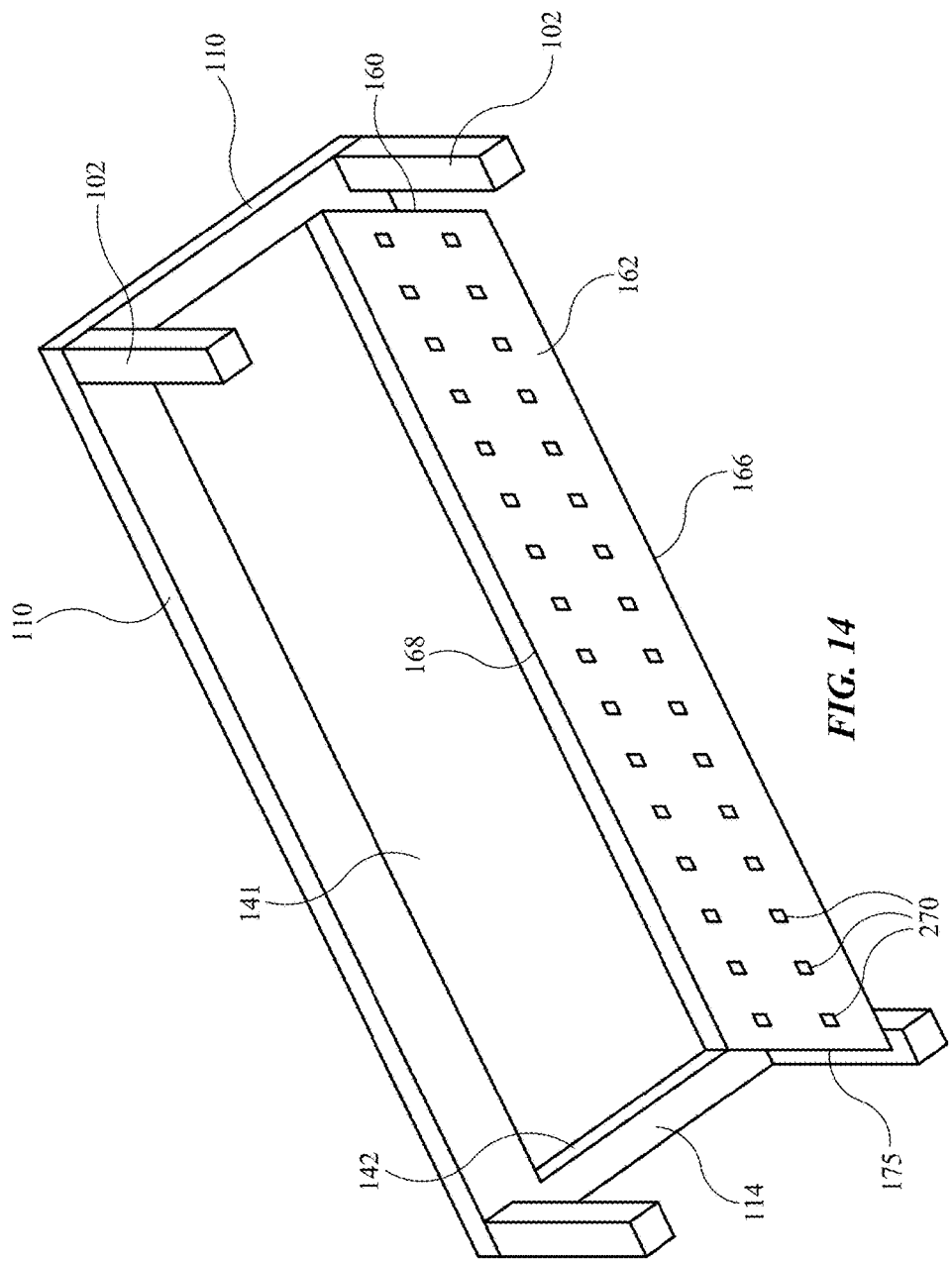
FIG. 14 shows a bottom perspective view of a table according to some embodiments.
Figure 15:
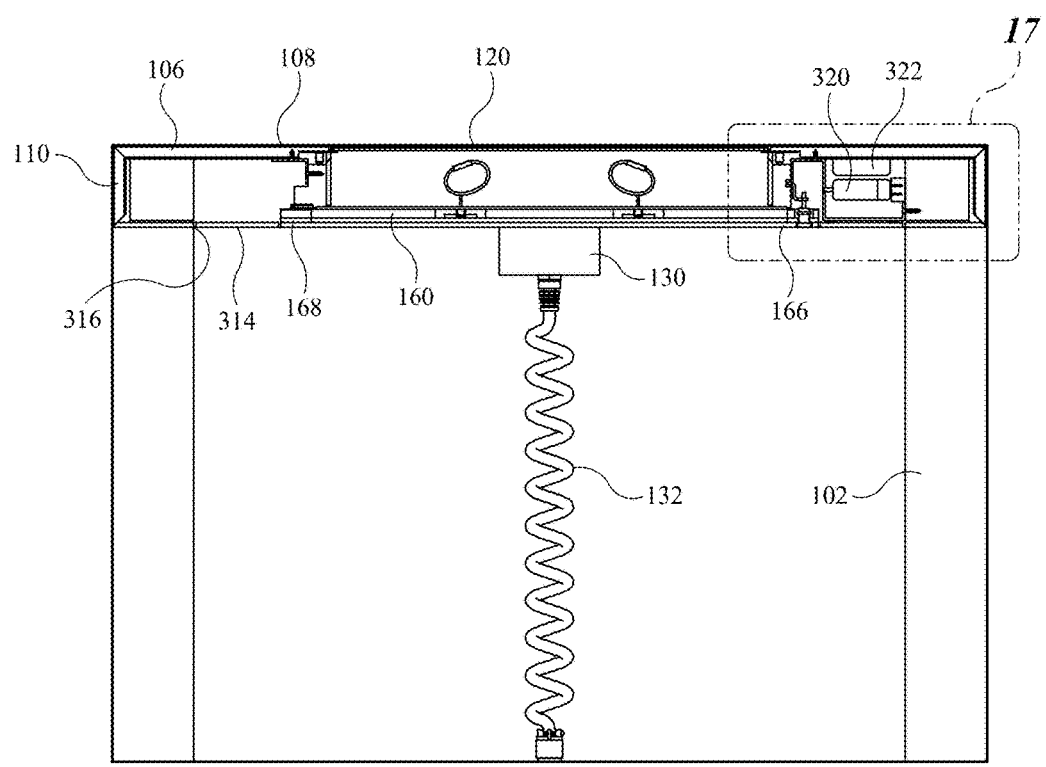
FIG. 15 shows a cross-sectional side view of a table according to some embodiments, taken along line 15-15' in FIG. 3.
Figure 16:
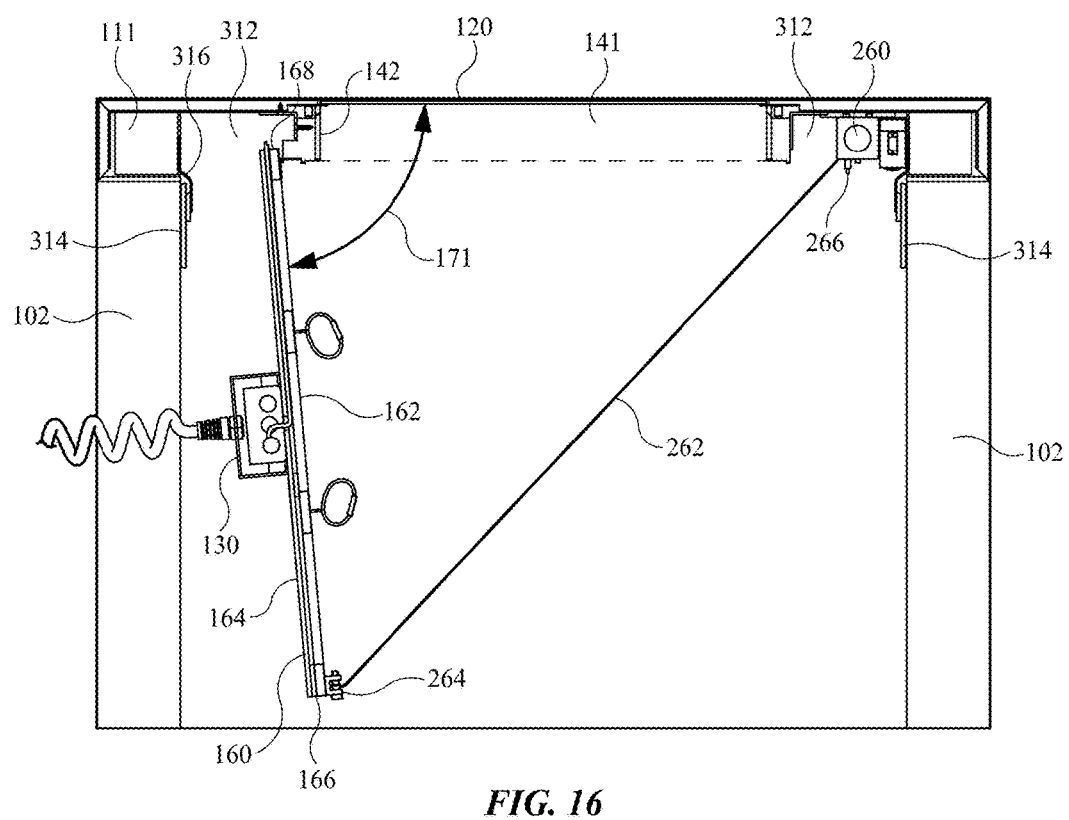
FIG. 16 shows a cross-sectional side view of a table according to some embodiments, taken along line 6-6' shown in FIG. 3.

FIGS. 13 and 14 show bottom perspective views of table 100 and demonstrate the rotation of display panel 160 about anchored end 168. FIGS. 15 and 16 show corresponding cross-sectional views demonstrating the rotation of display panel 160. In a first, closed position, as shown in FIGS. 13 and 15, back surface 164 of display panel 160 may be flush with bottom surface 114 of bottom wall 112. Similarly, product surface 162 may be parallel to glass panel 120 in the first closed position.

In a second, open position, as shown in FIGS. 14 and 16, display panel 160 is rotated about its anchored end 168 such that it extends at least partially downward from the bottom of table 100. In the open position back surface 164 is oriented at an angle 171 relative to bottom surface 114 of bottom wall 112. Similarly, product surface 162 is oriented at angle 171 relative to glass panel 120. In some embodiments angle 171 may be greater than 45 degrees (e.g., maximum angle 171 may be greater than 45 degrees). In some embodiments angle 171 may be 80 degrees (e.g., maximum angle 171 may be 80 degrees). In some embodiments angle 171 may be less than 90 degrees (e.g., maximum angle 171 may be less than 90 degrees). A maximum angle 171 of less than 90 degrees may help to prevent display fixtures (e.g., display fixtures 400, see FIGS. 11 and 24A) and displayed products 270 from falling out of recesses in display panel 160 when in the open position. Rotating display panel 160 to the open position allows a user, such as a retail store employee, to access products 270 displayed on product surface 162. In some embodiments, table 100 may include a mechanical and/or electrical stop configured to cause display panel 160 to stop rotating once it reaches the second open position (i.e., when angle 171 reaches a maximum).

Rotating display panel 160 from the bottom of table 100 helps conceal mechanical components, such as hinges, that are used to rotate display panel 160. Additionally, by rotating display panel 160 from the bottom of table 100, a user can access products displayed on product surface 162 without having to remove glass panel 120 from the top of table 100.

As shown in FIGS. 15 and 16, actuator 260 may be used to move display panel 160 from the closed position to the open position. Actuator 260 may be an electronic automated device such as, but not limited to, an electronic motor. In some embodiments, actuator 260 may be manually actuated by a user (e.g., a crank-operated winch). A cord 262 may be attached to actuator 260 and an attachment feature 264, such as, for example, a hook or eye-bolt, attached to free end 166 of display panel 160. Cord 262 may be extended from and retracted into actuator 260 to lower and raise free end 166, which in turn causes display panel 160 to rotate about anchored end 168 via panel hinge 170. In other words, actuator 260 may rotate display panel 160 by adjusting the length of cord 262. In some embodiments, table 100 may include multiple actuator assemblies (including actuator 260, cord 262, and attachment feature 264). In such embodiments, actuator assemblies may be evenly spaced along free end 166 of display panel 160 to evenly distribute the weight of display panel 160. In such embodiments, the multiple actuator assemblies may be independently operable or may all be simultaneously operated by the same control mechanism 266 (described below).

As shown in FIG. 16, compartments 312 located on opposite sides of display cavity may house actuator 260 and provide space for anchored end 168 to freely rotate. A door 314 associated with each compartment 312 may be opened as shown in FIG. 16 to allow access to the compartments 312. Since anchored end 168 of display panel may extend along the entire length of display panel 160, each compartment 312 located near anchored end 168 may be opened to allow display panel to move to the open position. In some embodiments, display panel 160 may be configured to rotate about panel hinge 170 such that anchored end 168 does not require the space within compartment(s) 312 to freely rotate. In addition to rotating display panel 160 between the closed position and the fully open position, actuator 260 may be used to rotate display panel 160 to any position in between these positions, (e.g., to a partially-open position). In some embodiments, table 100 may not include an actuator 260, and display panel 160 may be manually lowered and raised from the bottom of table 100 by a user.

In some embodiments, actuator 260 may be operated by a controller (e.g., master controller 204 or a separate dedicated controller) that receives a signal from a control mechanism 266. The signal may cause the actuator to extend or retract cord 262 to thereby open or close display panel 160. Control mechanism may be, for example, a keyed hole for receiving a key, a button, a mechanical switch, and/or a sensor.

Types of sensors that may be used in accordance with the embodiments described herein include, but are not limited to, fingerprint sensors, radio-frequency identification (RFID) sensors, motion sensors, capacitive touch sensors, and bar code (including quick response (QR) code) scanners. A motion sensor may send a signal in response to sensing the motion of an object, such as a hand. A capacitive touch sensor may send a signal in response to sensing a touch, for example, the touch of a finger. An RFID sensor may send a signal upon sensing identification information on an employee's or technical assistant's RFID card. A bar code scanner may send a signal upon reading a bar code associated with, for example, an employee or technical assistant.

Sensors such as fingerprint sensors, RFID sensors, or bar code readers may provide increased security within a retailer's store. Such sensors would prevent display panel 160 from being deployed and accessed by an unauthorized person, thereby minimizing opportunity for theft of products 270 in display cavity 141. In some embodiments, the sensor may be located on table 100. In some embodiments, the sensor may not be located on table 100. For example, the sensor may be located on a wall or chair near table 100, or other remote locations.

Figure 17:
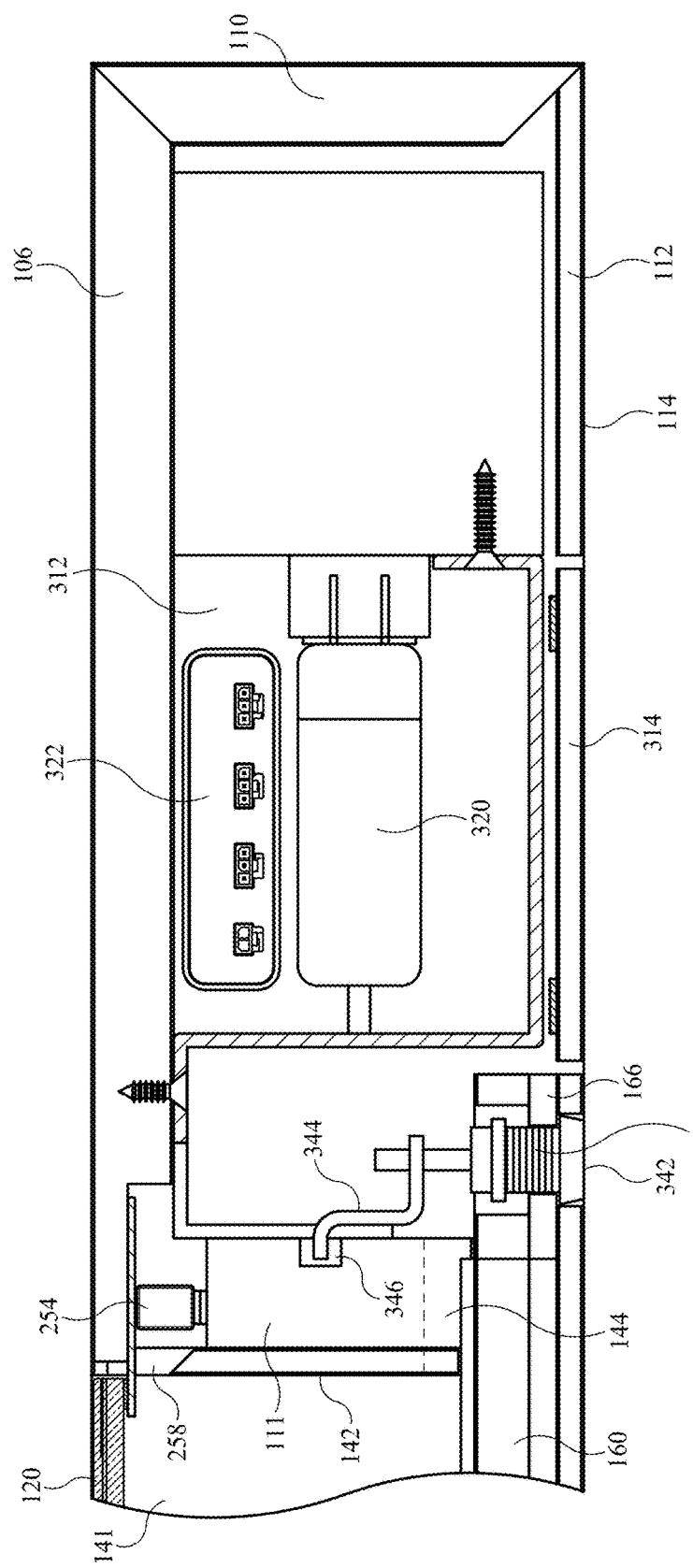
FIG. 17 shows an enlarged cross-sectional view of a portion of the table shown in FIG. 15.

FIG. 17 shows an enlarged cross-section of area 17 of FIG. 15 showing details of a lock mechanism 340 for preventing the movement of display panel 160. Lock mechanism 340 may be attached to free end 166 of display panel 160 and configured to fit within a compartment 312 located in peripheral cavity 310 of table top 104. Lock mechanism 340 may include a lock actuator 342 that may be accessible from underneath table 100. In some embodiments, lock actuator 342 may be disposed on bottom surface 114 of table top 104, and may be configured to rotate a latch 344 into and out of a locking recess 346 formed in a portion of support structure 111 within table top 104. Lock actuator 342 may be controlled by, for example, a keyed hole for receiving a key, a button, a mechanical switch, and/or a sensor. Such a sensor may be, for example, any of the sensors described above with respect to control mechanism 266.

Lock actuator 342 may be configured to rotate a latch 344 into and out of locking recess 346 formed in a portion of support structure 111 within table top 104. When latch 344 engages locking recess 346, as shown in FIG. 17, free end 166 of display panel is prevented from moving. When latch 344 is disengaged from locking recess 346 free end 166 may be lowered either manually or via actuator 260. Also, when latch 344 is engaged, it helps support display panel 160 in the closed position, sharing the load of display panel 160 with cord 262. Table 100 may include multiple lock mechanisms 340. In such embodiments, lock mechanisms 340 may be evenly spaced along free end 166 of display panel 160 to evenly distribute the weight of display panel 160.

In some embodiments, lock actuator 342 may be in communication with a controller, such as master controller 204, and may be controlled by the controller. Locking mechanism 340 may help control authorized access to display cavity 141 because only authorized users having the correct key, RFID badge, etc. may access display cavity 141. In embodiments wherein lock actuator 342 is for example, a fingerprint reader or an RFID sensor, and/or in embodiments where lock actuator is in communication with a controller, such as master controller 204, access to a display cavity 141 may be strictly and automatically controlled by a user. In some embodiments, master controller 204 may accept a password from a user to lock or unlock lock mechanism 340.

In some embodiments, lock mechanism 340 may be locked or unlocked and/or display panel 160 may be rotated between the closed and open positions in response to a first signal and a second signal from a sensor, where the sensor is a barcode (including quick response (QR) code) or radio frequency identification (RFID) scanner, or any other sensor such as, for example, other sensors described herein. For example, the scanner may be configured to read bar codes or RFID chips associated with persons or devices, e.g., store employees such as salespeople and technical support personnel. Additionally, the scanner may be configured to send first and second signals in response to scanning a barcode or RFID chip associated with authorized personnel. In response to the first signal, a controller, such as master controller 204, may cause actuator 260 to rotate display panel 160 from the closed position to the open position. In response to receiving the second signal, master controller 204 may rotate display panel 160 back to the closed position. Lock mechanism 340 may be locked or unlocked and/or display panel 160 may be rotated in a similar fashion for other types of lock actuators such as, but not limited to, a button, a mechanical switch, a fingerprint sensor, a motion sensor, and a capacitive touch sensor.

While a lock mechanism 340 according to some embodiments is shown and described in reference to FIGS. 15 and 17, any type of lock mechanism may be used. For example, different mechanical lock mechanisms or magnetic lock mechanisms may be used to prevent the movement of display panel 160 from the closed position to the open position. The configuration of the compartment 312 configured to house locking mechanism 340 may prevent unwanted tempering with lock mechanism 340.

Figure 18:
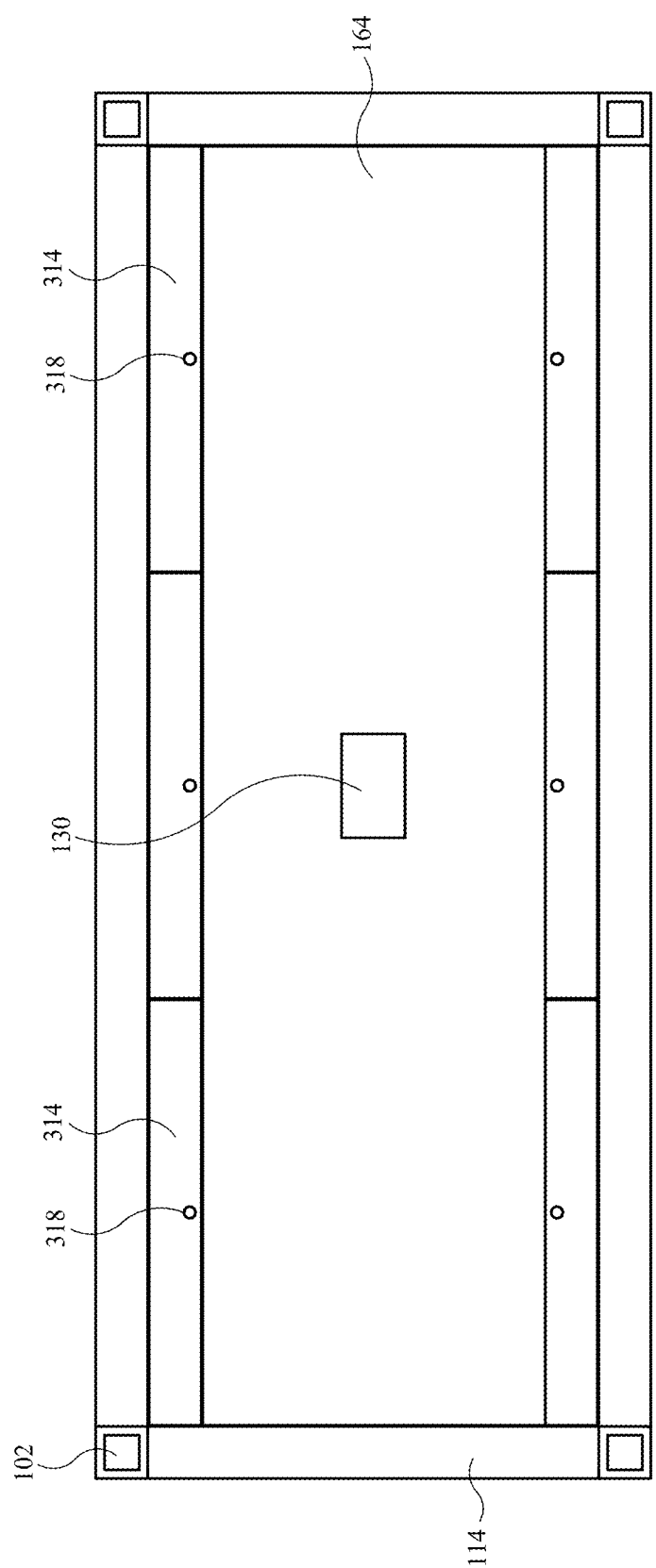
FIG. 18 shows bottom view of a table according to some embodiments.

FIG. 18 shows a bottom view of table 100 according to some embodiments. As shown in FIG. 18, each door 314 may include a finger hole 318 for allowing a user to open door 314 and access a corresponding compartment 312. Finger holes 318 may also allow heat from electronics housed within compartments to more easily escape, thus helping to prevent overheating. Finger holes 318 may also allow air intake and exhaust for cooling system 240 (e.g., for fans 242). In some embodiments, finger holes 318 may be replaced with a lock mechanism. In some embodiments, doors 314 may include finger hole 318 and a lock mechanism. In some embodiments, the lock mechanisms on doors may include a lock actuator that is the same or similar to lock actuator 342. In some embodiments, the lock actuators on doors 314 may also be in communication with master controller 204, and may be controlled by master controller 204.

While FIGS. 6-18 show table 100 having a single display panel 160 that rotates from the bottom of table 100, in some embodiments, table 100 may include multiple smaller display panels disposed adjacent to or spaced apart from each other so as to form a continuous or non-continuous product surface 162. In such embodiments, each display panel back surface 164 may form a portion of bottom surface 114 of table top 104. Additionally, in such embodiments, each display panel may have an independent panel hinge and/or actuator configured to rotate each display panel about an anchored end. As such, each display panel may be independently rotated between the closed position and the open position.

Figure 19:
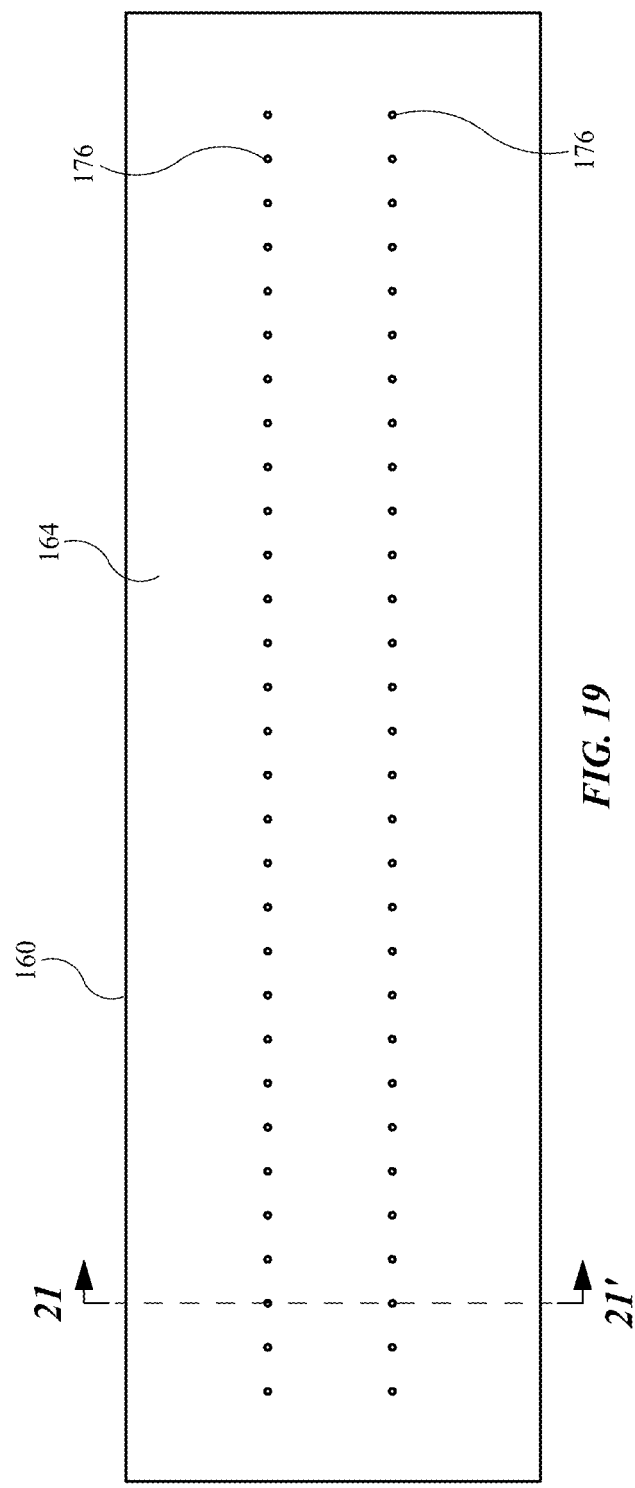
FIG. 19 shows a top view of a display panel according to some embodiments.

FIG. 19 shows product surface 162 of display panel 160 according to some embodiments. Product surface 162 may be a flat and smooth surface having a plurality of apertures 176 formed therein, each aperture 176 configured to receive a node 350. In some embodiments apertures 176 are circular in shape and nodes 350 have a corresponding circular outer shape. Each node 350 received in apertures 176 may be configured to hold a display fixture, such as display fixture 400, as discussed in more detail below with reference to FIGS. 21 and 22. Product surface 162 may include any number of nodes 350. In some embodiments, as shown in FIG. 19, nodes 350 may be aligned in rows (e.g., two rows extending along the length of display panel 160).

Figure 20:
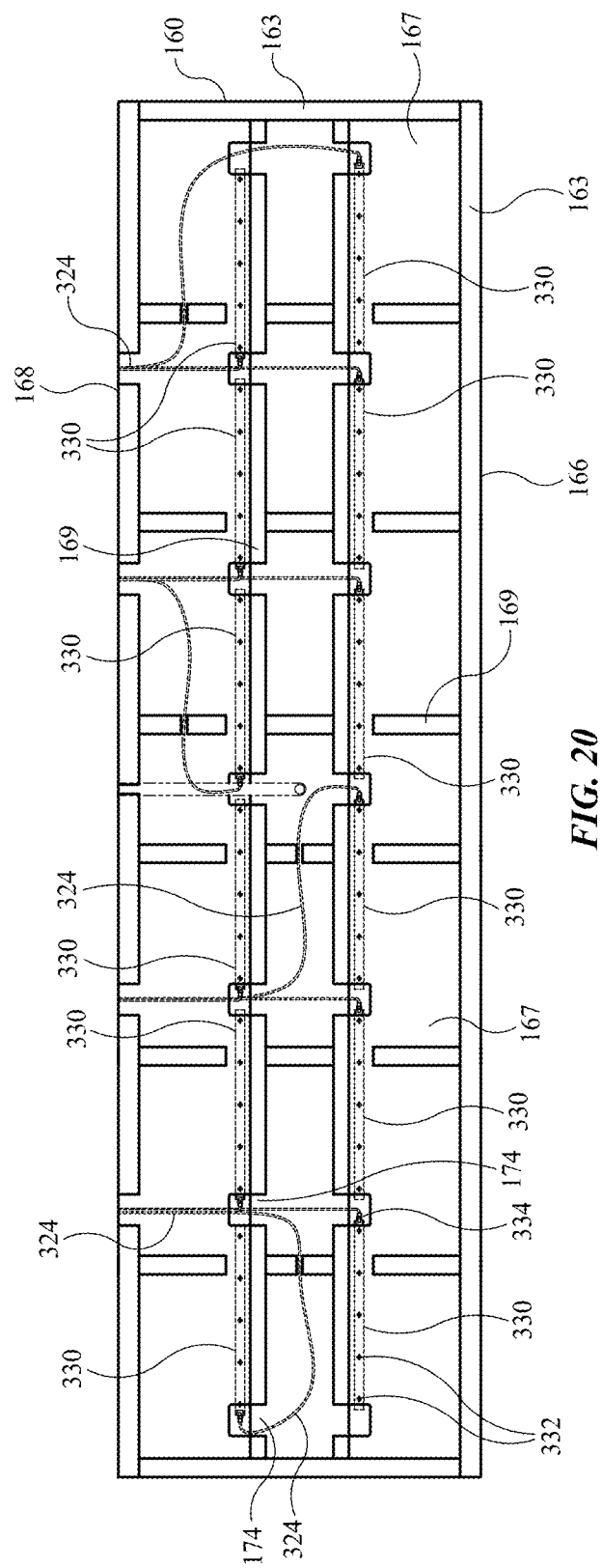
FIG. 20 shows a cross-sectional top view of a display panel according to some embodiments.

FIG. 20 shows a cross-sectional view showing the internal structure of display panel 160 according to some embodiments. Display panel 160 may be a hollow structure having a network of chambers 167 formed therein for housing electronic components. As shown in FIG. 20, the network of chambers 167 may be used to house a plurality of printed circuit boards 330 connected to a plurality of power cords 324. Support beams 169 may separate individual chambers 167 and provide structural integrity for display panel 160. In some embodiments, at least a portion of chambers 167 may be occupied by material for increasing the strength and robustness of display panel 160. In some embodiments, a plurality of honeycomb panels may occupy at least a portion of chambers 167. In some embodiments, the honeycomb panel is made of aluminum, and may have top and bottom layers of sheet metal (e.g., aluminum) enclosing the honeycomb structure.

Passages 174 may be formed in support beams 169 so that power cords 324 can be routed therethrough between chambers 167 to anchored end 168. Power cords 324 are routed towards and exit display panel via anchored end 168 so that they remain concealed and need not be disconnected when display panel is rotated into the open position. Also, routing power cords 324 towards anchored end 168 reduces the length of power cords 324 and prevents them from interfering with a user trying to access products when display panel 160 is in the open position. Moreover, routing power cords to anchored end 168 removes the need to unplug any power cord when display panel is rotated from the bottom of table 100 to the open position. This allows each system, e.g., power/data supply system 230 and cooling system 240, associated with table 100 to continue to function when display panel 160 is rotated to the open position.

Figure 21:
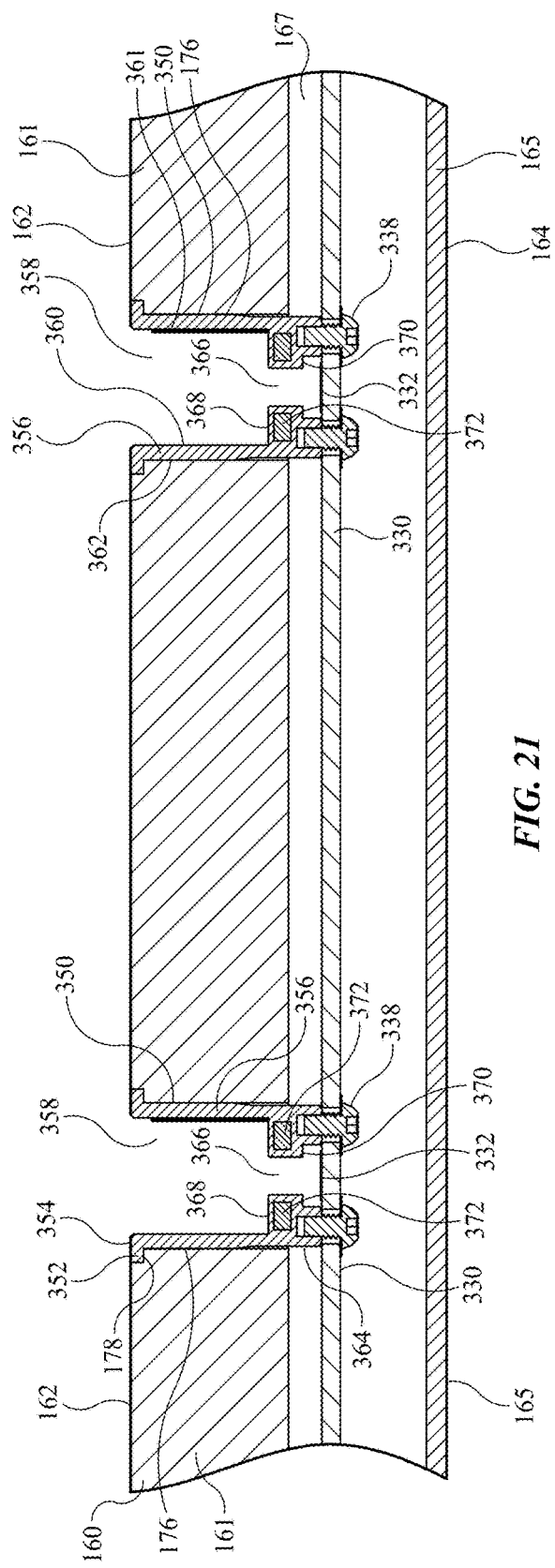
FIG. 21 shows a cross-sectional side view of a display panel according to some embodiments, taken along line 21-21' in FIG. 19.
Figure 22:
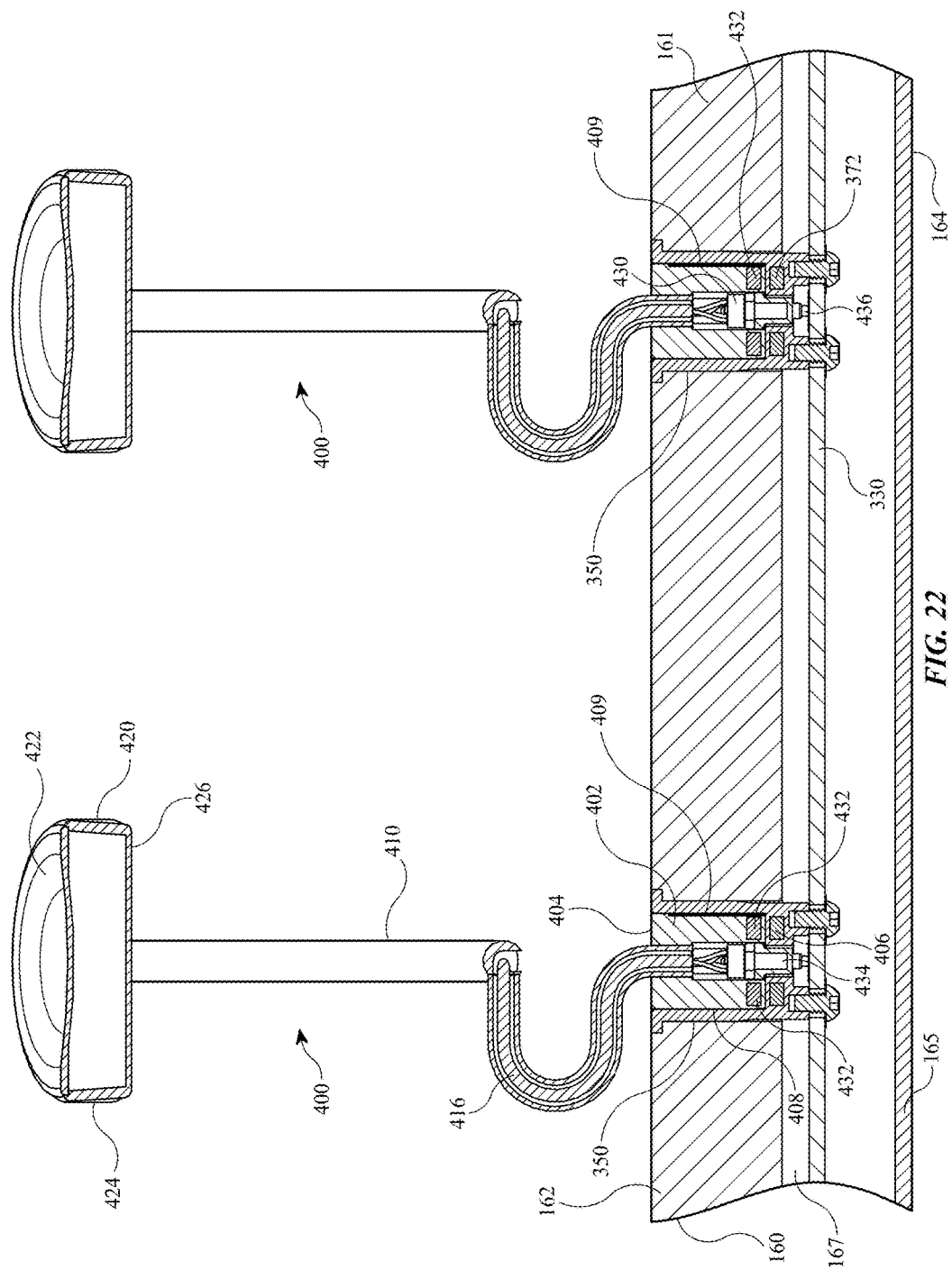
FIG. 22 shows a cross-sectional side view of a display panel and two display fixtures according to some embodiments, taken along line 21-21' in FIG. 19.

FIGS. 21 and 22 show cross-sections of display panel 160 along the line 21-21' in FIG. 19. FIG. 21 shows two empty nodes 350 and FIG. 22 shows those same two nodes 350 with display fixtures 400 received therein. FIGS. 21 and 22 also show a portion of a chamber 167 formed within display panel 160. Chamber 167 may be defined by a first (e.g., top) wall 161, a perimeter wall 163, and a second (e.g., bottom) wall 165. First wall 161 may define product surface 162 and second wall 165 may define back surface 164. First wall 161, perimeter wall 163, and second wall 165 may be made from any suitable material, such as but not limited to, wood, plastic, or metal, such as aluminum.

As shown in FIGS. 21 and 22, apertures 176 are formed on product surface 162 and extend through first wall 161 to chamber 167. Each aperture 176 may be configured to releasably or permanently receive at least a portion of node 350. Each node 350 may include a flange 352, a base 364 defining a through hole 366 therethrough, and a hollow frame 354 connecting flange 352 to base 364. Hollow frame 354 may include an exterior surface 362 that conforms with the shape of aperture 176. Flange 352 may be used to support node 350 on product surface 162. In some embodiments, product surface 162 may include circumferential grooves 178 disposed around apertures 176 for receiving flanges 352, so that nodes 350 do not extend above product surface 162 (and in some embodiments a top surface of flange 352 is flush with product surface 162). In some embodiments, node 350 does not include flange 352 and is supported within aperture 176 via a friction fit between aperture 176 and exterior surface 362 of hollow frame 354. In some embodiments, exterior surface 362 may be adhesively bonded to aperture 176.

Hollow frame 354 may also include an interior surface 360 that, in connection with a proximal surface 368 of base 364, defines a hollow interior 358. In some embodiments, interior surface 360 may include a first alignment feature 361 configured to engage and mate with a second alignment feature 409 on display fixture 400. First alignment feature 361 may include, but is not limited to a notch, a projection (as shown in FIG. 21), or a groove. First alignment feature 361 may also be used to orient each node in the same direction relative to product surface 162 (e.g., using an alignment jig 800 as discussed below in reference to FIG. 29).

At least one first magnet 372 may be coupled to base 364 and may be configured to interact with at least one second magnet 432 coupled to a plug 402 on display fixture 400. In some embodiments, first magnet(s) 372 may be disposed within base 364, as shown in FIG. 22, or attached to an upper or lower surface thereof.

In some embodiments, a printed circuit board 330 may be attached to node each 350 via a lower surface 370 of base 364. In some embodiments, a printed circuit board 330 is attached to base 364 via connectors 338 (e.g., screws 338). Screws 338 may align printed circuit board 330 with respect to node 350. Specifically, screws 338 may align electrical contacts 332 on printed circuit board 330 with through holes 366 formed in bases 364 of nodes 350. This alignment helps to ensure contact between electrical connectors 434 disposed on plugs 402 and electrical contacts 332 of printed circuit boards 330. In some embodiments, the attachment of a printed circuit board 330 to one or more nodes 350 grounds the printed circuit board 330 and/or the one or more nodes 350 through screws 338.

As shown in FIGS. 21 and 22, nodes 350 may extend through apertures 176 and into chamber 167. In other words, the base 364 of a node 350 may be disposed below first wall 161 of display panel 160. This allows printed circuit boards 330 to be suspended in chambers 167 such that they are not attached to or in contact with first wall 161. In some embodiments, where first wall 161, perimeter wall 163, or second wall 165 are subject to deformation, due to, for example, humidity, material properties, and/or stress, suspension of printed circuit boards 330 minimizes the potential for their damage in the event that first wall 161, perimeter wall 163 and/or second wall 165 deform. For example, if first wall 161 is made of wood, changes in humidity may cause first wall 161 to deform and/or crack. Suspending printed circuit boards 330 within chambers 167 helps to isolate them from changes in first wall 161. This increases the lifetime of the table and helps minimize maintenance costs for replacing damaged printed circuit boards 330.

Further, because printed circuit boards 330 are fixed relative to nodes 350, deformation in materials of display panel 160 will not cause a tendency for printed circuit boards 330 to move relative to nodes 350. If nodes 350 move due to material deformation, then printed circuit boards 330 move with them. This can help maintain a good connection between printed circuit boards 330 and display fixtures 400 inserted within nodes 350.

FIG. 22 shows two display fixtures 400 removably disposed in nodes 350 (i.e., insertable in and removable from nodes 350). Each display fixture 400 may include a plug 402 having a top surface 404, a bottom surface 406, and a side surface 408 separating top surface 404 from bottom surface 406. As shown in FIG. 22, hollow interior 358 of node 350 is configured to receive at least a portion of plug 402 on display fixture 400. In some embodiments, hollow interior 358 may be configured to receive the entire plug 402. In some embodiments, hollow interior 358 may be configured to receive the entire plug 402 such that top surface 404 of plug 402 is flush with flange 352 and/or product surface 162 of display panel 160. When plug 402 is received within node 350, side surface 408 and bottom surface 406 may contact interior surface 360 and proximal surface 368 of node 350, respectively.

Side surface 408 of plug 402 may include second alignment feature 409 for engaging and mating with first alignment feature 361 on interior surface 360 of node 350. Second alignment feature 409 may include, but is not limited to a notch, a projection or a groove (as shown in FIG. 22). Preferably, second alignment feature 409 compliments first alignment feature 361. For example, in some embodiments, first alignment feature 361 may be a projection and second alignment feature 409 may be groove configured to slide over the projection.

Display fixture 400 may include a stem 410 attached to top surface 404 of plug 402. Stem 410 may connect a charging element 420 (e.g., a charging puck 420) to plug 402 and may be used to carry wiring for electrically connecting charging puck 420 to electrical connectors 434 of plug 402 (e.g., via a printed circuit board 430 disposed within plug 402).

In some embodiments, charging puck 420 may include a proximal surface 422, a side surface 424 attached to stem 410, and distal surface 426. Charging puck 420 may have any shape, including but not limited to, cylindrical (as shown in FIG. 22), concave, convex, polygonal, or ellipsoidal. Charging puck 420 may have an inductive charging mechanism 428 disposed therein. The interior of charging puck 420 may include circuitry and/or electronics for inductively charging a product held by display fixture 400. The circuitry and/or electronics may be potted within the interior of charging puck 420. In some embodiments, proximal surface 422 of charging puck 420 may hold a product (e.g., product 270) thereon, via magnetic force (e.g., by a magnet disposed within charging puck 420), and provide power to the product via inductive charging of the product's battery.

In some embodiments, proximal surface 422 may include a security switch 421. Security switch 421 may be used to detect whether a product is supported by display fixture 400, and can trigger an alarm in response to a product being removed from display fixture 400. For example, in some embodiments, when product 270 is coupled to display fixture 400, product 270 may engage (or disengage) security switch 421 (e.g., by the backside of product 270 depressing a button of security switch 421). Security switch 421 may be communicatively coupled to an alarm or other alert such that the alert can be triggered by removal of product 270 from display fixture 400. Such removal of a product from display fixture 400 may disengage (or engage) security switch 421, thereby triggering the alert.

In some embodiments, security switch 412 may be an electronic switch integrated within the circuitry and/or software used to control inductive charging mechanism 428. For example, if the software controlling inductive charging mechanism 428 senses that product 270 has been removed from display fixture 400 (e.g., by a change in magnetic forces or charging state due the removal of a product), the software may trigger an alarm in response to sensing that product 270 has been removed. Security switch 421 may be in communication with master controller 204 and/or controller 281. In some embodiments, master controller 204 and/or controller 281 may be configured to activate or deactivate security switch 421.

Printed circuit board 430 may be disposed within plug 402 and may be designed to receive power at a given voltage from a printed circuit board 330 and send it to charging puck 420. Printed circuit boards 330 may include one or more voltage regulators that can modify or otherwise control the amount of voltage delivered from a power distributor 322 to one or more electrical contacts 332. In turn, printed circuit board 430 may receive power (e.g., at 5 volts) through electrical connector 434 (e.g., via two pins 436 thereof, one for each of power and ground) from an electrical contact 332 of printed circuit board 330 and route it to wires that connect to charging puck 420.

In some embodiments, printed circuit board 430 may be preconfigured to receive voltage from a printed circuit board 330 and route the voltage at a specific current to charging puck 420 so as to control the amount of power delivered to charging puck 420. In some embodiments, printed circuit board 430 may terminate positive and negative data signals (e.g., USB D+ and D−) from charging puck 420 so as to control the maximum amount of current a charging puck 420 can draw. In other words, display fixture 400 may use the data connection between charging puck 420 and printed circuit board 430 to determine an optimum amount of current for the charging puck to draw (e.g., a maximum amount, a most efficient amount), thereby controlling the amount of current a charging puck 420 draws from a printed circuit board 330.

In some embodiments, printed circuit board 430 may include resistors that set the maximum amount of current that a charging puck 420 can draw. In some embodiments, printed circuit board 330 may boost the voltage (e.g., using its voltage regulators) received from a power distributor 322 so as to compensate or otherwise account for any voltage drop due to transfer along power cords 324.

The design and configuration of printed circuit boards 330 and printed circuit boards 430 increases the modularity and flexibility of a display system. Different printed circuit boards 330 preconfigured for different voltage and/or different display fixtures 400 preconfigured for different currents may be used to power different types and/or generations of products. Since display fixtures 400 are removably disposed in nodes 350, different display fixtures may be exchanged depending on the type and/or generation of product displayed within a specific display cavity 141 or a portion of a specific display cavity 141, which increases the modularity of table 100.

Printed circuit board 430 may receive voltage from a printed circuit board 330 via an electrical connector 434 extending from bottom surface 406 of plug 402. In some embodiments, electrical connector 434 may include two pins 436 for contacting electrical contacts 332 disposed on an interface surface of a printed circuit board 330 (see FIG. 23). In some embodiments, electrical contacts 332 may be gold plated to resist corrosion. While two pins 436 are described herein, electrical connector 434 may include any number of pins. Each electrical contact 332 on printed circuit board 330 may include a contact pair 333 corresponding to the two pins 436 extending from bottom surface 406 of plug 402. In some embodiments, one pin 436 receives power and the other pin 436 receives ground from respective contacts in a contact pair 333. In some embodiments, a printed circuit board 430 may be disposed within a test plug for testing the operability of power/data supply system 230. In some embodiments, the test plug may include an indicator (e.g., a LED) for indicating whether or not power/data supply system 230 is properly supplying power and/or data to a node 350.

Pins 436 may extend from a bottom surface 404 so as to pass through through hole 366 formed in the base of a node 350. Pins 436 may have sufficient length so as to extend from bottom surface 404 of plug 402 to contact pairs 333 on a printed circuit board 330 when plug 402 is fully seated within node 350. In some embodiments, pins 436 may be spring loaded to facilitate connection between the ends of pins 436 and contact pairs 333. Spring loading pins 436 minimize the potential for small deviations in the distance between bottom surface 404 and contact pairs 333 from disrupting electrical contact between pins 436 and contact pairs 333.

Plug 402 may also include at least one second magnet 432 coupled thereto. In some embodiments, second magnet(s) 432 may be disposed on or embedded within plug 402. Second magnet(s) 432 may be configured to attract first magnet(s) 372 coupled to base 364 of node 350, and vice versa. The attraction between second magnet(s) 432 and first magnet(s) 372 may releasably hold plug 402 within hollow interior 358 of node 350. Additionally, the attraction between the magnets may overcome any force exerted by spring loaded electrical connectors 434, such as spring loaded pins 436, to promote strong connection between electrical connectors 434 and electrical contacts 332 of printed circuit boards 330.

The releasable connection between plugs 402 on display fixtures 400 and nodes 350, as well as the design of electrical connectors 434 and electrical contacts 332, increases the modularity of a display system. As discussed above, this allows display fixtures to be easily exchanged if a user wishes to display a different type and/or generation of products within a display cavity, and gives the user the ability to use all or just a subset of available nodes 350. In the event that new or updated display fixtures are needed, the releasable connection between plugs 402 on display fixtures 400 and nodes 350, as well as the design of electrical connectors 434 and electrical contacts 332, makes exchanging display fixtures easy.

Figure 23:
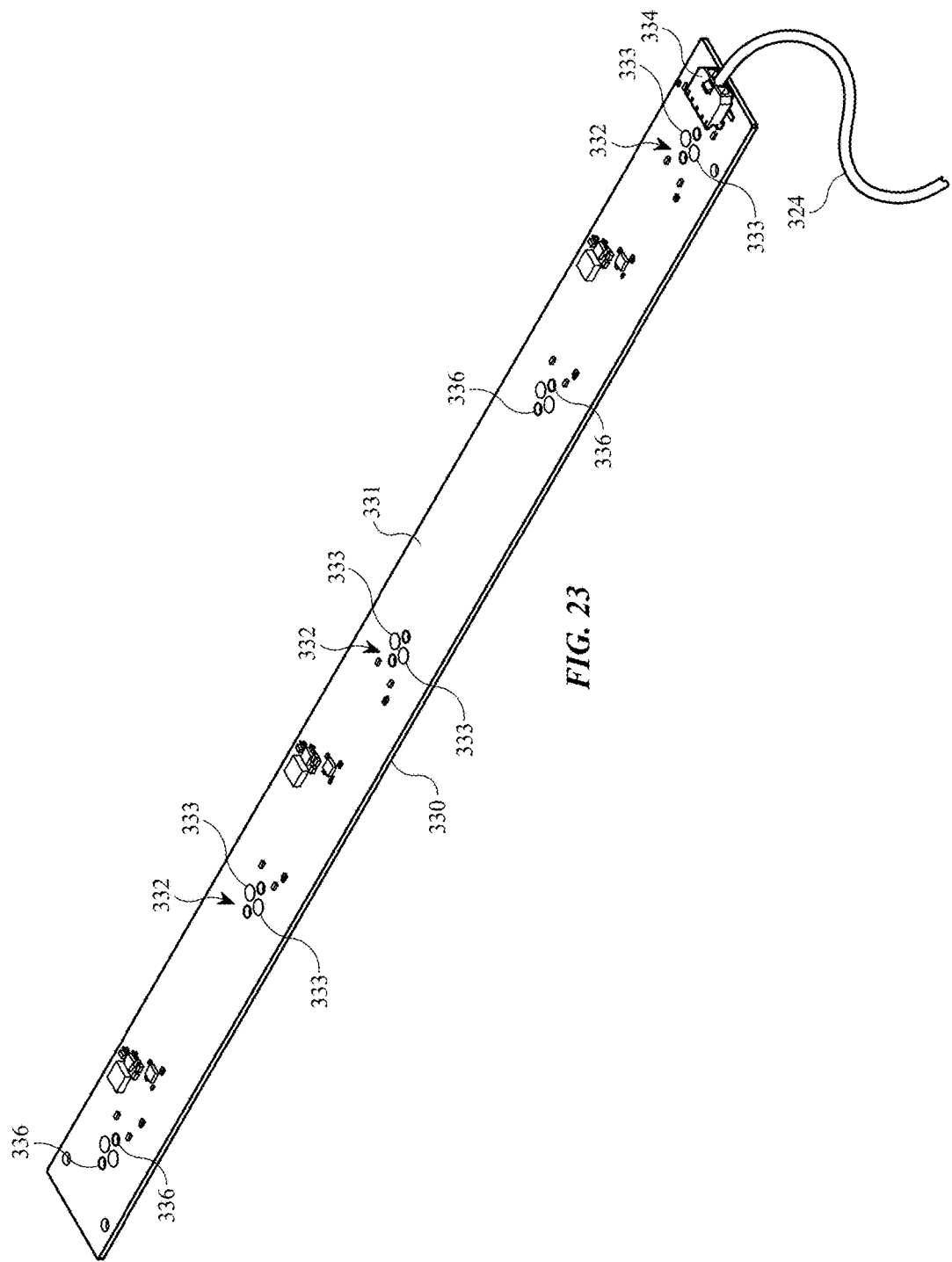
FIG. 23 shows a top perspective view of a printed circuit board according to some embodiments.

Moreover, printed circuit boards 330 may also be modular in fashion. As shown in FIG. 23, power cables 324 may be plugged into a printed circuit board 330 via a connector 334 and screw holes 336 may be disposed on printed circuit boards 330 for receiving screws 338. As such, printed circuit boards 330 may also be exchanged when needed. The modularity of the display fixtures and printed circuit boards 330 allows a table 100 to be retrofitted with new display fixtures and/or printed circuit boards 330.

Figure 24A:
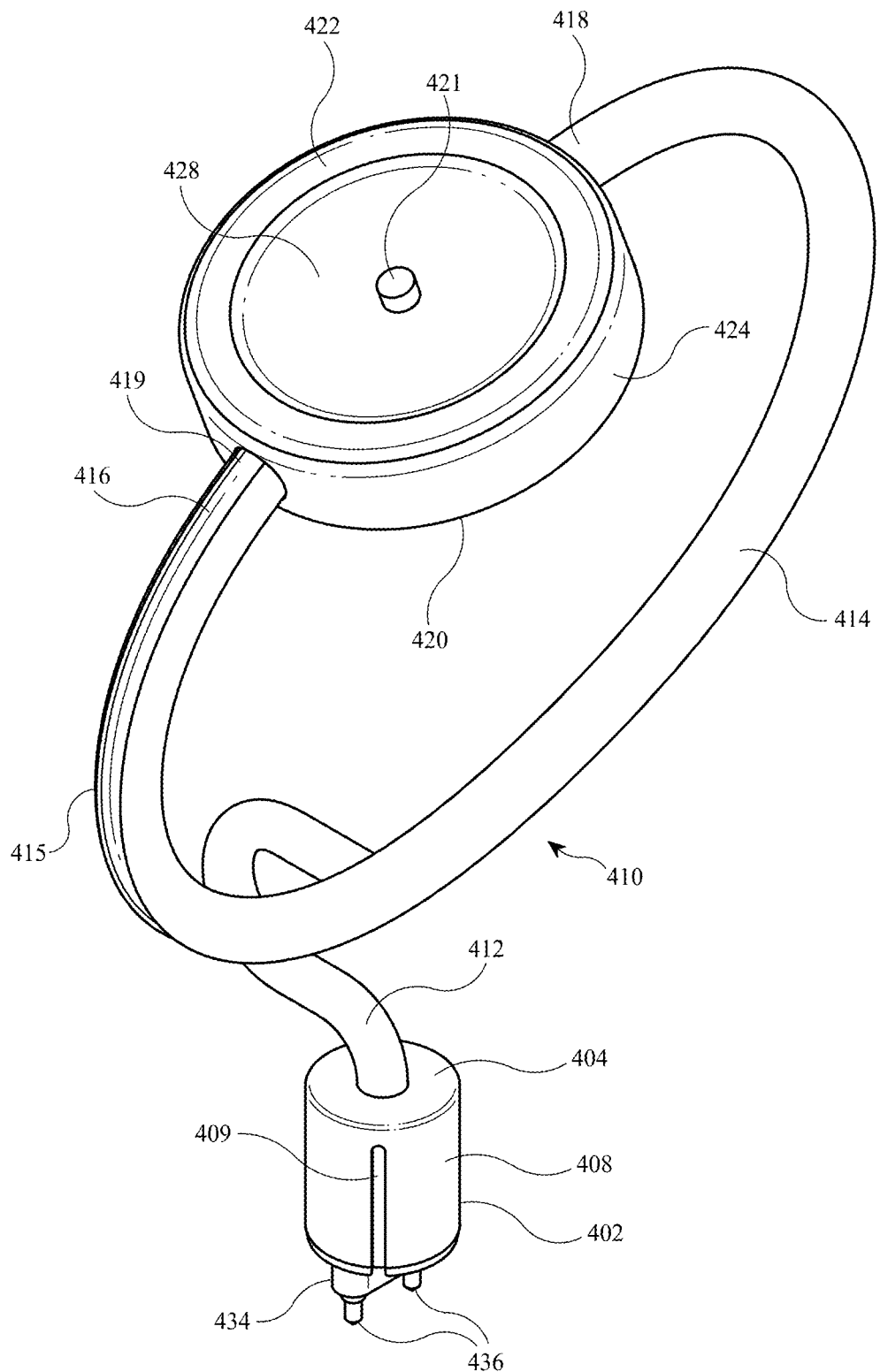
FIG. 24A shows a top perspective view of a display fixture according to some embodiments.
Figure 24B:
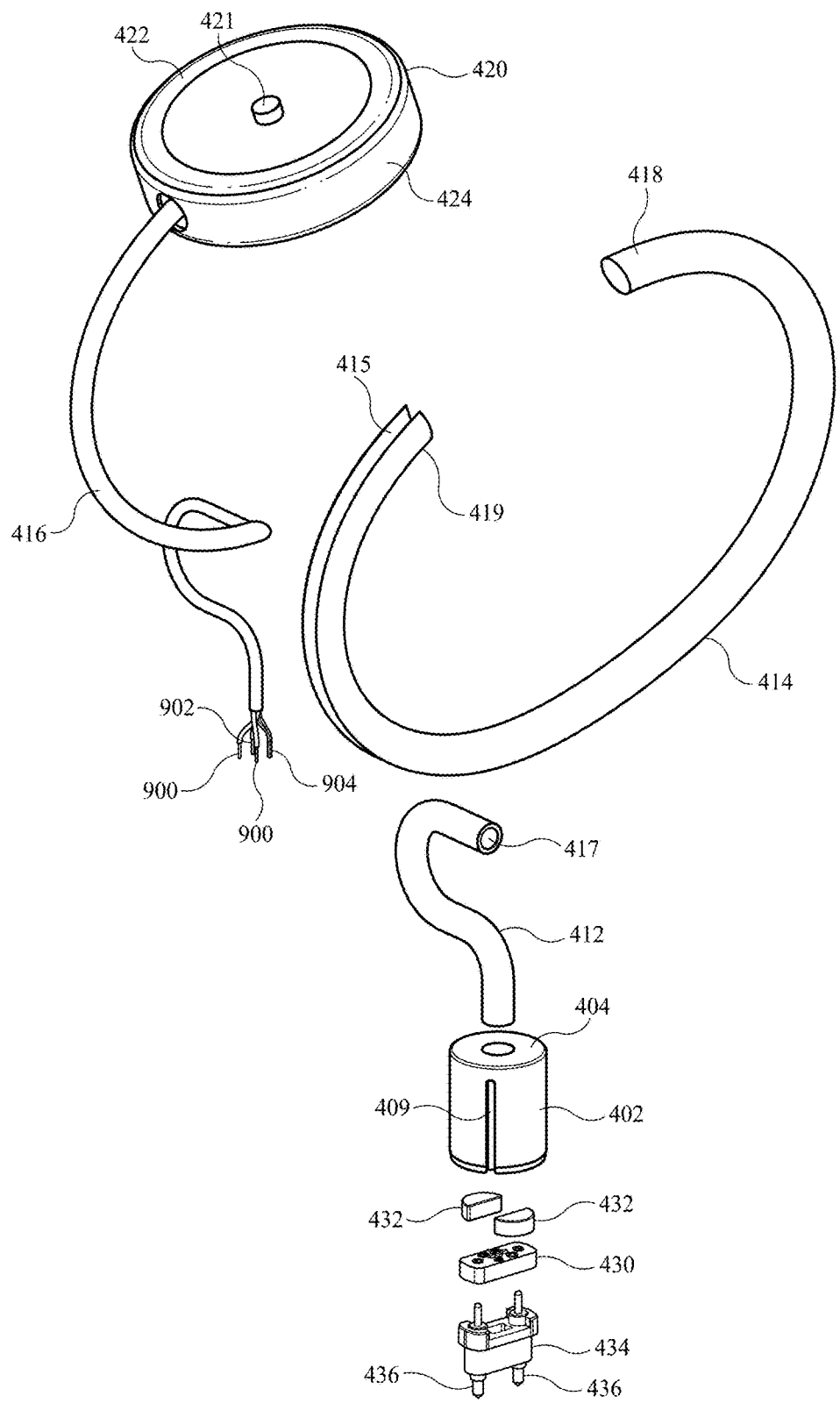
FIG. 24B shows an exploded view of a display fixture according to some embodiments.
Figure 25:
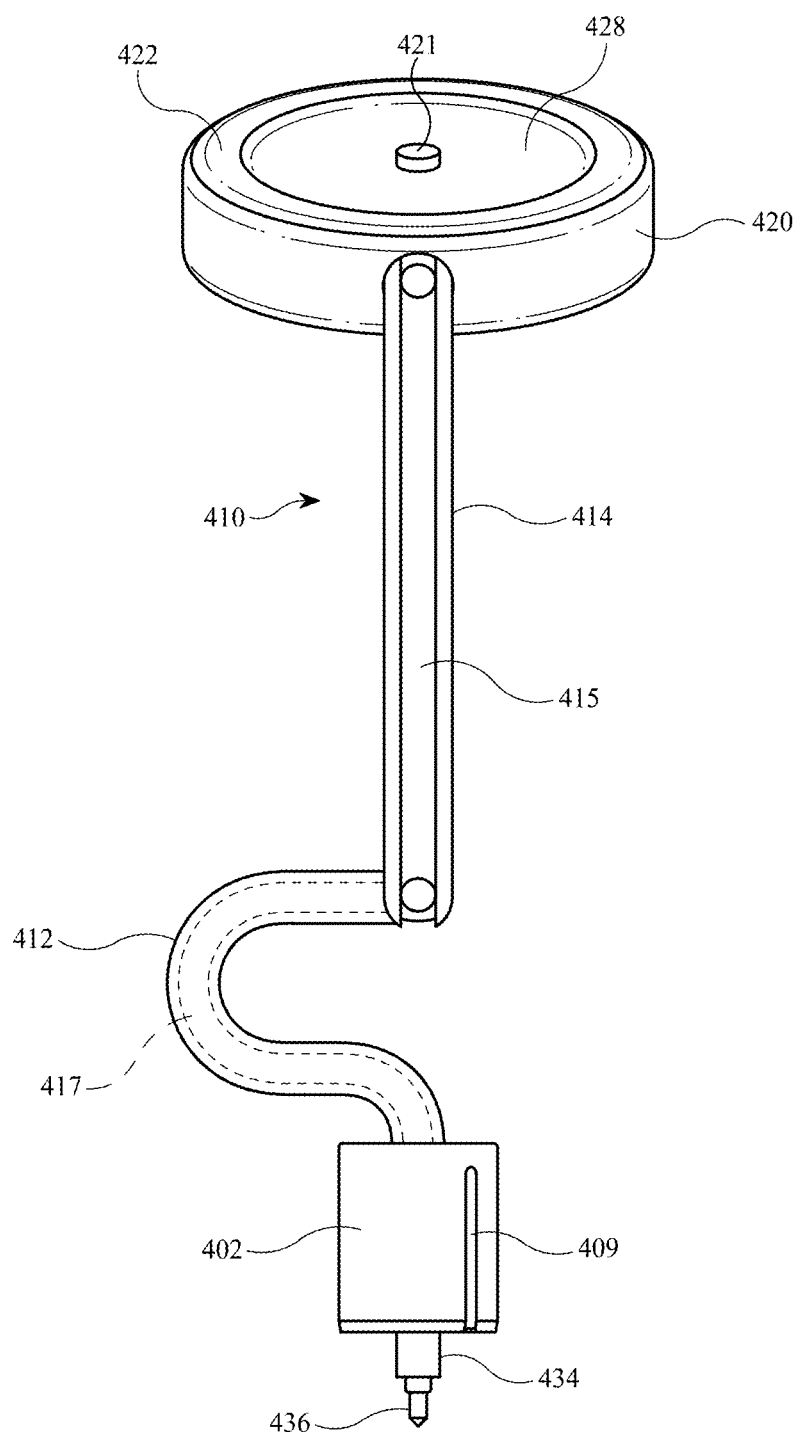
FIG. 25 shows a side view of a display fixture according to some embodiments.

FIGS. 24A, 24B, and 25 show display fixture 400 according to some embodiments. Display fixture 400 may include plug 402 having first alignment feature 409 disposed on side surface 408 and stem 410 extending from top surface 404. Display fixture 400 may also include electrical connector 434 having two pins 436 extending from bottom wall 406. Stem 410 may include an extension 412 fixed to top surface 404 of plug 402 and a ring 414 attached to extension 412. In some embodiments, stem 410 may a single integrally formed piece. In some embodiments, extension 412 and ring 414 may be separate pieces that are fixed together. In some embodiments, extension 412 and ring 414 may be fixed together using, for example, welding or an adhesive. Ring 414 may have a first end 418 and a second end 419 attached to opposing sides of side surface 424 of charging puck 420. First end 418 and second end 419 may be fixed to side surface 424 using, for example, welding or an adhesive. In some embodiments, the weld may be present on an interior portion of charging puck 420 such that the weld is not visable on the exterior of display fixture 400. In some embodiments, welds on display fixture 400 may be laser welds. In some embodiments, stem 410 may be made of stainless steel.

Ring 414 may have any shape, including but not limited, to a circular shape, an elliptical shape, or a polygonal shape. In some embodiments, at least a portion of a product (e.g., product 270) held by display fixture 400 may wrap around ring 414. In some embodiments, stem 410 may not include extension 412 and ring 414, but rather stem 410 may be composed of a single structure, such as a straight rod or tube (see e.g., stem 710 in FIG. 28) or a curved/bent rod or tube.

Stem 410 may also include a groove 415 disposed on at least a portion of stem 410. For example, groove 415 may be disposed on and around a portion of ring 414 as shown in FIGS. 24A, 24B, and 25. Groove 415 may be used to house one or more wires 416 that electrically connect charging puck 420 to electrical connectors 434 (e.g., via printed circuit board 430) of plug 402. In some embodiments, groove 415 may extend from extension 412, around a portion of ring 414, and terminate at side surface 424 of charging puck 420. In some embodiments, ring 414 is initially formed having a solid (e.g., cylindrical) cross-sectional shape, and groove 415 is machined into this shape.

As shown in FIG. 25, groove 415 may connect to a channel 417 disposed in extension 412. In some embodiments, channel 417 may be disposed completely within and through the center of extension 412. In other words, extension 412 may be a tube having a hollow interior with channel 417 defining the hollow interior. Channel 417 in combination with groove 415 may serve to escort wire 416 from plug 402 (e.g., from printed circuit board 430 of plug 402) to charging puck 420. In some embodiments, ring 414 may be a hollow tube having an internal channel similar to channel 417. In such embodiments, wire 416 may be completely concealed within ring 414, and thus, may be completed concealed within display fixture 400. In some embodiments, after routing wire 416 in groove 415, groove 415 may closed (e.g., by filling groove 415 with a material or by closing groove 415 using mechanical force) so as to conceal wire 416 within ring 414.

Figure 30:
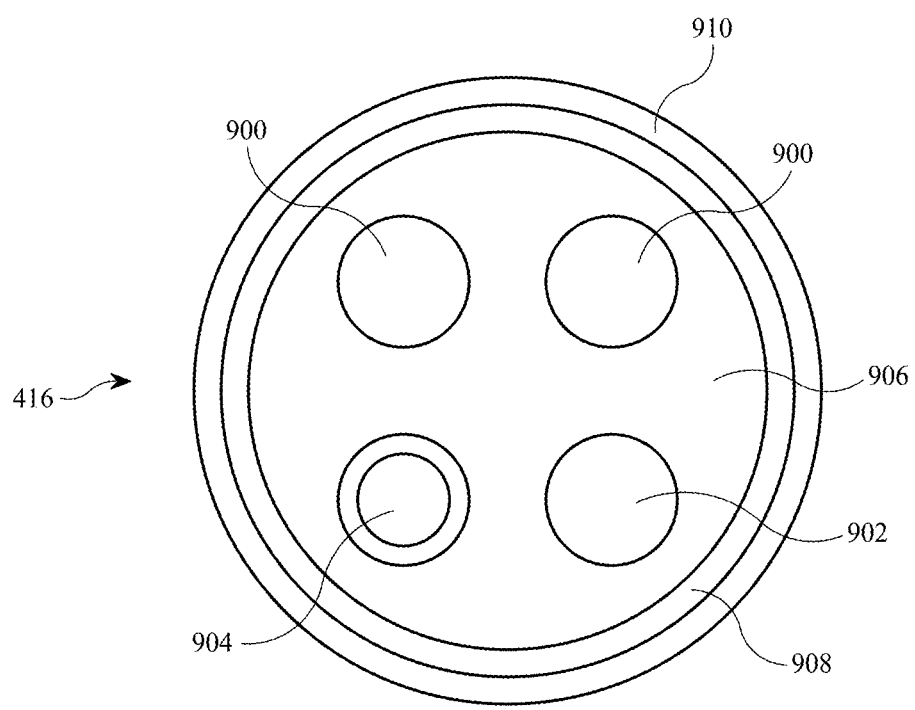
FIG. 30 shows a cross-sectional view of a wire for supplying power and/or data according to some embodiments.

In some embodiments, as shown, for example, in FIG. 30, wire 416 may include at least one conductor wire 900 and an insulated ground wire 904. Conductor wire(s) 900 may be configured to supply power and/or data from printed circuit board 430 to charging puck 420. In some embodiments, conductors wires 900 for supplying power may have a gauge of 30 AWG (American Wire Gauge). In some embodiments, conductor wires 900 for supplying data may have a gauge of 34 AWG. Ground wire 904 may serve to ground charging puck 420 via printed circuit board 430 and printed circuit board 330. In some embodiments, ground wire 904 may have a gauge of 34 AWG. In some embodiments, wire 416 may include a guide wire 902 to facilitate routing of wire 416 through channel 417. Guide wire 902 may be a single strand of 34 AWG power wire. Wire 416 may also include a filler 906. Filler 906 may be composed of an insulating material such as aramid fiber. In some embodiments, filer 906 may be two 100 D strands of aramid fiber.

In some embodiments, wire 416 may include a polyester wrapping 908 disposed around wires 900, 902, and 904 and filler 906. Polyester wrapping 908 may be a thin wrapping used in place of conventional wire jackets that are typically much thicker. As such, polyester wrapping 908 reduces the overall diameter of wire 416, to thereby allow a minimized size for extension 412. In some embodiments, wire 416 may also include a polyethylene (PE) film 910 disposed on and around polyester wrapping 908. In some embodiments, the PE film may be made of MYLAR®. The PE film reduces surface frication and facilitates routing of wire 416 though channel 417 in extension 412. The construction of the wire 416 shown in FIG. 30 results in a wire having a smaller overall diameter than conventional wires. The small overall diameter of wire 416 also facilitates the routing of wire through channel 417. In some embodiments, the overall diameter of wire 416 may be in the range from 1.2 mm to 1.4 mm. In some embodiments, the overall diameter of wire 416 is 1.3 mm.

Figure 26:
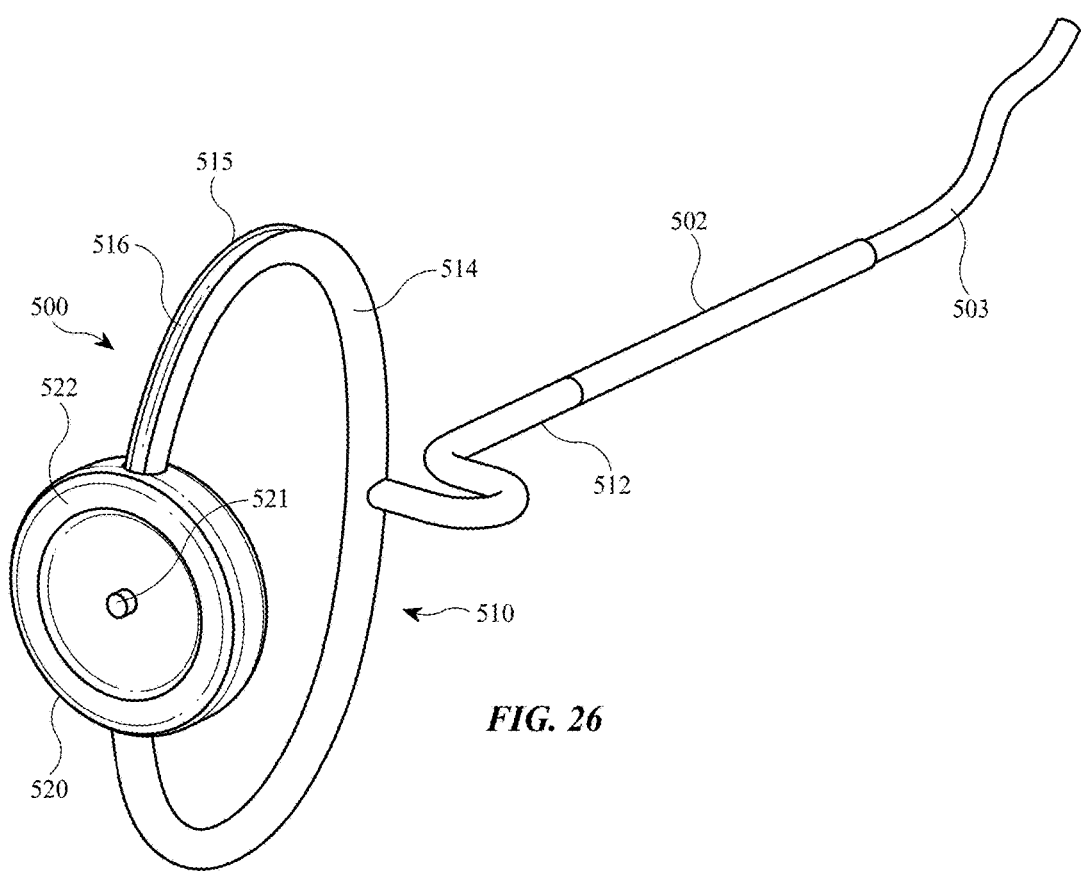
FIG. 26 shows a top perspective view of a display fixture according to some embodiments.

FIG. 26 shows a display fixture 500 according to some embodiments. Display fixture 500 may include a plug 502 attached to a stem 510. In some embodiments, plug 502 may include a cord 503, such as audio or USB cord, connected to plug 502 and configured to supply power and/or data to a charging puck 520. Plug 502 may also include a printed circuit board (such as printed circuit board 430) disposed therein. Similar to stem 410, stem 510 may include an extension 512 fixed to plug 502 and a ring 514 fixed to extension 512 and charging puck 520. Ring 514 may include a groove 515 for escorting a wire 516 from extension 512 to charging puck 520. In some embodiments, extension 512, ring 514, groove 515, and wire 516 may have the same characteristics as extension 412, ring 414, groove 415, and wire 416 described in detail above with respect to FIGS. 24A, 24B, 25, and 30. Charging puck 520 may have the same characteristics as charging puck 420. In some embodiments, charging puck 520 may have a proximal surface 522 having a security switch 521 disposed thereon. In some embodiments, security switch 521 may be an electronic switch integrated within the circuitry and/or software used to control an inductive charging mechanism associated with charging puck 520. Security switch 521 may have the same functionality as security switch 421. And security switch 521 may be in communication with and controlled by a controller, such as master controller 204 and/or controller 281.

Figure 27:
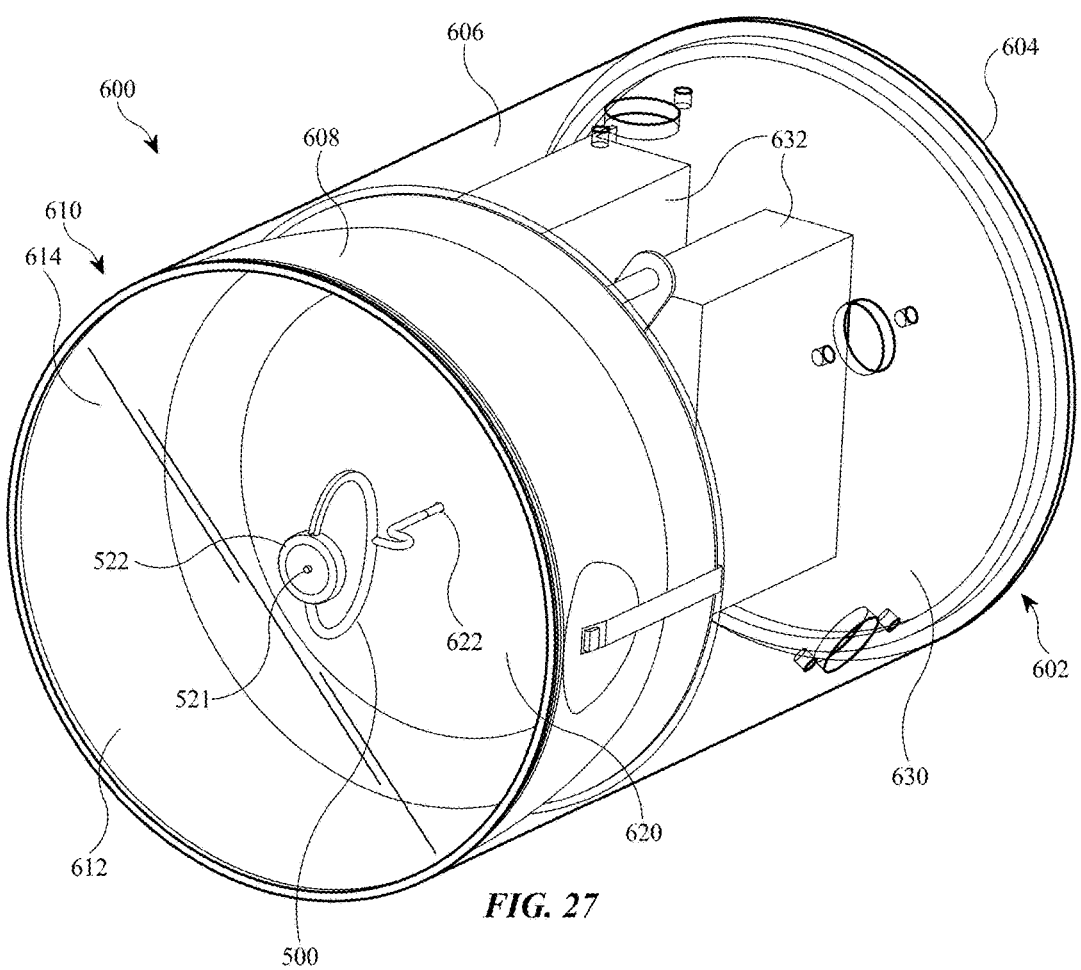
FIG. 27 shows a display apparatus according to some embodiments.

FIG. 27 shows a display apparatus 600 according to some embodiments. Display apparatus 600 may include a base 604 on a distal end 602 and a display cavity 614 on a proximal end 610. Display cavity 614 may include a product surface 620 having at least one aperture for receiving at least a portion of a node 622 for holding a display fixture, for example display fixture 500. The aperture(s) on product surface 620 and node 622 may be the same or similar to aperture 176 and node 350, respectively. In some embodiments, nodes 622 may be modified to accommodate plug 502 and cord 503. While FIG. 27 shows display apparatus 600 holding display fixture 500, display cavity 614 may be used to hold other types of display fixtures, such as display fixtures 400 or 700. A panel 612 may be disposed over display cavity 614 on proximal end 610 of display apparatus 600. In some embodiments, panel 612 may be transparent (e.g., formed of glass), and may enclose display cavity 614 and define a top portion of display cavity 614. In some embodiments, panel 612 may have the same or similar construction as glass panel 120.

In some embodiments, display apparatus 600 may have a hollow casing 606 extending from distal end 602 to proximal end 610. Hollow casing 606 may include a receptacle 608 disposed at proximal end 610 for receiving at least a portion of display cavity 614. And base 604 may seal hollow casing 606 at distal end 602. A chamber 630 within hollow casing 606 may house electronics 632 for supplying data and/or power to a product displayed within display cavity 614. In some embodiments, display apparatus 600 may be mounted in a surface, such as a surface of a wall or in a table. In some embodiments, panel 612 may be flush with the surface, or may protrude out from the surface (e.g., by the depth of display cavity 614). In some embodiments, display apparatus 600 may be coupled to at least one controller for controlling at least: (1) the supply of power and/or data to display apparatus 600 and the products displayed therein, (2) the temperature within display cavity 614, and/or (3) lighting within cavity 614, similarly as described above for table 100.

Figure 28:
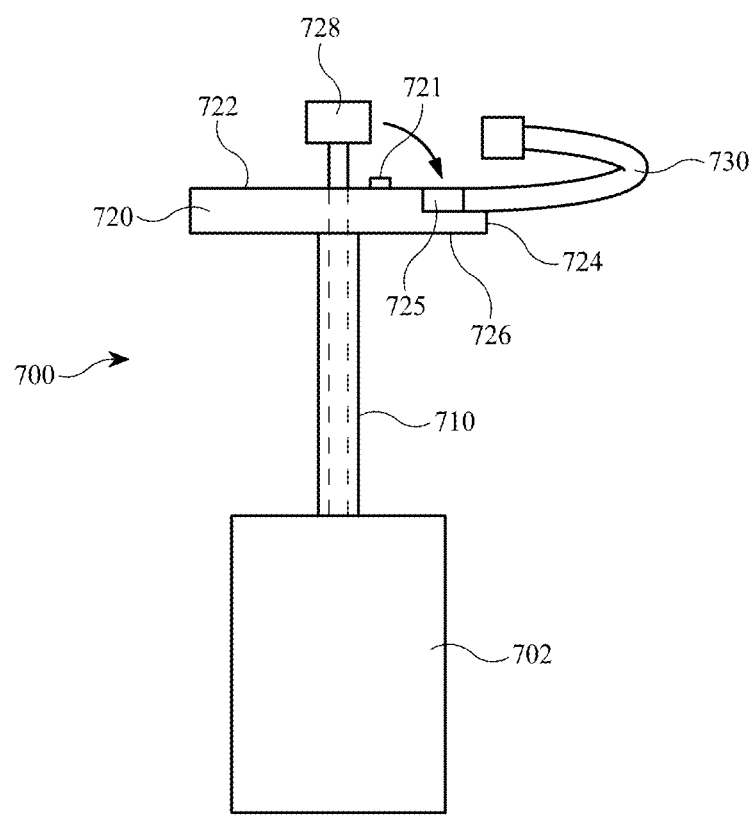
FIG. 28 shows a cross-sectional view of a display fixture according to some embodiments.

FIG. 28 shows a display fixture 700 according to some embodiments. Display fixture 700 may include a plug 702 and a stem 710 fixed to plug 702. In some embodiments plug 702 may have the same characteristics as plug 402. In some embodiments stem 710 may be a straight rod or tube or a curved or bent rod or tube. In some embodiments, stem 710 may have the same characteristics as stem 410. Display fixture 700 may also include a charging puck 720 for supplying power and/or data to a product help by display fixture 700. Charging puck 720 may include a proximal surface 722 for supporting a product, a side surface 724, and a distal surface 726 fixed to stem 710. Proximal surface 722 may include a cable access 725, which may provide access for an auxiliary cable 730, which may be a data/power cable or other linkage, and which may connect to a port on the product held by display fixture 700 to provide data and/or power to the product. In some embodiments, data and/or power can be provided to cable access 725 from a printed circuit board 330 via a printed circuit board 430 disposed in plug 702 and a wire 728 electrically connected to cable access 725. Wire 728 may have the same or a similar construction as wire 416. Cable access 725 may be a cable pass-through through which the power/data cable can pass, or may be an outlet configured to receive a data/power cable plug from, e.g., auxiliary cable 730. In some embodiments, display fixtures 400 and 500 may including a cable access, an auxiliary cable, and a wire electrically connected to the cable access, similar to display fixture 700, in addition to or in replacement of an inductive charging mechanism.

Any suitable outlet and plug combination can be used at either end of auxiliary cable 730 to provide such power and/or data transmission through cable access 725 to a product, such as, for example, Universal Serial Bus (USB), micro-USB, mini-USB, Advanced Technology Attachment (ATA) (e.g., Parallel ATA, Serial ATA), or any other standard or proprietary connection format.

In some embodiments, proximal surface 722 may include security switch 721. Security switch 721 may be communicatively coupled to an alarm or other alert such that the alert can be triggered by removal of a product supported by display fixture 700. Such removal of a product from display fixture 700 may disengage (or engage) security switch 721, thereby triggering the alert. Security switch 721 may have the same functionality as security switch 421. And security switch 721 may be in communication with and controlled by a controller, such as master controller 204 and/or controller 281.

Figure 29:
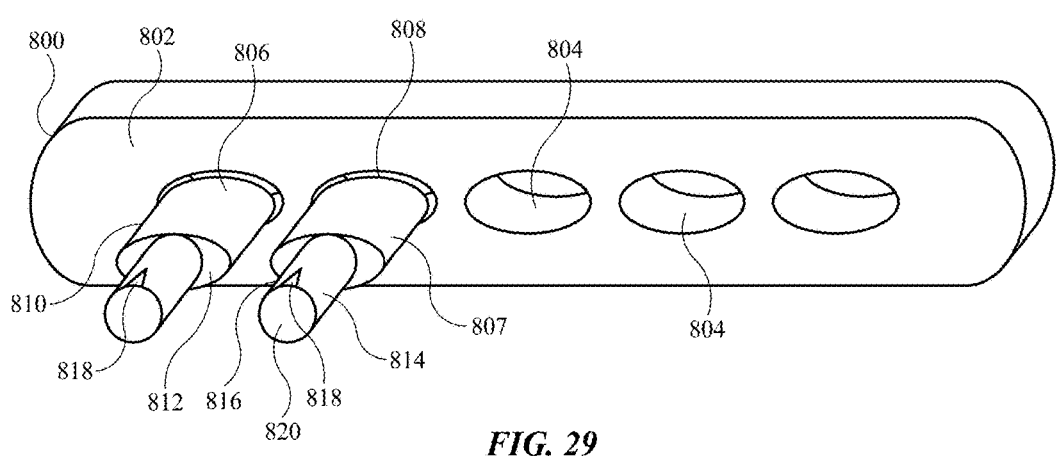
FIG. 29 shows an alignment jig according to some embodiments.

FIG. 29 shows an alignment jig 800 that may be used to orient nodes 350 within apertures 176 on a display panel 160 in the same direction relative to product surface 162, to present a consistent orientation and appearance among displayed products 270. Alignment jig 800 may include a jig receptacle surface 802 defining a plurality of jig receptacles 804 configured to receive plug jigs 806. Alignment jig 800 may include an elongated shape such that receptacles 804 may be aligned in a row. In some embodiments, each plug jig 806 may be releasably attached within a jig receptacle 804. The releasable attachment between plug jigs 806 and receptacles 804 may be provided by, for example, a slidable fit, friction fit, magnetic forces, or a snap-fit. In some embodiments, at least one plug jig 806 may be fixed within at least one jig receptacle 804.

Plug jigs 806 may each include a body 807 having an upper surface 808 configured to fit within a jig receptacle 804 and an outer surface 810 configured to be at least partially received within a jig receptacle 804. Plug jigs 806 may also include an alignment fitting 814 attached to a lower surface 812 of body 807. Preferably, body 807 of plug jig 806 is sized and shaped to correspond with the size and shape of jig receptacle 804. In some embodiments, jig receptacles 804 and bodies 807 may have a cross-sectional shape, in a direction orthogonal to the direction of insertion of the a plug jig 806 into a jig receptacle 804 (i.e., in a direction parallel to jig receptacle surface 802), that is non-circular such that plug jigs 806 may only be oriented within jig receptacles 804 in predetermined orientations. The non-circular shape may be, but is not limited to, an oval shape or a pentagon shape. In some embodiments, jig receptacles 804 and bodies 807 may have a cross-sectional shape, in a direction orthogonal to the direction of insertion of a plug jig 806 into a jig receptacle 804 (i.e., in a direction parallel to jig receptacle surface 802), that is non-symmetrical such that plug jigs 806 may only be oriented within jig receptacles 804 in a single predetermined orientation. The non-symmetrical shape may be, but is not limited to, a square with a projection extending from one side. Plug jigs 806 must be aligned in the same direction within receptacles 804 so that alignment jig 800 can be used to orient nodes 350 is the same direction. The non-circular or non-symmetrical shape facilitates the proper alignment of plug jigs 806 on alignment jig 800.

As shown in FIG. 29, each plug jig 806 may be aligned such that surface features 818 disposed on surfaces 816 of alignment fittings 814 are oriented in the same direction. In some embodiments, surface feature 818 may protrude from surface 816 on alignment fittings 814. In some embodiments, surface feature 818 may be a groove within surface 816 on alignment fittings 814, similar to second alignment feature 409 described with reference to plug 402 above. Surface feature 818 may be sized and shaped to compliment first alignment feature 361 on node 350. Surface feature 818 may be, but is not limited to, a notch, a projection, or a groove. For example, if first alignment feature 361 is a projection, surface feature 818 may be a groove configured to slide over the projection, or vice versa.

Alignment fitting 814 may be configured to fit within hollow interior 358 of node 350 so that a bottom surface 820 of alignment fitting 814 contacts proximal surface 368 of base 364 when alignment fitting 814 is inserted into node 350. In some embodiments, alignment fitting 814 may have a length corresponding to the depth of node 350 such that a lower surface 812 of plug jig 806 contacts flange 352 of node 350 when bottom surface 820 contacts proximal surface 368 of base 364.

In operation, a node 350 may be placed onto each alignment fitting 814 and held thereon. In some embodiments, node 350 may be held on alignment fitting 814 due to a friction-fit between interior surface 360 of node 350 and alignment surface 816. In some embodiments, node 350 may be held on alignment fitting 814 via magnetic force. Due to first alignment feature 361 on node 350 and surface feature 818 on alignment surface 816, a node 350 will only fit over each alignment fitting 814 in a single direction. Once at least two nodes are placed over alignment fitting 814, a user may place alignment jig 800 over product surface 162 such that the at least two nodes 350 are received in apertures 176. Once the at least two node 350 are received in apertures 176, alignment jig 800 may be removed, thereby leaving the node(s) 350 within the aperture(s) 176, aligned with each other. In some embodiments, node(s) 350 may remain in aperture(s) 176 due to a friction fit between an aperture 176 and exterior surface 362 of hollow frame 354, the friction force between the aperture 176 and exterior surface 362 being larger than the friction force between interior surface 360 and alignment surface 816 or the magnetic force used to hold node 350 on alignment fitting 814. Subsequent nodes 350 may be placed in the same manner. To maintain alignment with previously placed nodes 350, at least one plug jig 806 for a previously placed node 350 may be maintained within node 350, and at least one jig receptacle 804 may be kept empty when preparing the alignment jig for placing subsequent nodes 350. When placing the subsequent nodes 350, the empty jig receptacle 804 may be placed over the previously-placed plug jig 806, thereby aligning the subsequent nodes 350 with the previously placed node 350.

Some embodiments may include a kit having an alignment jig 800 and at least one plug jig 806 and/or at least one node 350. In some embodiments, the kit may include instructions for using alignment jig 800, in conjunction with at least one plug jig 806, to orient nodes 350 within apertures 176 in the same direction relative to product surface 162 on a display panel 160.

Figure 32:
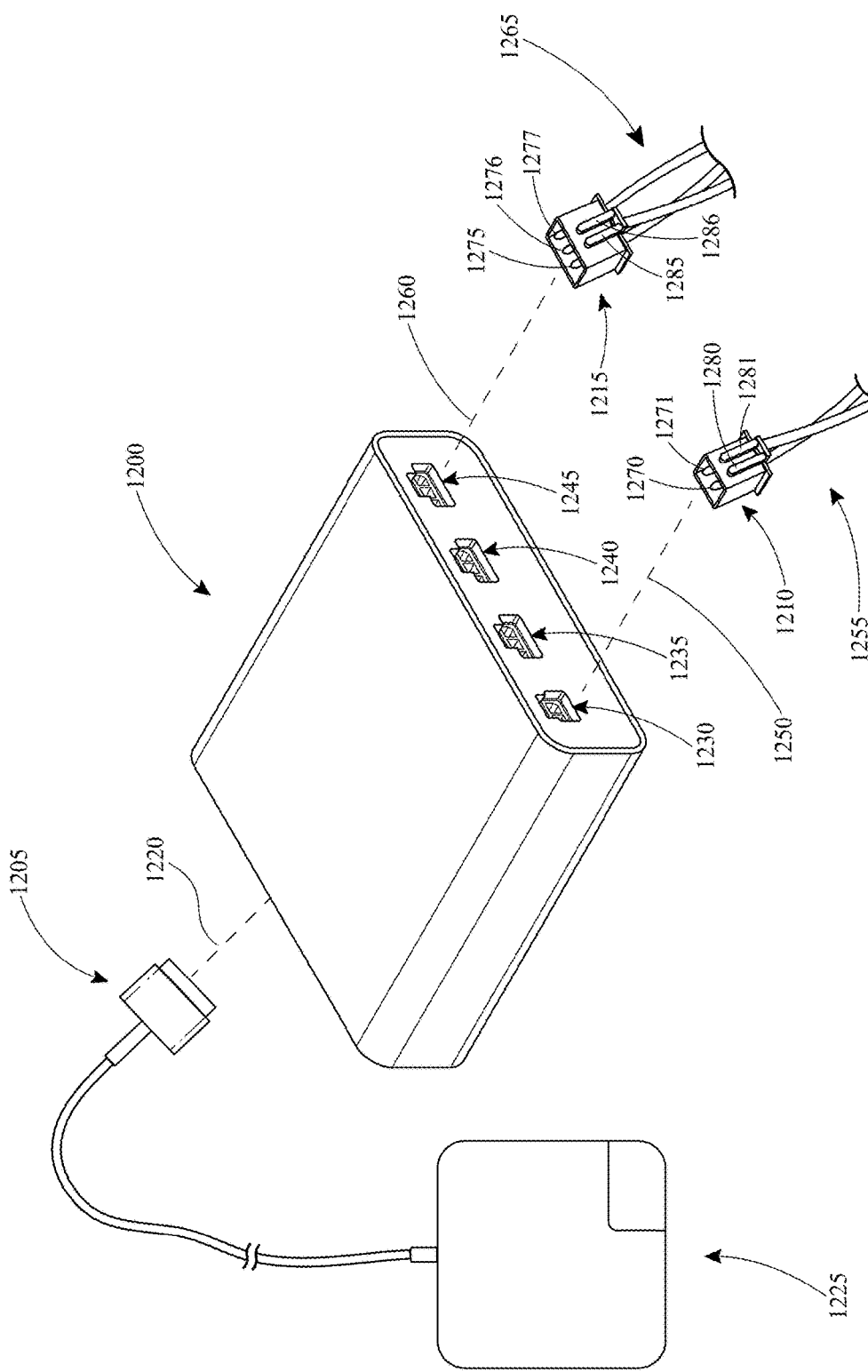
FIG. 32 shows a perspective view of a DC-to-DC converter, according to an embodiment, and a MagSafe plug connector and Molex plug connectors lined up to mate with corresponding connectors of the DC-to-DC converter.

FIG. 32 illustrates a perspective view of a DC-to-DC converter 1200 according to some embodiments of the present invention, which may receive, convert, and distribute power, and a MagSafe plug connector 1205 and Molex plug connectors 1210, 1215 lined up to mate with corresponding connectors of DC-to-DC converter 1200. Converter 1200, as described in further detail below, may include a MagSafe receptacle connector (e.g., MagSafe receptacle connector 1344, as shown in FIG. 33C) that can mate with MagSafe plug connector 1205 along an insertion axis 1220. MagSafe plug connector 1205, which can be part of a MagSafe power adapter 1225, may provide a DC input voltage such as 20 V at 85 watts (W). Converter 1200 also includes regulator circuitry, as further described with reference to FIGS. 34A and 34B, for converting the DC input voltage to one or more DC output voltages (e.g., 12 V, 5 V or 3.3 V or slightly higher voltages such as 5.2 volts to account for cable losses, etc.) that are provided at two-contact Molex receptacle connector 1230 and three-contact Molex receptacle connectors 1235, 1240, 1245.

Two-contact Molex receptacle connector 1230 can mate along an insertion axis 1250 with two-contact Molex plug connectors 1210, which can be part of a Molex cable assembly 1255, and provide, e.g., 12 V at 75 W. Additionally, three-contact Molex receptacle connector 1245 can mate along an insertion axis 1260 with three-contact Molex plug connector 1215, which can be part of a Molex cable assembly 265, and provide, e.g., 5 V at 75 W and/or 3.3 V at 60 W. Three-contact Molex receptacle connectors 1235, 1240 can also mate with three-contact Molex plug connector 1215. As shown in FIG. 32, two-contact and three-contact Molex plug connectors 1210, 1215 may include contacts (e.g., contacts 1270, 1271, 1275, 1276, 1277) for forming an electrical connection with corresponding contacts of the Molex receptacle connectors and retention features (e.g., deflecting latching arms 1280, 1281, 1285, 1286) for retaining the electrical connection between the corresponding connectors once they are mated.

Molex cable assemblies 1255, 1265 may also include another connector (e.g., a Molex connector or another standard electrical connector such as a Universal Serial Bus (USB) connector) for providing the power received at their respective plug connectors. As such, Molex cable assemblies 1255, 1265 may provide the DC output voltage of converter 1200 to other cable assemblies, other power conversion circuitry, or to connectors of electronic devices. Alternatively, the other end of Molex cable assemblies 1255, 1265 can be wired directly to an electronic device. For example, the Molex cable assemblies can be connected via Molex connectors to electronic devices such as fans (e.g. fans 242) for cooling devices, lights (e.g., lights 254), and/or inductive charging devices (e.g., display fixtures 400). In some embodiments, the Molex cable assemblies can be connected to one or more printed circuit boards (e.g., printed circuit boards 330) for providing power to electronic devices. Further examples and discussion of the destinations of the DC output voltages provided by converter 1200 are discussed above and can also be found in U.S. Patent Application Nos. 62/045,474 and 62/045,457, both filed on Sep. 3, 2014, each of which is incorporated herein in its entirety by reference thereto.

Although converter 1200 is shown and described as receiving a DC input voltage using a MagSafe receptacle connector, some embodiments may use other standard connectors instead of a MagSafe connector. For example, a coaxial power connector, a snap and lock DC power connector, a Molex connector or any other DC power connector can be used instead of or in addition to a MagSafe receptacle connector. Similarly, instead of or in addition to Molex receptacle connectors 1230, 1235, 1240, 1245, converter 1200 may include a banana connector, an ATX Advanced Technology eXtended (ATX) connector, or any other DC power connector. Additionally, while the MagSafe connector of converter 1200 is described above as being an 85 W MagSafe connector, different MagSafe connectors may also be included with other embodiments (e.g., a 60 W MagSafe connector). Similarly, other versions of Molex connectors can be used instead of Molex receptacle connectors 1230, 1235, 1240, 1245.

Figure 33A:
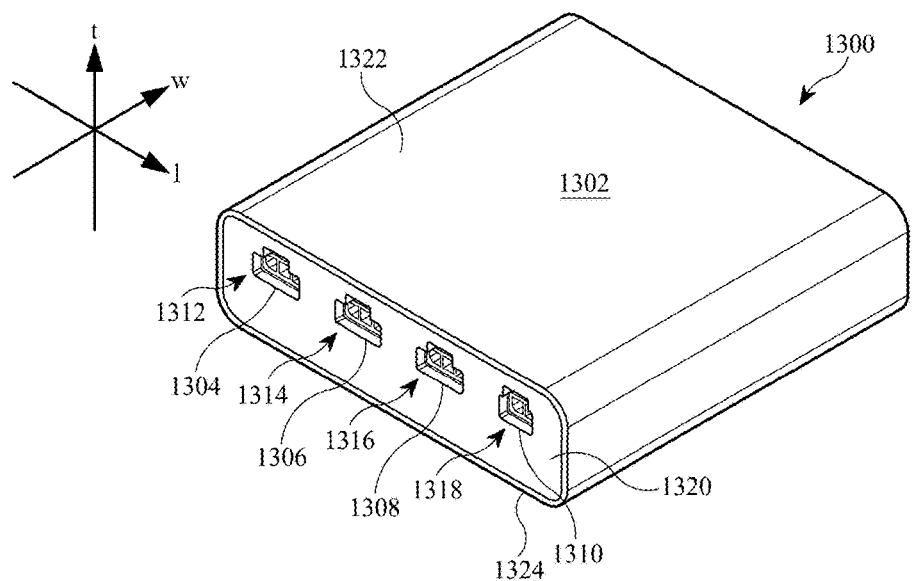
FIGS. 33A-33C show perspective, front, and back views, respectively, of a DC-to-DC converter, according to an embodiment.
Figure 33B:
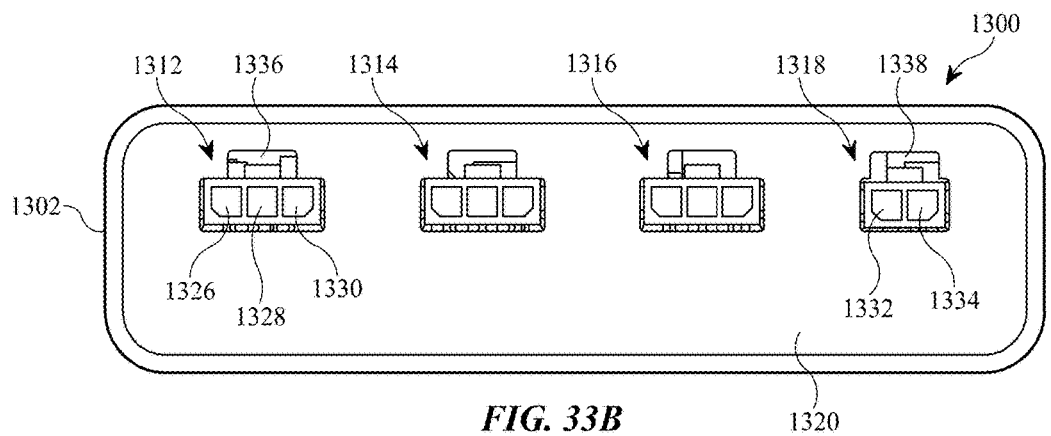
Figure 33C:
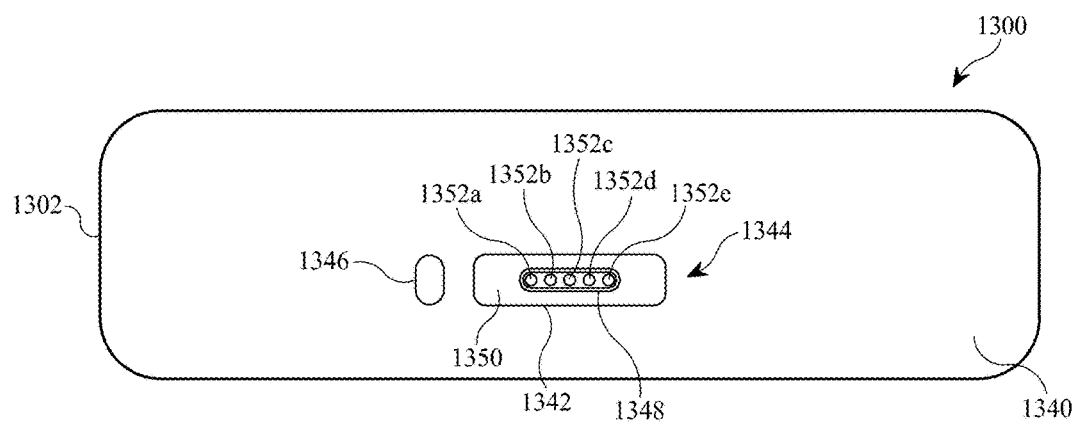

FIGS. 33A-33C illustrate perspective, front, and back views, respectively, of a DC-to-DC converter 1300, according to an embodiment. As shown in FIG. 3A, converter 1300 includes a housing 1302 having connection openings 1304, 1306, 1308, 1310 for Molex receptacle connectors 1312, 1314, 1316, 1318, respectively. Connection openings 1304, 1306, 1308, 1310 are located at side surface 1320 of the four side surfaces extending between top and bottom surfaces 1322, 1324 of housing 1302. An additional connection opening (e.g., connection opening 1342, as shown in FIG. 33C) can be located at another side surface of housing 1302 (e.g., side surface 1320, as shown in FIG. 33B).

The axes set of FIG. 33A is labeled relative to the dimensions of housing 1302, including length (l), width (w) and thickness (t) dimensions. The length of housing 1302 can range between about 60 to 100 millimeters (mm), e.g., 79 mm or 90 mm. The width of housing 1302 can range between about 60 to 100 mm, e.g., 77 mm or 85 mm. The thickness of housing 1302 can range between about 5 to 50 mm, e.g., 22 mm or 30 mm. The overall volume of housing 1302 can be, e.g., less than 100 cubic centimeters or less than 500 cubic centimeters. As another example, the overall volume of housing 1302 can be less than 400 cubic centimeters, having dimensions less than 100 mm×95 mm×4.0 mm. As yet another example, the overall volume of housing 1302 can be less than 150 cubic centimeters, having dimensions less than 80 mm×77 mm×23 mm. As such, the size of converter 1300 can be an order of magnitude smaller than traditional standalone DC-to-DC converters for handling similar input voltages, while providing a cosmetic minimalist appearance.

Figure 34A:
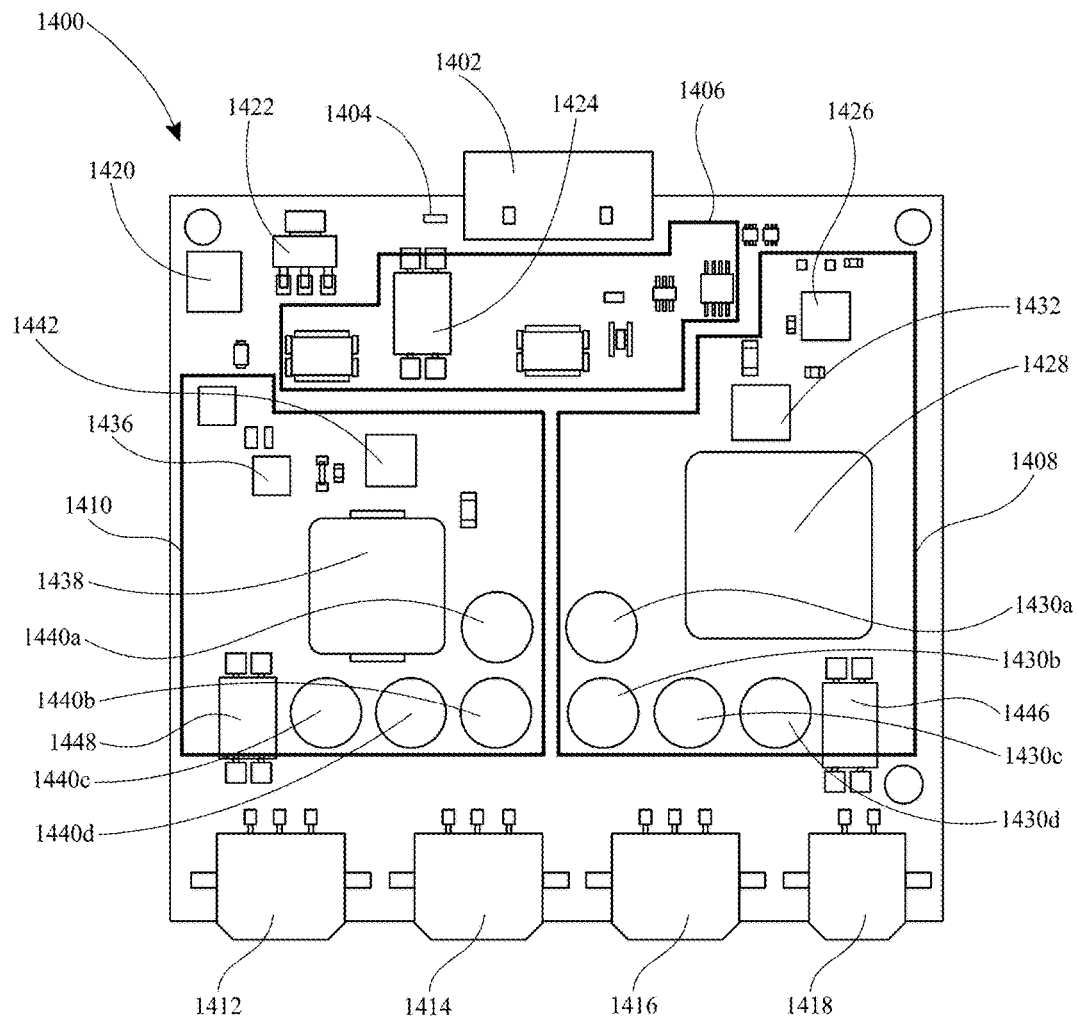
FIGS. 34A and 34B show front and back views, respectively, of a printed circuit board of a DC-to-DC converter, according to an embodiment.
Figure 34B:
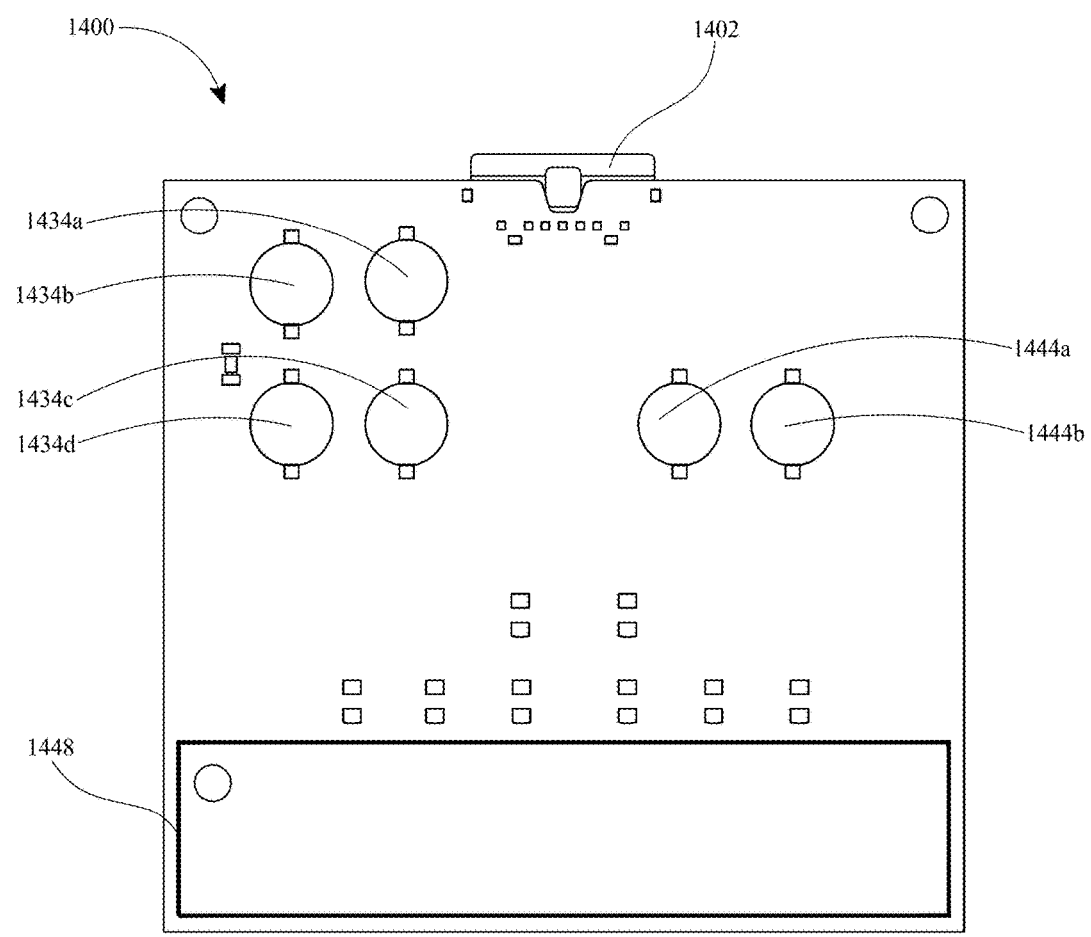

Due to the size of housing 1302, the circuitry of converter 1300 can be designed to manage heat dissipation that occurs during voltage conversion such that housing 1302 does not become hot during operation, as further discussed in relation to FIGS. 34A and 34B. Housing 1302 can be made from materials such as a polymer (e.g., polycarbonate) to help dissipate the heat produced by converter 1300.

As shown in FIG. 33B, side surface 1320 includes three-contact Molex receptacle connectors 1312, 1314, 1316, each of which include three sockets (e.g., sockets 1326, 1328 and 1330) for contacts (not shown) and two-contact Molex receptacle connector 1318, which includes two sockets 1332, 1334 for contacts (not shown). These Molex connectors also include latching protrusions (e.g., latching protrusions 1336, 1338) for deflecting and securing corresponding latch arms (e.g., latch arms 1280, 1281, 1285, 1286, as shown in FIG. 32) when mated with corresponding connectors (e.g., Molex plug connectors 1210, 1215, as shown in FIG. 32). As also shown in FIG. 33B, Molex receptacle connectors 1312, 1314, 1316, 1318 are keyed, which, along with having a different number of sockets, may help to prevent incorrect couplings with corresponding connectors.

Molex receptacle connectors 1312, 1314, 1316 can have a pinout that includes two power contacts and one ground contact, and Molex receptacle connectors 1318 can have a pinout that includes one power contact and one ground contact. For example, sockets 1326, 1328, 1330 of Molex receptacle connectors 1312 can include a 5 V contact, a 5 V contact, and a ground (GRN) contact, respectively, in order to provide a 5 V DC output voltage. Using two 5 V contacts can allow a corresponding Molex connector assembly to include a lower gauge wire due to a lower voltage drop. Alternatively, sockets 1326, 1328, 1330 of Molex receptacle connectors 1312 can include a 5 V contact, a 3.3 V contact, and a GRN contact, respectively, in order to provide a 5 V or a 3.3 DC output voltage, depending on the configuration of the corresponding Molex connector mated therewith. Sockets 1332, 1334 of Molex receptacle connectors 1318 can include a 12 V contact and a GRN contact, respectively, in order to provide a 12 V DC output voltage. Other pinouts can also be used.

Although converter 1300 is shown and described as including Molex receptacle connectors 1312, 1314, 1316, 1318 in specific positions with specific pinouts, embodiments of the invention may include Molex receptacle connectors at different locations of housing 1302 (e.g., at top surface 1322 or bottom surface 1324) and the output voltages and associated pinouts can also be varied (e.g., the pinouts may include more contacts and/or contacts having different voltages).

As shown in FIG. 33C, a side surface 1340 of housing 1302, which can be opposite side surface 1320, includes a connection opening 1342 for a MagSafe receptacle connector 1344 and a light pipe 1346. MagSafe receptacle connector 1342 includes a raised portion 1348 that extends from a recessed surface 1350 and contacts 1352a-1352e are disposed on raised portion 1348. MagSafe receptacle connector 1342 also includes an electromagnet (not shown) that can be energizable to magnetically attract a magnetic element of a corresponding standard connector (e.g., MagSafe plug connector 1205, as shown in FIG. 32). Further examples and discussion of features and embodiments of MagSafe receptacle connector 1344 and corresponding connectors can be found in U.S. Pat. No. 7,311,526, for "MAGNETIC CONNECTOR FOR ELECTRONIC DEVICE," filed Sep. 26, 2005, which is incorporated herein in its entirety by reference thereto.

Light pipe 1344 can transmit light generated by light-emitting diodes (e.g., light-emitting diodes 1404, as shown in FIG. 34A) that indicates the power status of converter 1300. For example, a green light-emitting diode (LED) light transmitted by light pipe 1344 can indicate that power is being received at converter 1300 (e.g., power is being received from MagSafe plug connector 1205, as shown in FIG. 32), while a red LED light transmitted by light pipe 1344 can indicate that input loads are larger than the specification and hence converter 1300 will remain inactive and should be power-cycled.

Although converter 1300 is shown and described as having a standard input connector (e.g., MagSafe receptacle connector 1342) located on one side surface of housing 1302 and standard output connectors (e.g., Molex receptacle connectors 1312, 1314, 1316, 1318) located on another side surface of housing 1302, some embodiments may include standard input and output connectors in different locations. For example, converter 1300 may include standard input and output connectors on other side surfaces of housing 1302 (e.g., on a bottom surface or a different side surface) and/or both the input and output connectors can be located on the same surface of housing 1302 (e.g., top surface 1322). Additionally, while the standard input and output connectors of converter 1300 are different connector types, some embodiments may include standard input and output connectors that are the same type. Alternatively, the included standard output connectors may not all be the same. For example, converter 1300 could include both Molex and MagSafe connectors for its standard output connectors or one or more Molex and/or MagSafe connectors as well as other standard connectors for its standard output connectors.

As mentioned above, more details are provided herein regarding the circuitry of converters 1200 and 1300 for converting a DC input voltage to one or more DC output voltages, the following figures illustrate examples of this regulator circuitry included on a printed circuit board (PCB).

FIGS. 34A and 34B illustrate front and back views, respectively, of a PCB 1400 of a DC-to-DC converter, according to some embodiments of the present invention. PCB 1400 be can sized such that it can be disposed within a DC-to-DC converter's housing (e.g., housing 1302, as shown in FIGS. 33A-33C). For example, the dimensions of PCB 1400 can be 55 mm×70 mm×1 mm, with a tallest component height being 7.6 mm on one side and 7 mm on the other side. As shown in FIG. 34A, the front side of PCB 1400 includes a MagSafe receptacle connector 1402; power status indicator LED 1404; input circuitry 1406; voltage regulator circuitry, including first and second regulator circuitry 1408, 1410; and Molex receptacle connectors 1412, 1414, 1416, 1418 as well as other components.

When PCB 1400 is assembled within a converter housing, MagSafe receptacle connector 1402 can be positioned adjacent to a connector opening (e.g., connector opening 1342, as shown in FIG. 33C) such that a corresponding MagSafe plug connector (e.g., MagSafe plug connector 1205) can be mated therewith. MagSafe receptacle connector 1402 can be configured to receive and route a DC input voltage (e.g., 20 V at 85 W) to input circuitry 1406, but an impedance check may occur before power is drawn from the DC input voltage source. LED 1404 will indicate to a user whether power is being drawn via a light pipe (e.g., light pipe 1346), as discussed above. A joint test action group (JTAG) header 1420 can be used for loading firmware that controls LED 1404 and a low-dropout regulator (LDO) 1422 can be used to step down the DC input voltage for LED 1404.

Input circuitry 1406 may perform a number of functions, including determining whether the current of the DC input voltage exceeds an upper current threshold (e.g., 4.22 amperes). A current sensing mechanism including a sensor and a comparator can be included with input circuitry 1406 to perform this function. Input circuitry 1406 can also include fuses (e.g., 6 amperes resettable fuses) for dealing with hard hits to the PCB circuitry, but the current sensing mechanism can take less time to recover so it can be included even though its function is redundant to the fuses. Input circuitry 1406 can also include a bleed resistor (not shown) placed in parallel with MagSafe receptacle connector 1402 to help discharge the electric charge stored in a power source's filter capacitors or other components when a DC input voltage power source (e.g., MagSafe plug connector 1205, as shown in FIG. 32) is quickly unplugged and plugged back into MagSafe receptacle connector 1402.

After processing the DC input voltage, as described above, input circuitry 1406 provides the DC input voltage to first regulator circuitry 1408. First regulator circuitry 1408 can receive the DC input voltage at controller 1426, which can be coupled to a plurality of inductors 1428 and capacitors 1430a-1430d via a metal-oxide-semiconductor field-effect transistor (MOSFET) 1432. The plurality of inductors 1428 can be coupled in series to minimize drop while capacitors 1430a-1430d can be coupled in parallel and grouped around inductors 1428. Together these components can step down the DC input to a lower voltage (e.g., 12 V at 75 W and 6 amperes (amps)).

MOSFET 1432 can also be coupled to additional capacitors that are included on the backside of PCB 1400. For example, as shown in FIG. 4B, the back side of PCB 1400 can include capacitors 1434a-1434d that are coupled to the MOSFET 1432 through PCB 1400, thereby providing additional electrically stability as MOSFET 1432 filters the DC input voltage before providing it to inductors 1428 and capacitors 1430a-1430d. This layout helps to optimize power supply and heat dissipation to minimize the space required in the converter housing for PCB 1400. The size of capacitors 1430a-1430d can also be optimized to avoid large drops and charge quickly while still being small in number. For example, capacitors 1430a-1430d can be rated at 180 microfarads (μF) and stand less than 8 mm tall.

After the DC input voltage has been stepped down, first regulator circuitry 1408 can provide a DC output voltage to a two-contact Molex receptacle connector 1418, which can mate with a corresponding Molex plug connector (e.g., Molex plug connector 1210, as shown in FIG. 32). In addition, first regulator circuitry 1408 can provide its DC output voltage to second regulator circuitry 1410 when second regulator circuitry 1410 is configured to provide a DC output voltage that is less than the DC output voltage provided by first regulator circuitry 1408 (e.g., when first regulator circuitry 1408 outputs 12 V at 6 amps and second regulator circuitry 1410 outputs 5 V at 16.2 amps). This voltage path can help to further limit heat dissipation at PCB 1400, as opposed to providing the DC input directly to second regulator circuitry 1410. In addition to reducing losses and heat dissipation, controller 1426 does not need to be as complex when first regulator circuitry 1408 provides its DC output voltage to second regulator circuitry 1410.

Second regulator circuitry 1410 can receive the DC output voltage of first regulator circuitry 1408 at controller 1426, which can be coupled to a plurality of inductors 1438 and capacitors 1440a-1440d via a MOSFET 1442. The plurality of inductors 1439 can be coupled in series to minimize drop while capacitors 1440a-1440d can be coupled in parallel and grouped around inductors 1438. Together these components can step down the DC input to a lower voltage (e.g., 5 V at 75 W or 3.3 V at 60 W).

MOSFET 1436 can also be coupled to additional capacitors that are included on the backside of PCB 1400. For example, as shown in FIG. 34B, the back side of PCB 1400 can include capacitors 1444a-1444b that are coupled to the MOSFET 1436 through PCB 1400, thereby providing additional electrical stability as MOSFET filters the DC output voltage of first regulator circuitry 1408 before providing it to inductors 1438 and capacitors 1440a-1440b. This layout helps to optimize power supply and heat dissipation to minimize the space required in the converter housing for PCB 1400. The size of capacitors 1440a-1440b can also be optimized to avoid large drops and charge quickly while still being small in number. For example, capacitors 1440a-1440b can be rated at 180 microfarads (μF) and stand less than 8 mm tall.

After the DC input voltage has been stepped down, second regulator circuitry 1410 can provide DC output voltages to three-contact Molex receptacle connectors 1412, 1414, 1416, which can mate with corresponding Molex plug connectors (e.g., Molex plug connectors 1215, as shown in FIG. 32). Fuses (e.g., 8 amp resettable fuses) can be included for each of the Molex receptacle connectors 1412, 1414, 1416 to comply with National Electrical Code (NEC) requirements. A resettable fuse can also be provided for Molex receptacle connector 1418 and variations thereof for the same reason. As with other three-contact Molex receptacle connectors discussed herein, three-contact Molex receptacle connectors 1412, 1414, 1416 can have the same or different pinouts in order to provide, e.g., 5 V and/or 3.3 V of DC output voltage.

First and second regulator circuitry 1408, 1410 and input circuitry 1406 of PCB 1400 can each include chokes (e.g., common mode chokes 1446, 1448, 1424) to filter out noise caused by transient power loads (e.g., connection to external inductive charging coils) so that less, if any, noise feeds back into the regulator circuitry, thereby improving electromagnetic compatibility.

The configuration of PCB 1400 as shown in FIGS. 34A-34B and described above, can allow a converter in which PCB 1400 is implemented to run continuously without needing a fan, while ensuring the converter housing does not become hot to the touch and even when a corresponding converter is running continuously at max load. PCB 1400 also includes empty region 1448, which can allow the function of PCB 1400 to be expandable (e.g., to include additional standard output connectors).

Although PCB 1400 is shown and described as having regulator circuitry that includes two sub-circuits (e.g., first and second voltage regulator circuitry 1408 and 1410), additional voltage regulator circuitry may also be included on PCB 1400 for converting to additional DC output voltages. For example, PCB 1400 could include a third or more voltage regulator circuitry. Additionally, PCB 1400 can be configured to handle a number of different input voltages, including 20 V but also 30 V or other voltages. Additionally, although PCB 1400 as well as converters 1200, 1300 are discussed herein as providing non-variable DC output voltages (e.g., first and second voltage regulators 1408 and 1410 are configured to only output one DC output voltage), PCB 1400 and converters 1200, 1300 can be modified to provide variable DC output voltages.

Also, while a number of specific embodiments were disclosed with specific features, a person of skill in the art will recognize instances where the features of a number of different embodiments can be combined with the features of another embodiment. In addition, some specific embodiments of the invention set forth above were illustrated and described as having housings shaped liked a rectangular prism. A person of skill in the art will readily appreciate that DC-to-DC converter housings can be formed in other shapes, such a spherical, irregular, pyramidal, conical, cylindrical, and other shapes.

The foregoing descriptions of the specific embodiments described herein are presented for purposes of illustration and description. These exemplary embodiments are not intended to be exhaustive or to limit the embodiments to the precise forms disclosed. All specific details described are not required in order to practice the described embodiments.

It will be apparent to one of ordinary skill in the art that many modifications and variations are possible in view of the above teachings, and that by applying knowledge within the skill of the art, one may readily modify and/or adapt for various applications such specific embodiments, without undue experimentation, without departing from the general concept of the present invention. Such adaptations and modifications are intended to be within the meaning and range of equivalents of the disclosed embodiments, based on the teaching and guidance presented herein.

The Detailed Description section is intended to be used to interpret the claims. The Summary and Abstract sections may set forth one or more but not all exemplary embodiments of the present invention as contemplated by the inventor(s), and thus, are not intended to limit the present invention and the appended claims.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The phraseology or terminology used herein is for the purpose of description and not limitation, such that the terminology or phraseology of the present specification is to be interpreted by the skilled artisan.

The breadth and scope of the present invention should not be limited by any of the above-described exemplary embodiments, but should be defined only in accordance with the following claims and their equivalents.

What is claimed is:

1. A display fixture comprising:
   a plug comprising:
   a body having a top exterior surface and a bottom exterior surface disposed opposite the top exterior surface, and
   an electrical connector extending from the bottom exterior surface;
   a rigid stem extending from the top exterior surface of the plug; and
   an inductive charging mechanism attached to the stem and in electrical communication with the electrical connector,
   wherein the stem supports the charging mechanism above the top exterior surface of the plug.

2. The display fixture of claim 1, further comprising:
   a printed circuit board disposed within the body and in electrical communication with the electrical connector; and
   a wire at least partially disposed within the stem and electrically connecting the printed circuit board to the charging mechanism.

3. The display fixture of claim 1, wherein the plug further comprises a magnet disposed within the body of the plug.

4. The display fixture of claim 1, wherein the plug further comprises an alignment groove disposed on a side surface of the plug.

5. The display fixture of claim 1, wherein the electrical connector comprises a spring loaded pin.

6. The display fixture of claim 1, wherein the electrical connector is a power cord.

7. The display fixture of claim 2, wherein the printed circuit board is configured to control the amount of voltage delivered to the charging mechanism.

8. The display fixture of claim 2, wherein the printed circuit board is configured to control the amount of current delivered to the charging mechanism.

9. The display fixture of claim 1, wherein the stem comprises an extension extending from the top exterior surface of the plug and a ring attached to the extension and coupled to the charging mechanism, wherein the extension and the ring support the charging mechanism above the top exterior surface of the plug.

10. The display fixture of claim 9, wherein the ring comprises a first end coupled to a first side of the charging mechanism and a second end coupled to a second side of the charging mechanism opposite the first side.

11. A display apparatus for displaying a product, the display apparatus comprising:
   a display panel; and
   the display fixture according to claim 1 removably coupled to the display panel.

12. The display apparatus of claim 11, wherein the display fixture is removably disposed in a node on the display panel, and
   wherein the plug of the display fixture comprises a first alignment feature and the node comprises a second alignment feature configured to mate with the first alignment feature.

13. The display apparatus of claim 11, further comprising a product supported by the display fixture.

14. The display apparatus of claim 11, wherein the display apparatus is a table.

15. The display apparatus of claim 11, further comprising a cavity partially defined by the display panel, and wherein the display fixture is disposed within the cavity.

16. The display apparatus of claim 15, wherein the display panel defines a bottom portion of the cavity and a transparent panel defines a top portion of the cavity.

17. A display fixture, comprising:
   a plug comprising:
   a body comprising a cylindrical side exterior surface,
   an electrical connector comprising a spring loaded pin extending from a bottom of the body,
   a magnet coupled to the body, an alignment groove disposed on the cylindrical side exterior surface, and a printed circuit board disposed within the body and in electrical communication with the electrical connector; and a charging mechanism in electrical communication with the printed circuit board and the electrical connector.

18. The display fixture of claim 17, wherein the body of the plug is configured to position the plug in a cylindrical node formed in a surface of a display table to thereby support the charging mechanism above the surface of the display table.

19. The display fixture of claim 17, comprising two spring loaded pins extending from the bottom of the body, wherein one of the pins is configured to receive power from an external source and the other pin is an electrical grounding pin.

20. The display fixture of claim 17, comprising two magnets coupled to the body of the plug, wherein the two magnets are disposed on opposite sides of the printed circuit board.

21. A product display fixture, comprising:
a plug comprising an electrical connector extending from a bottom of the plug;
a stem comprising:
an extension extending from a top surface of the plug, and
a ring attached to the extension; and
a puck attached to the ring, the puck comprising a charging surface and a charging mechanism in electrical communication with the electrical connector,
wherein the extension and the ring support the puck above the top surface of the plug, and
wherein the ring and the puck are configured to support and charge a product on the product display fixture.

22. The product display fixture of claim 21, wherein the charging surface of the puck comprises a surface oriented at an oblique angle relative to the top surface of the plug.

23. The product display fixture of claim 21, comprising:
a wire electrically connecting the charging mechanism and the electrical connector; and
a groove formed in the ring, wherein the wire is disposed within the groove.

24. The product display fixture of claim 21, wherein the charging surface comprises a concave shape.

25. A product display fixture assembly, comprising:
the product display fixture of claim 21; and
a watch disposed on the charging surface of the puck.

26. The product display fixture assembly of claim 25, wherein a portion of the watch wraps around the ring.

* * * * *